(12) United States Patent
Galitsky

(10) Patent No.: US 11,645,459 B2
(45) Date of Patent: May 9, 2023

(54) SOCIAL AUTONOMOUS AGENT IMPLEMENTATION USING LATTICE QUERIES AND RELEVANCY DETECTION

(71) Applicant: Oracle International Corporation, Redwood Shores, CA (US)

(72) Inventor: Boris Galitsky, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 895 days.

(21) Appl. No.: 16/460,503

(22) Filed: Jul. 2, 2019

(65) Prior Publication Data

US 2020/0004813 A1 Jan. 2, 2020

Related U.S. Application Data

(60) Provisional application No. 62/693,174, filed on Jul. 2, 2018.

(51) Int. Cl.

| | |
|---|---|
| *G06F 40/35* | (2020.01) |
| *G06F 40/211* | (2020.01) |
| *H04L 51/02* | (2022.01) |
| *G06F 16/901* | (2019.01) |
| *G06F 16/9538* | (2019.01) |

(Continued)

(52) U.S. Cl.
CPC ........ *G06F 40/211* (2020.01); *G06F 16/9027* (2019.01); *G06F 16/9538* (2019.01); *G06F 40/279* (2020.01); *G06F 40/30* (2020.01); *G06F 40/35* (2020.01); *H04L 51/02* (2013.01); *H04L 51/216* (2022.05)

(58) Field of Classification Search
CPC ............... G06F 40/211; G06F 16/9027; G06F 16/9538; G06F 40/279; G06F 40/30; G06F 40/35
See application file for complete search history.

(56) References Cited

U.S. PATENT DOCUMENTS

| | | |
|---|---|---|
| 5,495,605 A | 2/1996 | Cadot |
| 6,675,159 B1 | 1/2004 | Lin et al. |

(Continued)

OTHER PUBLICATIONS

Excerpts from Conceptual Structures for STEM Research and Education. ICCS 2013. Lecture Notes in Computer Science( ), vol. 7735. retrieved from https://link.springer.com/chapter/10.1007/978-3-642-35786-2_12 (Year: 2013).*

(Continued)

*Primary Examiner* — Sanchita Roy
(74) *Attorney, Agent, or Firm* — Kilpatrick Townsend & Stockton LLP

(57) ABSTRACT

Techniques for computer-generated conversation are disclosed. In an example, a method identifies text postings from a conversation. The method creates, for each text fragment of each text posting, a syntactic tree and a discourse tree. The method creates parse thickets, each parse thicket including the syntactic tree and discourse tree of a unique pair of text postings. The method extracts, from each parse thicket, a common text segment and obtains a set of candidate search results by providing the common text segments to a search engine. The candidate search results can be further refined for relevancy and mental state and posted as a response to a conversation.

19 Claims, 19 Drawing Sheets

(51) Int. Cl.
  *G06F 40/30*    (2020.01)
  *G06F 40/279*   (2020.01)
  *H04L 51/216*   (2022.01)

(56) References Cited

U.S. PATENT DOCUMENTS

| | | | |
|---|---|---|---|
| 6,731,307 | B1 | 5/2004 | Strubbe et al. |
| 7,152,031 | B1 | 12/2006 | Jensen et al. |
| 7,519,529 | B1 | 4/2009 | Horvitz |
| 7,840,556 | B1 | 11/2010 | Dayal et al. |
| 9,037,464 | B1 | 5/2015 | Mikolov et al. |
| 9,292,490 | B2 | 3/2016 | Kimelfeld et al. |
| 9,646,078 | B2 | 5/2017 | Galitsky et al. |
| 2001/0053968 | A1 | 12/2001 | Galitsky et al. |
| 2002/0046018 | A1* | 4/2002 | Marcu ............ G06F 40/44 704/9 |
| 2005/0108001 | A1 | 5/2005 | Aarskog |
| 2007/0073533 | A1 | 3/2007 | Thione et al. |
| 2007/0294229 | A1 | 12/2007 | Au |
| 2008/0172409 | A1 | 7/2008 | Botros et al. |
| 2008/0228467 | A1 | 9/2008 | Womack et al. |
| 2009/0089252 | A1 | 4/2009 | Galitsky et al. |
| 2009/0248399 | A1 | 10/2009 | Au |
| 2009/0282019 | A1 | 11/2009 | Galitsky et al. |
| 2012/0041950 | A1 | 2/2012 | Koll et al. |
| 2012/0078902 | A1 | 3/2012 | Duboue et al. |
| 2012/0253788 | A1* | 10/2012 | Heck ............ G06F 40/30 704/9 |
| 2014/0040288 | A1 | 2/2014 | Galitsky |
| 2014/0122083 | A1 | 5/2014 | Xiaojiang |
| 2014/0136188 | A1 | 5/2014 | Wroczynski et al. |
| 2015/0051900 | A1 | 2/2015 | Kimelfeld et al. |
| 2015/0161512 | A1 | 6/2015 | Byron et al. |
| 2016/0099892 | A1 | 5/2016 | Palakovich et al. |
| 2016/0247068 | A1 | 8/2016 | Lin |
| 2017/0116982 | A1 | 4/2017 | Gelfenbeyn et al. |
| 2018/0189385 | A1 | 7/2018 | Sun et al. |
| 2018/0373701 | A1 | 12/2018 | McAteer et al. |
| 2019/0163756 | A1 | 5/2019 | Bull et al. |
| 2019/0354544 | A1 | 11/2019 | Hertz et al. |
| 2020/0342054 | A1* | 10/2020 | Cason ............ G06F 40/211 |

OTHER PUBLICATIONS

U.S. Appl. No. 16/240,232, Final Office Action dated Apr. 21, 2022, 15 pages.
BBC Inside Science, Automatic Facebook, Available Online at http://www.bbc.co.uk/programmes/b040lnlf, Apr. 17, 2014, 2 pages.
Difference in The Way Children with Autism Learn New Behaviors Described, Kennedy Krieger Institute, ScienceDaily, Retrieved Sep. 17, 2019 from www.sciencedaily.com/releases/2009/07/090706113647.htm, Jul. 10, 2009, 2 pages.
"Exploring Dialog Management for Bots", Chatbots Magazine, Available online at: https://chatbotsmagazine.com/exploring-dialog-management-for-bots-cbb8665a2fd3, Jul. 11, 2016, 7 pages.
One Per Cent, New Scientist, Available Online at http://www.newscientist.com/article/mg22229634.400-one-per-cent.html., Apr. 5, 2014, 4 pages.
Abney, Parsing by Chunks, Kluwer BBC Inside Science, Available Online at: http://www.bbc.co.uk/programmes/b040lnlf, Nov. 10, 1994, 19 pages.
Axelrod, The Evolution of Cooperation, Basic Books, 1984, 9 pages.
Baron-Cohen et al., Does the Autistic Child Have a "Theory of Mind?", Cognition, vol. 21, No. 1, Oct. 1985, pp. 37-46.
Bello et al., Developmental Accounts of Theory-of-mind Acquisition: Achieving Clarity via Computational Cognitive Modeling, In Proceedings of the 28th Annual Conference of the Cognitive Science Society, 2006, pp. 1014-1019.
Borgida, Asking Queries About Frames, Proceedings of the 5th Int. Conf. on the Principles of Knowledge Representation and Reasoning 1996, 1996, pp. 340-349.

Bousquet et al., Introduction to Statistical Learning Theory, Lecture Notes in Artificial Intelligence, vol. 3176, 2004, pp. 175-213.
Breazeal, A Motivational System for Regulating Human-Robot Interactions, Fifteenth National/tenth Conference on Artificial Intelligence, 1998, 12 pages.
Bron et al., Algorithm 457: Finding All Cliques of an Undirected Graph, Communications of the ACM, vol. 16, No. 9, Sep. 1973, pp. 575-577.
Buchegger et al., A Case for P2P Infrastructure for Social Networks—Opportunities & Challenges, In: Proceedings of 6th International Conference on Wireless On-Demand Network Systems and Services, Utah, 2009, 8 pages.
Burke et al., "The Intersection of Robust Intelligence and Trust in Autonomous Systems", AAAI Spring Symposium, 2014, 102 pages.
Buzing et al., Emerging Communication and Cooperation in Evolving Agent Societies, Journal of Artificial Societies and Social Simulation, vol. 8, No. 1, Available Online at http://jasss.soc.surrey.ac.uk/8/1/2.html, Jan. 31, 2005, 22 pages.
Cassell et al., Human Conversation as a System Framework: Designing Embodied Conversational Agents, Embodied Conversational Agents, 2001, pp. 29-63.
Cassell et al., Negotiated Collusion: Modeling Social Language and Its A. Relationship Effects in Intelligent Agents, User Modeling and Adaptive Interfaces, vol. 13, No. 1-2, Feb.-May 2003, 34 pages.
Cassimatis, Integrating Cognitive Models Based on Different Computational Methods, Twenty-Seventh Annual Conference of the Cognitive Science Society, vol. 27, 2005, pp. 402-407.
Chambers et al., Learning Alignments and Leveraging Natural Logic, In Proceedings of the ACL-07 Workshop on Textual Entailment and Paraphrasing, 2007, 6 pages.
Chesnevar et al., Logical Models of Argument, ACM Computing Surveys, vol. 32, No. 4, Dec. 2000, pp. 337-383.
Collins et al., Convolution Kernels for Natural Language, NIPS'01 Proceedings of the 14th International Conference on Neural Information Processing Systems: Natural and Synthetic, 2002, 8 pages.
De Lara et al., Some Strategies for the Simulation of Vocabulary Agreement in Multi-Agent Communities, Journal of Artificial Societies and Social Simulation, vol. 3, No. 4, Available online at: http://www.soc.surrey.ac.uk/JASSS/3/4/2.html, 2000, 11 pages.
De Rosis et al., From Greta's Mind to Her Face: Modelling the Dynamics of Affective States in a Conversational Embodied Agent, International Journal of Human-Computer Studies, vol. 59, No. 1-2, Jul. 2003, pp. 81-118.
Denero et al., The Complexity of Phrase Alignment Problems, In Proceedings of ACL/HLT-08, Jun. 2008, pp. 25-28.
Dias et al., Feeling and Reasoning: A Computational Model for Emotional Characters, EPIA Affective Computing Workshop, Progress in Artificial Intelligence, vol. 3808, 2005, pp. 127-140.
D'Inverno et al., A Formal Specification of dMARS, Intelligent Agents IV: Proceedings of the Fourth International Workshop on Agent Theories, Architectures and Languages, 1998, 22 pages.
Donlon, "Robust Intelligence (RI)", National Science Foundation, Available Online at: www.nsf.gov/funding/pgm_summ.jsp?pims_id=503305&org=IIS, 2013, 3 pages.
Ehrlich et al., Maximum Common Subgraph Isomorphism Algorithms and Their Applications in Molecular Science Review, Wiley Interdisciplinary Reviews: Computational Molecular Science, vol. 1, No. 1, Jan./Feb. 2011, pp. 68-79.
Fagin et al., Reasoning About Knowledge, The MIT Press, 1996, 75 pages.
Gabbay, Action, Time and Default, Logical Foundations for Cognitive Agents, 1999, pp. 151-152.
Galitsky, A Computational Simulation Tool for Training Autistic Reasoning About Mental Attitudes, Knowledge-Based Systems, vol. 50, Sep. 2013, pp. 25-43.
Galitsky et al., A Novel Approach for Classifying Customer Complaints Through Graphs Similarities in Argumentative Dialogues, Journal Decision Support Systems, vol. 46, No. 3, 2009, 28 pages.
Galitsky et al., A Web Mining Tool for Assistance with Creative Writing, European Conference on Information Retrieval, vol. 7814, 2013, pp. 828-831.

(56) References Cited

OTHER PUBLICATIONS

Galitsky et al., Building Integrated Opinion Delivery Environment, AI, Cognitive Semantics, Computational Linguistics and Logics @ Twenty-Fourth International FLAIRS Conference, 2011.

Galitsky et al., "Chatbot with a Discourse Structure-Driven Dialogue Management", Proceedings of the Software Demonstrations of the 15th Conference of the European Chapter of the Association for Computational Linguistics Available online at: https://pdfs.semanticscholar.org/439f/cbe14dbc84b694bae2ee42a914d743126d12.pdf, Apr. 2017, pp. 87-90.

Galitsky, Content Inversion for User Searches and Product Recommendation Systems and Methods, US Patent Application, eBay No. 47088.80, 2013.

Galitsky, Exhaustive Simulation of Consecutive Mental States of Human Agents, Knowledge-Based Systems, vol. 43, May 2013, pp. 1-20.

Galitsky, Extending the BDI Model to Accelerate the Mental Development of Autistic Patients, Second Intl. Conf. on Development & Learning, 2002, 7 pages.

Galitsky et al., Finding Maximal Common Sub-Parse Thickets for Multi-Sentence Search, IJCAI Workshop on Graphs and Knowledge Representation, IJCAI, Jan. 2014, 20 pages.

Galitsky et al., From Generalization of Syntactic Parse Trees to Conceptual Graphs, 18th International Conference on Conceptual Structures, ICCS 2010, vol. 6208, Jul. 26-30, 2010, pp. 185-190.

Galitsky et al., How Children with Autism and Machines Learn to Interact, Autonomy and Artificial Intelligence: A Threat or Savior?, 2017, pp. 195-226.

Galitsky et al., Improving Trust in Automation of Social Promotion, Association for the Advancement of Artificial Intelligence, 2014, pp. 28-35.

Galitsky et al., Inferring the Semantic Properties of Sentences by Mining Syntactic Parse Trees, Data & Knowledge Engineering, vols. 81-82, Nov.-Dec. 2012, pp. 21-45.

Galitsky et al., Justification of Customer Complaints Using Emotional States and Mental Actions, FLAIRS Conference, 2004, 6 pages.

Galitsky et al., Learning Communicative Actions of Conflicting Human Agents, Journal of Experimental & Theoretical Artificial Intelligence, vol. 20, No. 4, Dec. 2008, pp. 277-317.

Galitsky , "Learning Noisy Discourse Trees", Computational Linguistics and Intellectual Technologies, Proceedings of the International Conference "Dialogue 2017". Available online at: http://www.dialog-21.ru/media/3911/galitskyb.pdf, May 31-Jun. 3, 2017, 14 pages.

Galitsky, Learning Parse Structure of Paragraphs and Its Applications in Search, Engineering Applications of Artificial Intelligence, vol. 32, 2014, pp. 160-184.

Galitsky, Machine Learning of Syntactic Parse Trees for Search and Classification of Text, Engineering Applications of Artificial Intelligence, vol. 26, Available Online at http://dx.doi.org/10.1016/j.engappai.2012.09.017, Mar. 2013, pp. 1072-1091.

Galitsky, Natural Language Question Answering System: Technique of Semantic Headers, Advanced Knowledge Intl., 2003.

Galitsky, Reasoning About Mental Attitudes of Complaining Customers, Knowledge-Based Systems, vol. 19, No. 7, Nov. 2006, pp. 592-615.

Galitsky, Transfer Learning of Syntactic Structures for Building Taxonomies for Search Engines, Engineering Applications of Artificial Intelligence, vol. 26, No. 10, Available Online at: http://dx.doi.org/10.1016/j.engappai.2013.08.010, Nov. 2013, 32 pages.

Galitsky et al., Using Generalization of Syntactic Parse Trees forTaxonomy Capture on the Web, 19th International Conference on Conceptual Structures, vol. 6828, Jul. 25-29, 2011, pp. 104-117.

Grosz, Collaborative Plans for Complex Group Action, Artificial Intelligence, vol. 86, No. 2, 1996, pp. 269-357.

Hayes et al., The Future of Social Media Entertainment, Available Online at: http://www.personalizemedia.com/the-future-of-social-media-entertainment-slides/., 6 pages, Oct. 26, 2008.

Izquierdo et al., Appearances Can Be Deceiving: Lessons Learned Re-Implementing Axelrod's Evolutionary Approach to Norms, Journal of Artificial Societies and Social Simulation, vol. 8, No. 3, Available Online at http://jasss.soc.surrey.ac.uk/8/3/2.html, Jun. 30, 2005, 25 pages.

Jiang et al., Semantic Similarity Based on Corpus Statistics and Lexical Taxonomy, In Proceedings of International Conference Research on Computational Linguistics, 1997, 15 pages.

Kaiser et al., The Visual Perception of Motion by Observers with Autism Spectrum Disorders: A Review and Synthesis, Psychonomic Bulletin and Review, vol. 16, No. 5, 2009, pp. 761-777.

Kaminka et al., Flexible Teamwork in Behavior-based Robots, AAAI-05, 2005, pp. 108-113.

Kaminka et al., Robust Agent Teams via Socially-Attentive Monitoring, Journal of Artificial Intelligence Research, vol. 12, 2000, pp. 105-147.

Kapoor et al., Algorithms for Generating All Spanning Trees of Undirected and Weighted Graphs, SIAM J. Computer, vol. 24, 1995, pp. 461-472.

Kennedy et al., Like-me, Simulation as an Effective and Cognitively Plausible Basis for Social Robotics, International Journal of Social Robotics, vol. 1, No. 2, Feb. 24, 2009, pp. 181-194.

Kushman et al., Learning to Automatically Solve Algebra Word Problems, Proceedings of the 52nd Annual Meeting of the Association for Computational Linguistics, Jun. 23-25, 2014, pp. 271-281.

Lawless et al., Robust Intelligence (RI) Under Uncertainty: Mathematical Foundations of Autonomous Hybrid (Human-Machine-Robot) Teams, Organizations and Systems, Structure and Dynamics, vol. 6, No. 2, 2013, 35 pages.

Levesque et al., GOLOG: A Logic Programming Language for Dynamic Domains, Journal of Logic Programming, vol. 31, 1997, pp. 59-83.

Li et al., Shifting Matrix Management: A Model for Multi-Agent Cooperation, Engineering Applications of Artificial Intelligence, vol. 16, No. 3, 2003, pp. 191-201.

Lisetti, Embodied Conversational Agents for Psychotherapy, CHI 2008 Workshop on Technology in Mental Health, 2008, 12 pages.

Maccartney et al., A Phrase-Based Alignment Model for Natural Language Inference, Proceedings of the 2008 Conference on Empirical Methods in Natural Language Processing, Oct. 2008, pp. 802-811.

Mansilla et al., "Asknext: An Agent Protocol for Social Search", Information Sciences, vol. 190, May 2012, pp. 144-161.

Mansilla et al., "Automation of Social Networks with QA Agents", Proceedings of 9th International Conference on Autonomous Agents and Multi-Agent Systems, AAMAS, Jan. 2010, pp. 1437-1438.

Mccarthy, Making Robots Conscious of Their Mental States, Proceedings of Machine Intelligence Conf. 15, 1995, 8 pages.

Montaner et al., A Taxonomy of Recommender Agents on the Internet, Artificial Intelligence Review, vol. 19, No. 4, 2003, pp. 285-330.

Olivia et al., Case-based BDI Agents: An Effective Approach for Intelligent Search on the World Wide Web, Intelligent Agents in Cyberspace, 1999, pp. 20-27.

Ourioupina et al., Application of Default Reasoning to Semantic Processing Under Question-Answering, DIMACS Tech Report 16, May 2001, pp. 1-22.

Parameswaran, Emotions in Intelligent Agents, FLAIRS-01,2001, pp. 82-86.

Reiter, Proving Properties of States in the Situational Calculus, Journal Artificial Intelligence, vol. 64, No. 2, Dec. 1993, 17 pages.

Rich et al., Collagen: A Collaboration Manager for Software Interface Agents, User Modeling and User-Adapted Interaction, vol. 8, No. 3-4, Mar. 1998, 36 pages.

Scheutz, Agents with or Without Emotions, FLAIRS-01, 2001, pp. 89-93.

Shoham, Agent-Oriented Programming, Artificial Intelligence, vol. 60, No. 1, 1993, pp. 51-92.

Sjoera , "The Linguistics Behind Chat Bots", iCapps, Available online at: http://www.icapps.com/the-linguistics-behind-chatbots/, Feb. 22, 2017, 9 pages.

(56) References Cited

OTHER PUBLICATIONS

Sloman, Architecture-Based Conceptions of Mind, In Proceedings of 11th International Congress of Logic, Methodology and Philosophy of Science, 2000, 18 pages.
Stein et al., Towards More Flexible and Common-sensical Reasoning About Beliefs, 1995 AAAI Spring Symposium on Representing Mental States and Mechanisms, Mar. 1995, 9 pages.
Stone et al., Multiagent Systems: A Survey from a Machine Learning Perspective, Autonomous Robots, vol. 8, No. 3, Jun. 2000, 57 pages.
Tamma et al., Ontologies for Supporting Negotiation in E-commerce, Engineering Applications of Artificial Intelligence, vol. 18, No. 2, 2005, pp. 223-236.
Trafton et al., ACT-R/E: An Embodied Cognitive Architecture for Human-Robot Interaction, Journal of Human-Robot Interaction, vol. 2, No. 1, Feb. 2013, 26 pages.
Wang et al., "Using Learning Analytics to Understand the Design of an Intelligent Language Tutor-Chatbot Lucy", International Journal of Advanced Computer Science and Applications, vol. 4, No. 11, Nov. 2013, pp. 124-131.
Weigand et al., Argumentation Semantics of Communicative Action, Proceedings of the 9th International Working Conference on the Language-Action Perspective on Communication Modelling, 2004, pp. 159-178.
Wooldridge, Reasoning about Rational Agents, MIT Press, 2000, 2 pages.
Wu et al., Adaptive Peer to Peer Social Networks for Distributed Content Based Web Search, In: Social Information Retrieval Systems: Emergent Technologies and Applications for Searching the Web Effectively, IGI Global, 2007, 31 pages.
Yu et al., A Multi-Agents Based E-maintenance System with Case-based Reasoning Decision Support, Engineering Applications of Artificial Intelligence, vol. 16, No. 4, 2003, 12 pages.
Language Data, Yahoo Labs, Available Online at: https://webscope.sandbox.yahoo.corn/catalog.php?datatype=I&guccounter=1, Accessed Aug. 19, 2019, 5 pages.
Final Office Action dated Oct. 21, 2021, in U.S. Appl. No. 16/240,232, 13 pages.
Non-Final Office Action dated Apr. 9, 2021, in U.S. Appl. No. 16/240,232, 13 pages.
Non-Final Office Action dated Jan. 4, 2022, in U.S. Appl. No. 16/240,232, 15 pages.
Notice of Allowance dated Sep. 1, 2022, in U.S. Appl. No. 16/240,232, 9 pages.
Lowe, et al., On the Evaluation of Dialogue Systems with Next Utterance Classification, Proceedings of the 17th Annual Meeting of the Special Interest Group on Discourse and Dialogue, Sep. 13-15, 2016, pp. 264-269.
Serban, et al., A Survey of Available Corpora for Building Data-Driven Dialogue Systems, Available online at: https://arxiv.org/pdf/1512.05742.pdf, Mar. 21, 2017, 56 pages.
Wilks, Machine Conversations, The Springer International Series in Engineering and Computer Science, vol. 511, 1999, 38 pages.

\* cited by examiner

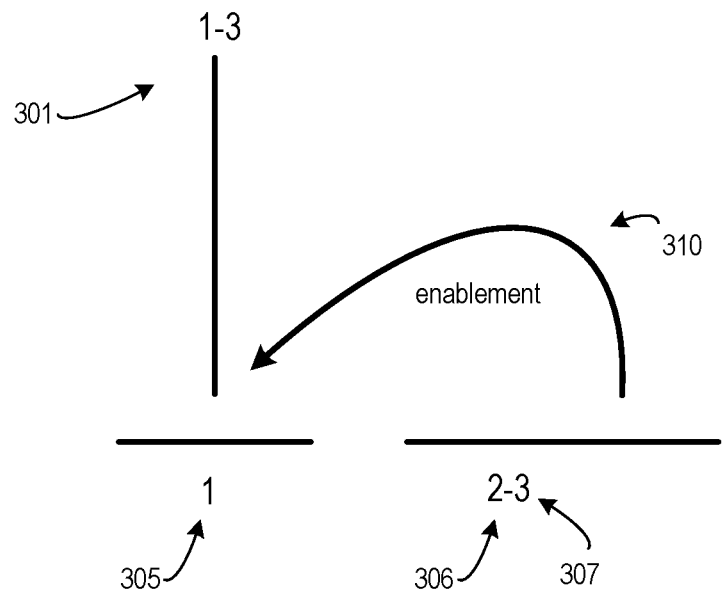
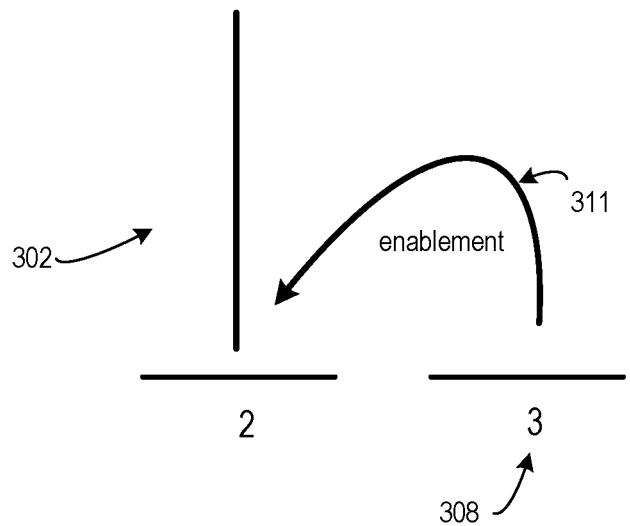
FIG. 3

1500

1501 → Jody:
My daughter Sawyer (10 says I can be come cooler if I don't sing any song out loud for a week.

1502 → Sean:
Hahaha sooo not true!

1503 → Kathleen:
The first complete sentence either one of my kids ever said was "Mom, don't sing!"

1504 → Jessica:
We will always be cool in our own minds or as I tell my kids I was cool once.

1505 → Jody:
I sing all the time out loud, even if at work... I must be SO NOT COOL lol

⋮

1510 → Posted by Agent:
Here's my own list. Please remember that we are here not to kjudge other's choices. The heart and the hairbrush mic wants what it wants. Also this is by no means a comprehensive list. No one possibly has that much time. There are just the first ten that came to mind.
Hard to Say I'm Sorry – Chicago
....

*FIG. 15*

SOCIAL AUTONOMOUS AGENT IMPLEMENTATION USING LATTICE QUERIES AND RELEVANCY DETECTION

CROSS-REFERENCES TO RELATED APPLICATIONS

This application claims the benefit of U.S. Provisional Application No. 62/693,174, filed Jul. 2, 2018, which is incorporated by reference herein in its entirety.

TECHNICAL FIELD

This disclosure is generally concerned with linguistics and more particularly to improved autonomous agents that can appropriately respond to sequences of social media postings.

BACKGROUND

Existing solutions for autonomous agents, or chatbots, have improved in recent years by demonstrating greater intelligence, expressiveness, and ability to handle human language. But existing solutions are not able to present themselves as socially realistic. As such, existing solutions cannot understand a user's social needs and preferences and cannot provide realistic answers to users' questions in a social environment. Therefore users do not perceive the agents as competent social actors and are not as likely to continue to interact with these agents. For example, existing solutions are not able to analyze sequences of text and determine a response to the sequence that is both relevant and is consistent in mental state. Therefore, such solutions are not able to present themselves as socially realistic.

Hence, new solutions are needed.

BRIEF SUMMARY

Techniques are described for computer-generated conversation. In an aspect, a method includes identifying, from a conversation, text posts. Each text post includes text fragments. The method further includes creating, for each text fragment, a syntactic tree. The method further includes creating, for each text fragment, a discourse tree that includes terminal nodes and nonterminal nodes. Each terminal node is associated with a fragment of the respective text and each nonterminal node represents a rhetorical relationship between two of the fragments. The method further includes creating parse thickets. Each parse thicket includes a first discourse tree and first syntactic tree from a first text post and a second discourse tree and second syntactic tree from a second text post. The first text post and a second text post are a unique pair. The parse thicket includes one or more relationships between the first text post and the second text post. The method further includes extracting, from each parse thicket, a common text segment including text that (i) corresponds to a communicative action that is common to the respective first text post and the respective second text post, (ii) corresponds to a rhetorical relation that is common to the respective first text post and the respective second text post, or (iii) has a common verb signature between the respective first text post and a verb in the respective second text post. The method further includes obtaining candidate search results by providing the common text segments to a search engine.

In an aspect, the relationships include one or more of: (i) two nouns represented by fragments in a syntactic tree of the first text post and the syntactic tree of the second text post. The nouns represent a common entity or (ii) a rhetorical relation between fragments in a first discourse tree of the first text post and a second discourse tree of the second text post.

In an aspect, the method further includes determining, for each combination of candidate search result and text post, a candidate parse thicket. The method further includes calculating, from the candidate parse thickets and for each candidate search result, an aggregate similarity score representing a rhetorical similarity of the respective candidate search result to the text posts. The method further includes selecting, as an output, the candidate search result that includes a highest score.

In an aspect, the method further includes determining, from the text posts, a last text post that occurred after the other text posts. The method further includes determining, a first discourse tree for the last text post. The method further includes determining a discourse tree for each candidate search result. The method further includes determining that the first discourse tree includes one or more rhetorical relations of type elaboration and selecting a candidate search result that corresponds to a discourse tree that includes a rhetorical relation of (i) attribution, (ii) contrast, (iii) explanation, or (iv) cause.

In an aspect, the method further includes determining, from the text posts, a text post that occurred after the other text posts. The method further includes determining, a first discourse tree for the last text post. The method further includes determining a discourse tree for each candidate search result. The method further includes determining that the one or more nodes of the first discourse tree includes communicative action and selecting a candidate search result that corresponds to a discourse tree that includes a rhetorical relation of (i) restatement, (ii) confirmation, (iii) attribution, (iv) summary, or (v) evidence.

In an aspect, the method further includes determining, from the text posts, a text post that occurred after the other text posts. The method further includes determining a first discourse tree for the last text post. The method further includes determining a discourse tree for each candidate search result. The method further includes determining that the first discourse tree includes one or more rhetorical relations of type elaboration, joint, or sequence and selecting a candidate search result that includes a node of a discourse tree, the node labeled with communicative actions and does not includes nodes that are labeled with mental actions.

In an aspect, a first text post is an original post on a social media page and a second text post is derivative of the first text post.

In an aspect, the method further includes providing one of the candidate search results to a user interface or transmitting one of the candidate search results to a website.

The above techniques can be implemented in a method, computer instructions stored on a non-transitory computer-readable medium, and/or executed by a processor within a computing system.

BRIEF DESCRIPTION OF THE DRAWINGS

FIG. 3 depicts a further example of a discourse tree in accordance with an aspect.

FIG. 15 illustrates a posting that includes a generated response, in accordance with an aspect.

DETAILED DESCRIPTION

Figure 1:
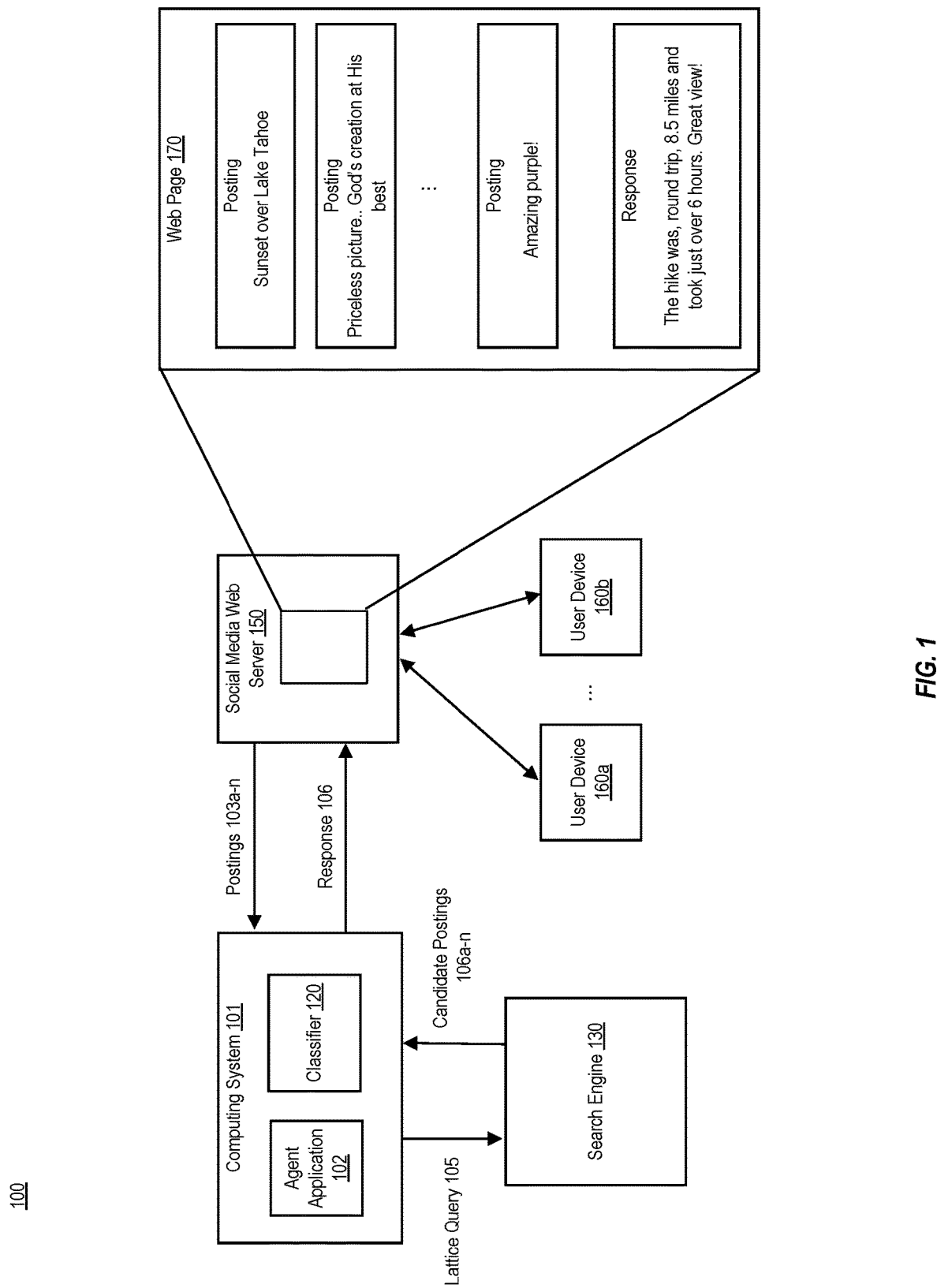
FIG. 1 shows an exemplary social autonomous agent environment, in accordance with an aspect.

Disclosed solutions relate to an autonomous agent (a chatbot) that can determine appropriate socially-relevant responses to a given sequence of text or posts. In particular, the autonomous agent can obtain improved search results for candidate postings by using lattice queries and filter the candidate postings by using linguistics to ensure that a selected candidate posting is both relevant to the original posts and is consistent with the mental state of the original posts. In this way, the agent adapts and maintains an awareness of social context.

Disclosed solutions provide several technical advantages. For example, certain aspects can gather more relevant candidate responses to seed postings (such as a social media post) by forming a lattice query from the seed postings. Additionally, certain aspects use parse thickets to determine topic relevancy of each candidate response. Parse thickets for a particular text are derived from the syntactic tree and discourse tree of the text and are supplement the rhetorical relationship by augmenting discourse trees with communicative action information. Further, certain aspects can ensure an improved match between the mental state of the response and that of the original post by using mental state detection. The mental state of a candidate response is compared with that of the seed posting.

In contrast, while existing solutions for autonomous agents have improved in recent years with improved intelligence, expressiveness, and ability to handle human language, such solutions are not able to present themselves as socially realistic. For example, because such agents cannot understand social needs and preferences for a given user, and cannot provide realistic answers to a user's questions, users do not perceive the agents as competent social actors and are not as likely to continue to interact with these agents.

Certain Definitions

As used herein, "rhetorical structure theory" is an area of research and study that provided a theoretical basis upon which the coherence of a discourse could be analyzed.

As used herein, "discourse tree" or "DT" refers to a structure that represents the rhetorical relations for a sentence of part of a sentence.

As used herein, a "rhetorical relation," "rhetorical relationship," or "coherence relation" or "discourse relation" refers to how two segments of discourse are logically connected to one another. Examples of rhetorical relations include elaboration, contrast, and attribution.

As used herein, a "sentence fragment," or "fragment" is a part of a sentence that can be divided from the rest of the sentence. A fragment is an elementary discourse unit. For example, for the sentence "Dutch accident investigators say that evidence points to pro-Russian rebels as being responsible for shooting down the plane," two fragments are "Dutch accident investigators say that evidence points to pro-Russian rebels" and "as being responsible for shooting down the plane." A fragment can, but need not, include a verb.

As used herein, "signature" or "frame" refers to a property of a verb in a fragment. Each signature can include one or more thematic roles. For example, for the fragment "Dutch accident investigators say that evidence points to pro-Russian rebels," the verb is "say" and the signature of this particular use of the verb "say" could be "agent verb topic" where "investigators" is the agent and "evidence" is the topic.

As used herein, "thematic role" refers to components of a signature used to describe a role of one or more words. Continuing the previous example, "agent" and "topic" are thematic roles.

As used herein, "nuclearity" refers to which text segment, fragment, or span, is more central to a writer's purpose. The nucleus is the more central span, and the satellite is the less central one.

As used herein, "coherency" refers to the linking together of two rhetorical relations.

As used herein, "communicative verb" is a verb that indicates communication. For example, the verb "deny" is a communicative verb.

As used herein, "communicative action" describes an action performed by one or more agents and the subjects of the agents.

FIG. 1 shows an exemplary social autonomous agent environment, in accordance with an aspect. FIG. 1 depicts computing system 101, search engine 130, social media web server 150, user devices 160*a-n*, and web page 170.

Computing system 101 can generate a suitable response to a set of postings. An example of such a process used by computing system 101 is discussed with respect to FIG. 12. Computing system 101 includes agent application 102 and classification model 120. Classification model 120 can be any classification or predictive model. Social media web server 150 hosts web page 170, which is accessible to each of computing system 101 and user device 160*a-n*.

Postings 103*a-n* are generated by user devices 160*a-n* and can originate from social media or another website. For example, the postings include a seed, or first posting, and a subsequent posting (e.g., from another user responding to the seed posting, or from the first user clarifying his initial posting). Agent application 102 derives lattice query 104 from postings 103a-n. The lattice query 104 is provided to search engine 130, enabling improved search results over previous solutions. Search engine 130 outputs candidate postings 106a-n to agent application 102.

Agent application 102 filters the candidate postings 106 based on relevance and/or mental state. For example, to filter based on relevancy, computing system 101 generates a parse thicket for the seed postings 103a-n and for the candidate postings 106a-n. Agent application 102 compares a similarity between each candidate posting 106a-n and each seed posting 103a-n. Based on the comparison, Agent application 102 can determine the candidate posting 106a-n that best matches all of the seed postings in relevancy. Examples of metrics that can be used are sums or weighted sums.

To filter candidate posts based on mental state, agent application 102 can compare a mental state of the seed posting with the mental state of each candidate post. Then, agent application 102 can select the posting with the highest match.

As can be seen, as depicted, web page 170 includes postings. The original posting is a comment about a sunset over lake Tahoe. The posting can include a picture (not depicted). In response, several other users posted responses to the posting. Agent application 102 analyzes the postings as described herein and outputs a response about a hike around lake Tahoe. The response is relevant (the same topic) to the original and subsequent postings, and is also of the same mental state.

Rhetoric Structure Theory and Discourse Trees

Linguistics is the scientific study of language. For example, linguistics can include the structure of a sentence (syntax), e.g., subject-verb-object, the meaning of a sentence (semantics), e.g. dog bites man vs. man bites dog, and what speakers do in conversation, i.e., discourse analysis or the analysis of language beyond the sentence.

The theoretical underpinnings of discourse, Rhetoric Structure Theory (RST), can be attributed to Mann, William and Thompson, Sandra, "Rhetorical structure theory: A Theory of Text organization," Text-Interdisciplinary Journal for the Study of Discourse, 8(3):243-281, 1988. Similar to how the syntax and semantics of programming language theory helped enable modern software compilers, RST helped enabled the analysis of discourse. More specifically RST posits structural blocks on at least two levels, a first level such as nuclearity and rhetorical relations, and a second level of structures or schemas. Discourse parsers or other computer software can parse text into a discourse tree.

Rhetoric Structure Theory models logical organization of text, a structure employed by a writer, relying on relations between parts of text. RST simulates text coherence by forming a hierarchical, connected structure of texts via discourse trees. Rhetoric relations are split into the classes of coordinate and subordinate; these relations hold across two or more text spans and therefore implement coherence. These text spans are called elementary discourse units (EDUs). Clauses in a sentence and sentences in a text are logically connected by the author. The meaning of a given sentence is related to that of the previous and the following sentences. This logical relation between clauses is called the coherence structure of the text. RST is one of the most popular theories of discourse, being based on a tree-like discourse structure, discourse trees (DTs). The leaves of a DT correspond to EDUs, the contiguous atomic text spans. Adjacent EDUs are connected by coherence relations (e.g., Attribution, Sequence), forming higher-level discourse units. These units are then also subject to this relation linking. EDUs linked by a relation are then differentiated based on their relative importance: nuclei are the core parts of the relation, while satellites are peripheral ones. As discussed, in order to determine accurate request-response pairs, both topic and rhetorical agreement are analyzed. When a speaker answers a question, such as a phrase or a sentence, the speaker's answer should address the topic of this question. In the case of an implicit formulation of a question, via a seed text of a message, an appropriate answer is expected not only maintain a topic, but also match the generalized epistemic state of this seed.

Rhetoric Relations

As discussed, aspects described herein use communicative discourse trees. Rhetorical relations can be described in different ways. For example, Mann and Thompson describe twenty-three possible relations. C. Mann, William & Thompson, Sandra. (1987) ("Mann and Thompson"). Rhetorical Structure Theory: A Theory of Text Organization. Other numbers of relations are possible.

| Relation Name | Nucleus | Satellite |
| --- | --- | --- |
| Antithesis | ideas favored by the author | ideas disfavored by the author |
| Background | text whose understanding is being facilitated | text for facilitating understanding |
| Circumstance | text expressing the events or ideas occurring in the interpretive context | an interpretive context of situation or time |
| Concession | situation affirmed by author | situation which is apparently inconsistent but also affirmed by author |
| Condition | action or situation whose occurrence results from the occurrence of the conditioning situation | conditioning situation |
| Elaboration | basic information | additional information |
| Enablement | an action | information intended to aid the reader in performing an action |
| Evaluation | a situation | an evaluative comment about the situation |
| Evidence | a claim | information intended to increase the reader's belief in the claim |
| Interpretation | a situation | an interpretation of the situation |
| Justify | text | information supporting the writer's right to express the text |

| Relation Name | Nucleus | Satellite |
| --- | --- | --- |
| Motivation | an action | information intended to increase the reader's desire to perform the action |
| Non-volitional Cause | a situation | another situation which causes that one, but not by anyone's deliberate action |
| Non-volitional Result | a situation | another situation which is caused by that one, but not by anyone's deliberate action |
| Otherwise (anti conditional) | action or situation whose occurrence results from the lack of occurrence of the conditioning situation | conditioning situation |
| Purpose | an intended situation | the intent behind the situation |
| Restatement | a situation | a reexpression of the situation |
| Solutionhood | a situation or method supporting full or partial satisfaction of the need | a question, request, problem, or other expressed need |
| Summary | text | a short summary of that text |
| Volitional Cause | a situation | another situation which causes that one, by someone's deliberate action |
| Volitional Result | a situation | another situation which is caused by that one, by someone's deliberate action |

Some empirical studies postulate that the majority of text is structured using nucleus-satellite relations. See Mann and Thompson. But other relations do not carry a definite selection of a nucleus. Examples of such relations are shown below.

| Relation Name | Span | Other Span |
| --- | --- | --- |
| Contrast | One alternate (unconstrained) | The other alternate (unconstrained) |
| Joint | | |
| List | An item | A next item |
| Sequence | An item | A next item |

Figure 2:
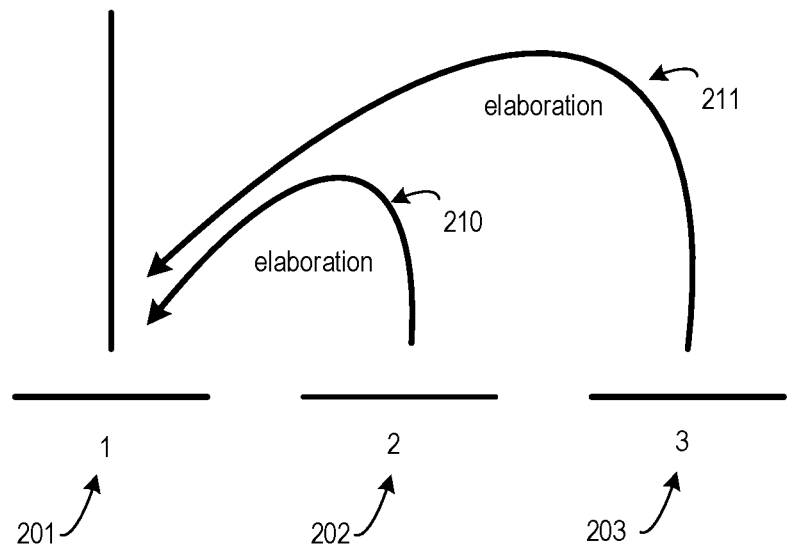
FIG. 2 depicts an example of a discourse tree in accordance with an aspect.

FIG. 2 depicts an example of a discourse tree, in accordance with an aspect. FIG. 2 includes discourse tree 200. Discourse tree includes text span 201, text span 202, text span 203, relation 210 and relation 228. The numbers in FIG. 2 correspond to the three text spans. FIG. 3 corresponds to the following example text with three text spans numbered 1, 2, 3:

1. Honolulu, Hi. will be site of the 2017 Conference on Hawaiian History

2. It is expected that 200 historians from the U.S. and Asia will attend

3. The conference will be concerned with how the Polynesians sailed to Hawaii

For example, relation 210, or elaboration, describes the relationship between text span 201 and text span 202. Relation 228 depicts the relationship, elaboration, between text span 203 and 204. As depicted, text spans 202 and 203 elaborate further on text span 201. In the above example, given a goal of notifying readers of a conference, text span 1 is the nucleus. Text spans 2 and 3 provide more detail about the conference. In FIG. 2, a horizontal number, e.g., 1-3, 1, 2, 3 covers a span of text (possibly made up of further spans); a vertical line signals the nucleus or nuclei; and a curve represents a rhetoric relation (elaboration) and the direction of the arrow points from the satellite to the nucleus. If the text span only functions as a satellite and not as a nuclei, then deleting the satellite would still leave a coherent text. If from FIG. 2 one deletes the nucleus, then text spans 2 and 3 are difficult to understand.

FIG. 3 depicts a further example of a discourse tree in accordance with an aspect. FIG. 3 includes components 301 and 302, text spans 305-307, relation 310 and relation 328. Relation 310 depicts the relationship 310, enablement, between components 306 and 305, and 307, and 305. FIG. 3 refers to the following text spans:

1. The new Tech Report abstracts are now in the journal area of the library near the abridged dictionary.

2. Please sign your name by any means that you would be interested in seeing.

3. Last day for sign-ups is 31 May.

As can be seen, relation 328 depicts the relationship between entity 307 and 306, which is enablement. FIG. 3 illustrates that while nuclei can be nested, there exists only one most nuclear text span.

Constructing a Discourse Tree

Discourse trees can be generated using different methods. A simple example of a method to construct a DT bottom up is:

(1) Divide the discourse text into units by:
  (a) Unit size may vary, depending on the goals of the analysis
  (b) Typically, units are clauses
(2) Examine each unit, and its neighbors. Is there a relation holding between them?
(3) If yes, then mark that relation.
(4) If not, the unit might be at the boundary of a higher-level relation. Look at relations holding between larger units (spans).
(5) Continue until all the units in the text are accounted for.

Figure 4:
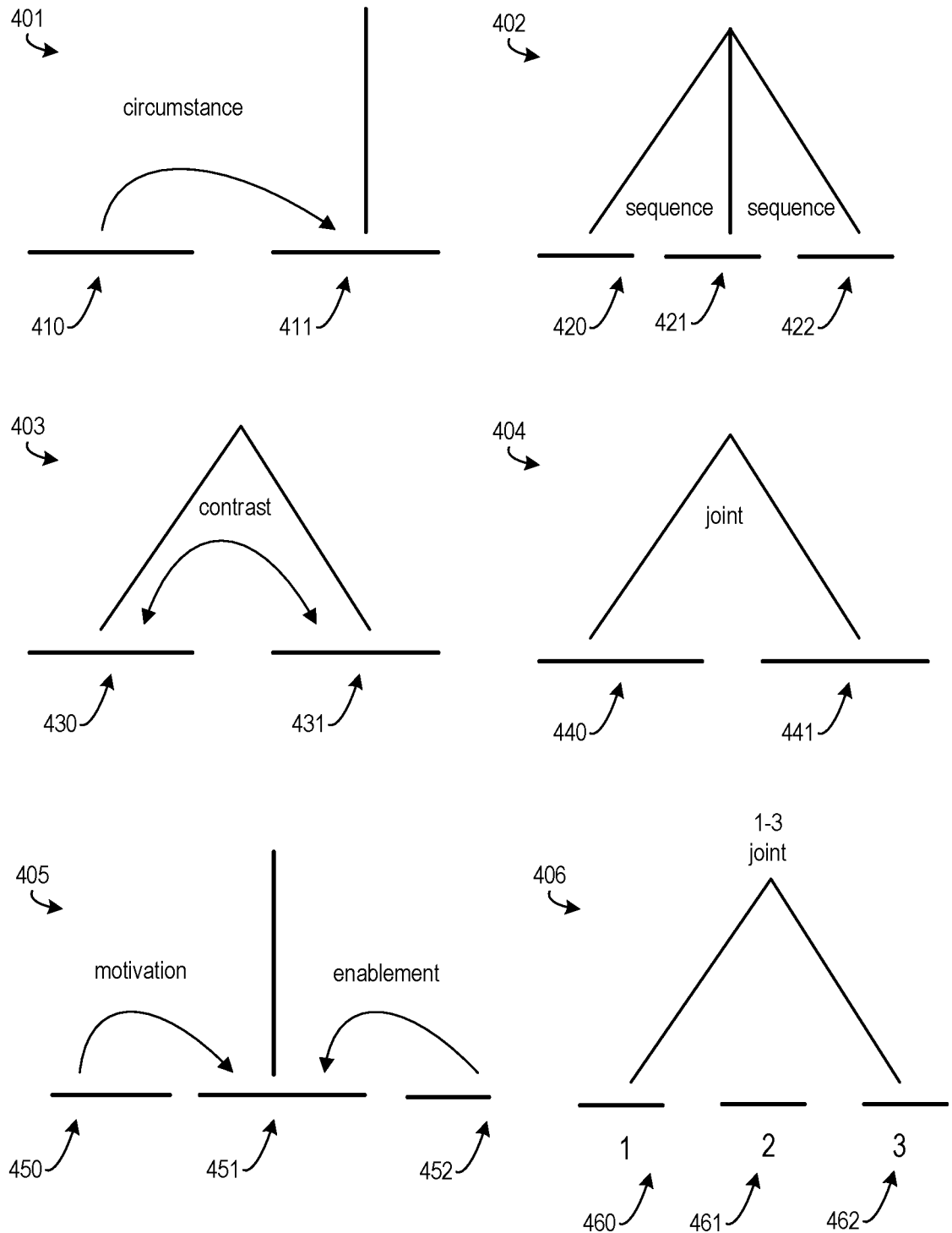
FIG. 4 depicts illustrative schemas, in accordance with an aspect.

Mann and Thompson also describe the second level of building block structures called schemas applications. In RST, rhetoric relations are not mapped directly onto texts; they are fitted onto structures called schema applications, and these in turn are fitted to text. Schema applications are derived from simpler structures called schemas (as shown by FIG. 4). Each schema indicates how a particular unit of text is decomposed into other smaller text units. A rhetorical structure tree or DT is a hierarchical system of schema applications. A schema application links a number of consecutive text spans, and creates a complex text span, which can in turn be linked by a higher-level schema application. RST asserts that the structure of every coherent discourse can be described by a single rhetorical structure tree, whose top schema creates a span encompassing the whole discourse.

FIG. 4 depicts illustrative schemas, in accordance with an aspect. FIG. 4 shows a joint schema is a list of items consisting of nuclei with no satellites. FIG. 4 depicts schemas 401-406. Schema 401 depicts a circumstance relation between text spans 410 and 428. Scheme 402 depicts a sequence relation between text spans 420 and 421 and a sequence relation between text spans 421 and 422. Schema 403 depicts a contrast relation between text spans 430 and 431. Schema 404 depicts a joint relationship between text spans 440 and 441. Schema 405 depicts a motivation relationship between 450 and 451, and an enablement relationship between 452 and 451. Schema 406 depicts joint relationship between text spans 460 and 462. An example of a joint scheme is shown in FIG. 4 for the three text spans below:

1. Skies will be partly sunny in the New York metropolitan area today.
2. It will be more humid, with temperatures in the middle 80's.
3. Tonight will be mostly cloudy, with the low temperature between 65 and 70.

While FIGS. 2-4 depict some graphical representations of a discourse tree, other representations are possible.

Figure 5:
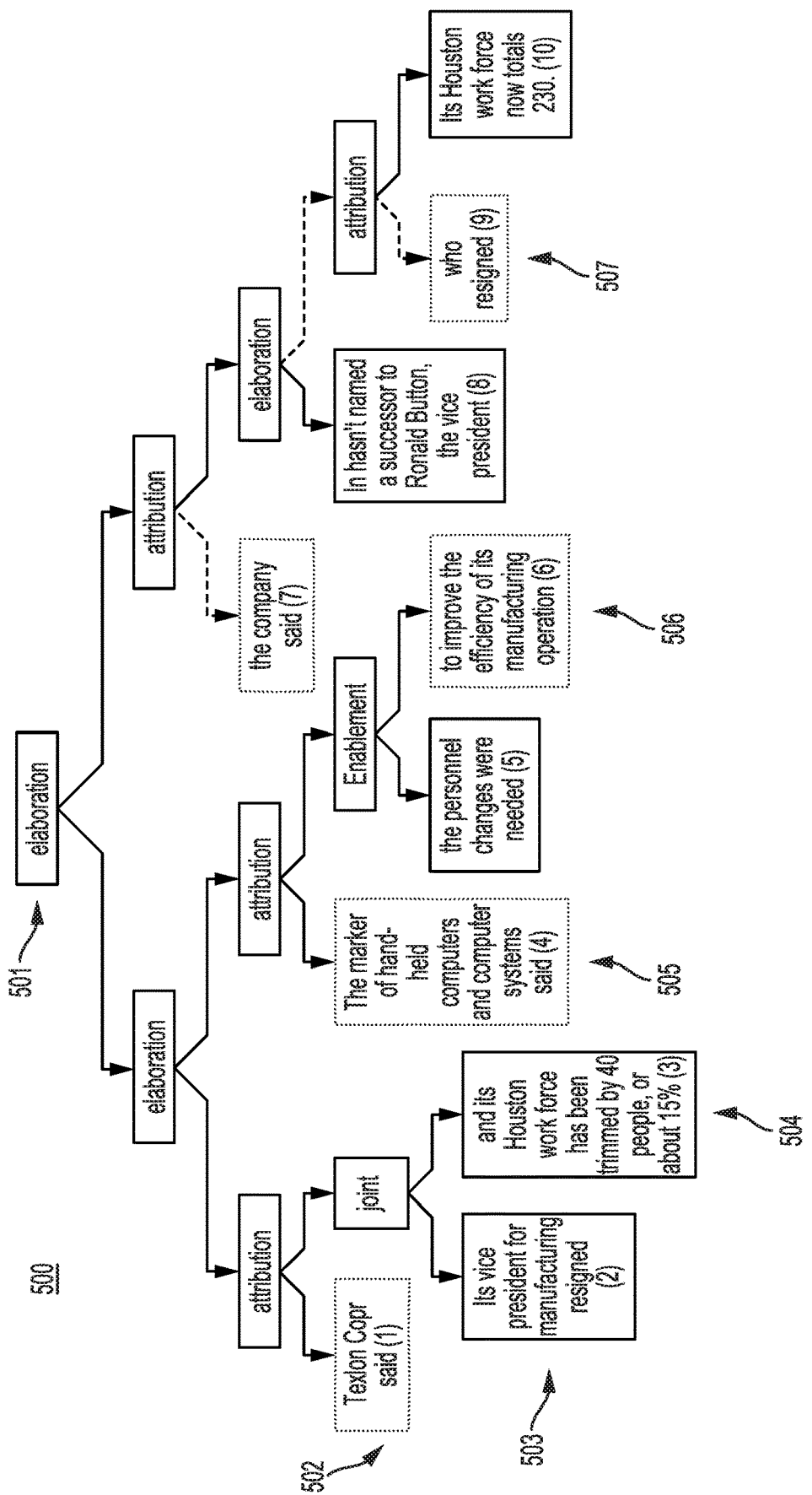
FIG. 5 depicts a node-link representation of the hierarchical binary tree in accordance with an aspect.

FIG. 5 depicts a node-link representation of the hierarchical binary tree in accordance with an aspect. As can be seen from FIG. 5, the leaves of a DT correspond to contiguous non-overlapping text spans called Elementary Discourse Units (EDUs). Adjacent EDUs are connected by relations (e.g., elaboration, attribution . . . ) and form larger discourse units, which are also connected by relations. "Discourse analysis in RST involves two sub-tasks: discourse segmentation is the task of identifying the EDUs, and discourse parsing is the task of linking the discourse units into a labeled tree." See Joty, Shafiq R and Giuseppe Carenini, Raymond T Ng, and Yashar Mehdad. 2013. Combining intra- and multi-sentential rhetorical parsing for document-level discourse analysis. In ACL (1), pages 486-496.

Figure 6:
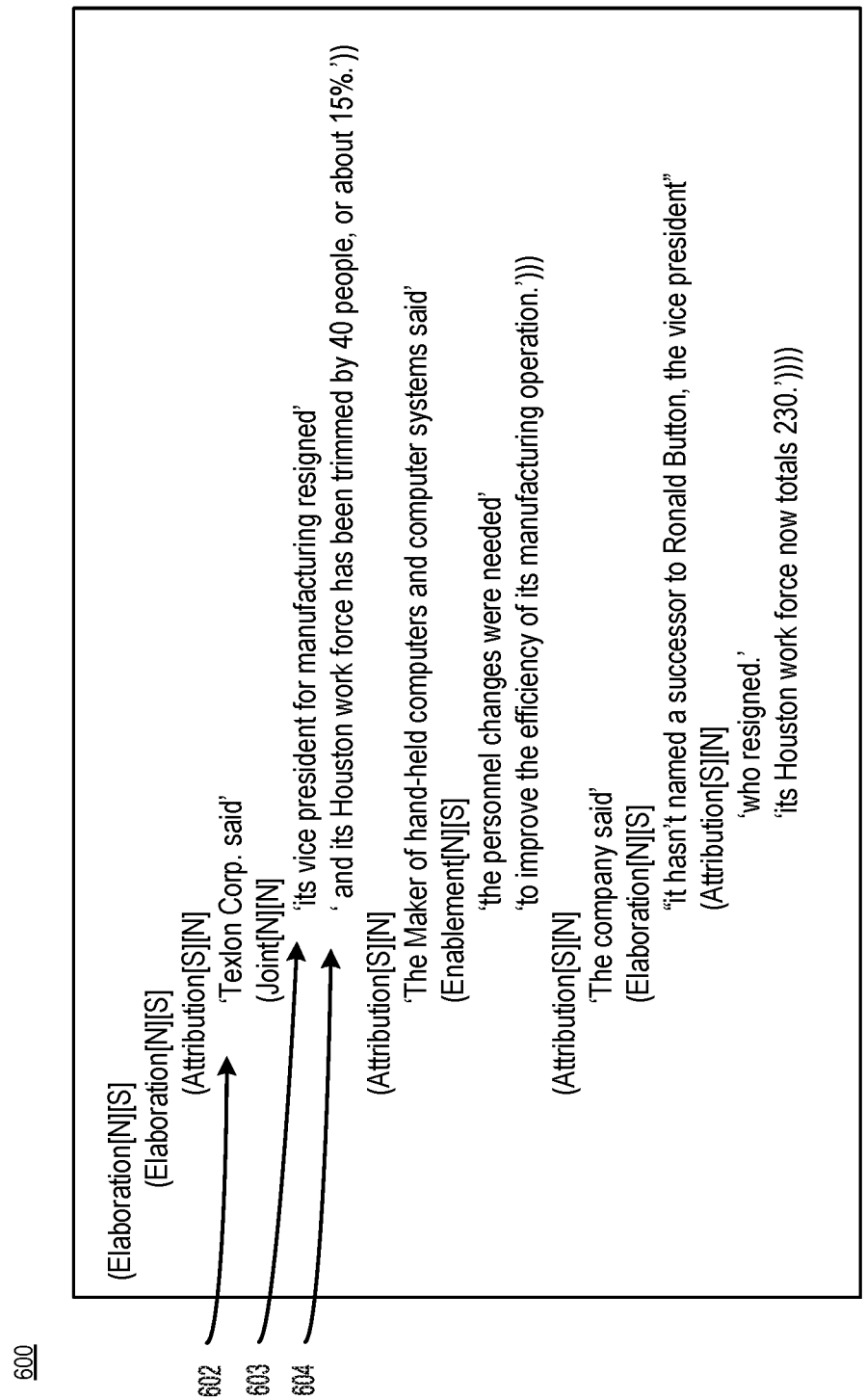
FIG. 6 depicts an exemplary indented text encoding of the representation in FIG. 5 in accordance with an aspect.

FIG. 5 depicts text spans that are leaves, or terminal nodes, on the tree, each numbered in the order they appear in the full text, shown in FIG. 6. FIG. 5 includes tree 500. Tree 500 includes, for example, nodes 501-507. The nodes indicate relationships. Nodes are nonterminal, such as node 501, or terminal, such as nodes 502-507. As can be seen, nodes 503 and 504 are related by a joint relationship. Nodes 502, 505, 506, and 508 are nuclei. The dotted lines indicate that the branch or text span is a satellite. The relations are nodes in gray boxes.

FIG. 6 depicts an exemplary indented text encoding of the representation in FIG. 5 in accordance with an aspect. FIG. 6 includes text 600 and text sequences 602-604. Text 600 is presented in a manner more amenable to computer programming. Text sequence 602 corresponds to node 502, sequence 603 corresponds to node 503, and sequence 604 corresponds to node 504. In FIG. 6, "N" indicates a nucleus and "S" indicates a satellite.

Examples of Discourse Parsers

Automatic discourse segmentation can be performed with different methods. For example, given a sentence, a segmentation model identifies the boundaries of the composite elementary discourse units by predicting whether a boundary should be inserted before each particular token in the sentence. For example, one framework considers each token in the sentence sequentially and independently. In this framework, the segmentation model scans the sentence token by token, and uses a binary classifier, such as a support vector machine or logistic regression, to predict whether it is appropriate to insert a boundary before the token being examined. In another example, the task is a sequential labeling problem. Once text is segmented into elementary discourse units, sentence-level discourse parsing can be performed to construct the discourse tree. Machine learning techniques can be used.

In one aspect of the present invention, two Rhetorical Structure Theory (RST) discourse parsers are used: CoreNLPProcessor which relies on constituent syntax, and FastNLPProcessor which uses dependency syntax. See Surdeanu, Mihai & Hicks, Thomas & Antonio Valenzuela-Escarcega, Marco. Two Practical Rhetorical Structure Theory Parsers. (2015).

In addition, the above two discourse parsers, i.e., CoreNLPProcessor and FastNLPProcessor use Natural Language Processing (NLP) for syntactic parsing. For example, the Stanford CoreNLP gives the base forms of words, their parts of speech, whether they are names of companies, people, etc., normalize dates, times, and numeric quantities, mark up the structure of sentences in terms of phrases and syntactic dependencies, indicate which noun phrases refer to the same entities. Practically, RST is a still theory that may work in many cases of discourse, but in some cases, it may not work. There are many variables including, but not limited to, what EDU's are in a coherent text, i.e., what discourse segmenters are used, what relations inventory is used and what relations are selected for the EDUs, the corpus of documents used for training and testing, and even what parsers are used. So for example, in Surdeanu, et al., "Two Practical Rhetorical Structure Theory Parsers," paper cited above, tests must be run on a particular corpus using specialized metrics to determine which parser gives better performance. Thus unlike computer language parsers which give predictable results, discourse parsers (and segmenters) can give unpredictable results depending on the training and/or test text corpus. Thus, discourse trees are a mixture of the predicable arts (e.g., compilers) and the unpredictable arts (e.g., like chemistry were experimentation is needed to determine what combinations will give you the desired results).

In order to objectively determine how good a Discourse analysis is, a series of metrics are being used, e.g., Precision/Recall/F1 metrics from Daniel Marcu, "The Theory and Practice of Discourse Parsing and Summarization," MIT Press, (2000). Precision, or positive predictive value is the fraction of relevant instances among the retrieved instances, while recall (also known as sensitivity) is the fraction of relevant instances that have been retrieved over the total amount of relevant instances. Both precision and recall are therefore based on an understanding and measure of relevance. Suppose a computer program for recognizing dogs in photographs identifies eight dogs in a picture containing 12 dogs and some cats. Of the eight dogs identified, five actually are dogs (true positives), while the rest are cats (false positives). The program's precision is $5/8$ while its recall is $5/12$. When a search engine returns 30 pages only 20 of which were relevant while failing to return 40 additional relevant pages, its precision is $20/30=2/3$ while its recall is $20/60=1/3$. Therefore, in this case, precision is 'how useful the search results are', and recall is 'how complete the results are.'" The F1 score (also F-score or F-measure) is a measure of a test's accuracy. It considers both the precision and the recall of the test to compute the score: F1=2×((precision×recall)/(precision+recall)) and is the harmonic mean of precision and recall. The F1 score reaches its best value at 1 (perfect precision and recall) and worst at 0.

Autonomous Agents or Chatbots

A conversation between Human A and Human B is a form of discourse. For example, applications exist such as FaceBook® Messenger, WhatsApp®, Slack,® SMS, etc., a conversation between A and B may typically be via messages in addition to more traditional email and voice conversations. A chatbot (which may also be called intelligent bots or virtual assistant, etc.) is an "intelligent" machine that, for example, replaces human B and to various degrees mimics the conversation between two humans. An example ultimate goal is that human A cannot tell whether B is a human or a machine (the Turning test, developed by Alan Turing in 1950). Discourse analysis, artificial intelligence, including machine learning, and natural language processing, have made great strides toward the long-term goal of passing the Turing test. Of course, with computers being more and more capable of searching and processing vast repositories of data and performing complex analysis on the data to include predictive analysis, the long-term goal is the chatbot being human-like and a computer combined.

For example, users can interact with the Intelligent Bots Platform through a conversational interaction. This interaction, also called the conversational user interface (UI), is a dialog between the end user and the chatbot, just as between two human beings. It could be as simple as the end user saying "Hello" to the chatbot and the chatbot responding with a "Hi" and asking the user how it can help, or it could be a transactional interaction in a banking chatbot, such as transferring money from one account to the other, or an informational interaction in a HR chatbot, such as checking for vacation balance, or asking an FAQ in a retail chatbot, such as how to handle returns. Natural language processing (NLP) and machine learning (ML) algorithms combined with other approaches can be used to classify end user intent. An intent at a high level is what the end user would like to accomplish (e.g., get account balance, make a purchase). An intent is essentially, a mapping of customer input to a unit of work that the backend should perform. Therefore, based on the phrases uttered by the user in the chatbot, these are mapped that to a specific and discrete use case or unit of work, for e.g. check balance, transfer money and track spending are all "use cases" that the chatbot should support and be able to work out which unit of work should be triggered from the free text entry that the end user types in a natural language.

The underlying rational for having an AI chatbot respond like a human is that the human brain can formulate and understand the request and then give a good response to the human request much better than a machine. Thus, there should be significant improvement in the request/response of a chatbot, if human B is mimicked. So an initial part of the problem is how does the human brain formulate and understand the request? To mimic, a model is used. RST and DT allow a formal and repeatable way of doing this.

At a high level, there are typically two types of requests: (1) A request to perform some action; and (2) a request for information, e.g., a question. The first type has a response in which a unit of work is created. The second type has a response that is, e.g., a good answer, to the question. The answer could take the form of, for example, in some aspects, the AI constructing an answer from its extensive knowledge base(s) or from matching the best existing answer from searching the internet or intranet or other publically/privately available data sources.

Communicative Discourse Trees and the Rhetoric Classifier

Aspects of the present disclosure build communicative discourse trees and use communicative discourse trees to analyze whether the rhetorical structure of a request or question agrees with an answer. More specifically, aspects described herein create representations of a request-response pair, learns the representations, and relates the pairs into classes of valid or invalid pairs. In this manner, an autonomous agent can receive a question from a user, process the question, for example, by searching for multiple answers, determine the best answer from the answers, and provide the answer to the user.

More specifically, to represent linguistic features of text, aspects described herein use rhetoric relations and speech acts (or communicative actions). Rhetoric relations are relationships between the parts of the sentences, typically obtained from a discourse tree. Speech acts are obtained as verbs from a verb resource such as VerbNet. By using both rhetoric relations and communicative actions, aspects described herein can correctly recognize valid request-response pairs. To do so, aspects correlate the syntactic structure of a question with that of an answer. By using the structure, a better answer can be determined.

For example, when an autonomous agent receives an indication from a person that the person desires to sell an item with certain features, the autonomous agent should provide a search result that not only contains the features but also indicates an intent to buy. In this manner, the autonomous agent has determined the user's intent. Similarly, when an autonomous agent receives a request from a person to share knowledge about a particular item, the search result should contain an intent to receive a recommendation. When a person asks an autonomous agent for an opinion about a subject, the autonomous agent shares an opinion about the subject, rather than soliciting another opinion.

Analyzing Request and Response Pairs

Figure 7:
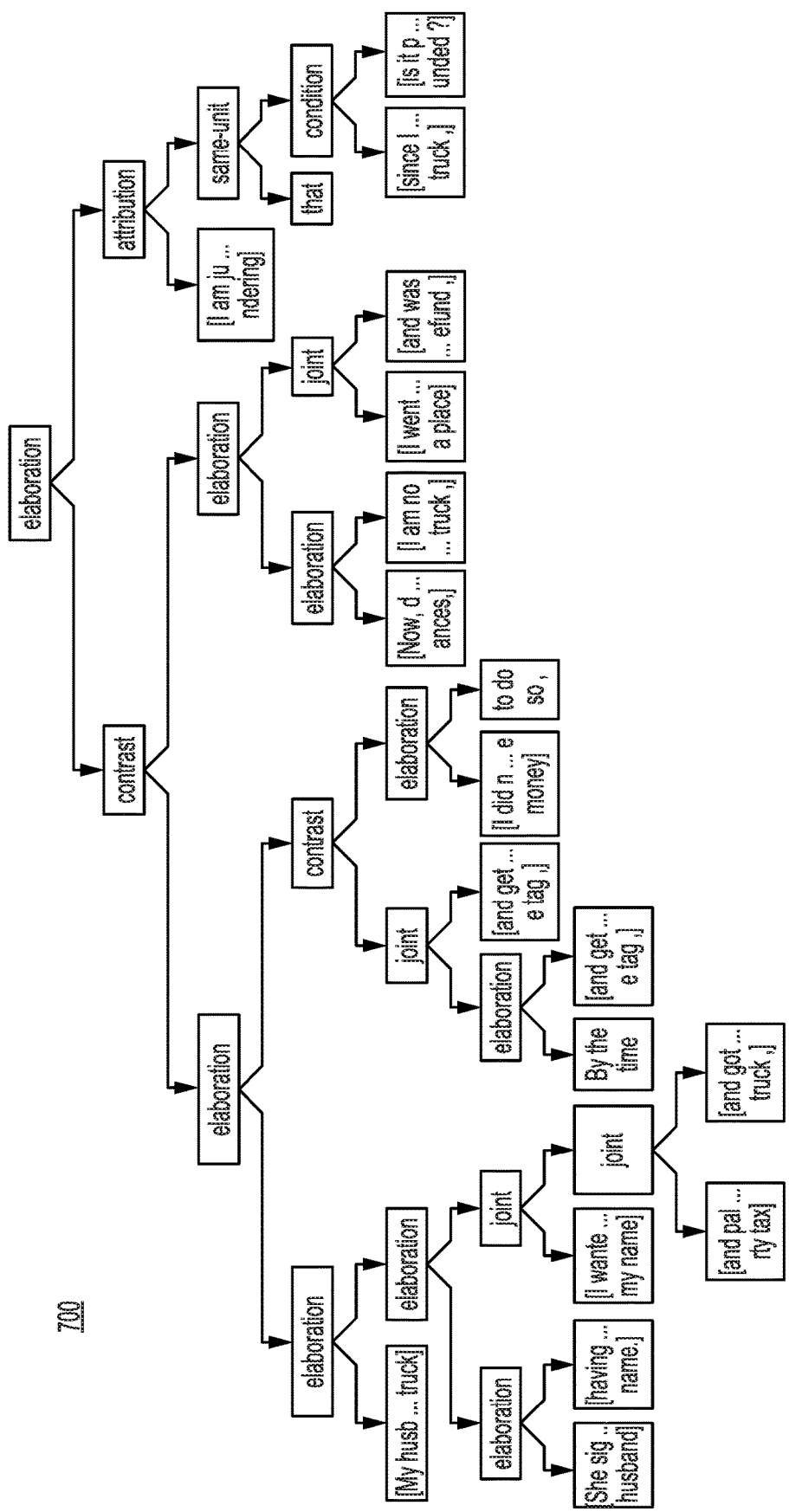
FIG. 7 depicts an exemplary DT for an example request about property tax in accordance with an aspect.

FIG. 7 depicts an exemplary DT for an example request about property tax in accordance with an aspect. The node labels are the relations and the arrowed line points to the satellite. The nucleus is a solid line. FIG. 7 depicts the following text.

Request: "My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund. I am just wondering that since I am not going to have a tag on this truck, is it possible to get the property tax refunded?"

Response: "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax. If you apply late, there will be penalties on top of the normal taxes and fees. You don't need to register it at the same time, but you absolutely need to title it within the period of time stipulated in state law."

As can be seen in FIG. 7, analyzing the above text results in the following. "My husbands' grandmother gave him his grandfather's truck" is elaborated by "She signed the title over but due to my husband" elaborated by "having unpaid fines on his license, he was not able to get the truck put in his name." which is elaborated by "I wanted to put in my name," "and paid the property tax", and "and got insurance for the truck."

"My husbands' grandmother gave him his grandfather's truck. She signed the title over but due to my husband having unpaid fines on his license, he was not able to get the truck put in his name. I wanted to put in my name and paid the property tax and got insurance for the truck." is elaborated by;

"I didn't have the money" elaborated by "to do so" contrasted with

By the time" elaborated by "it came to sending off the title"

"and getting the tag"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so" is contrasted with "Now, due to circumstances," elaborated with "I am not going to be able to afford the truck." which is elaborated with "I went to the insurance place"

"and was refused a refund"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund." is elaborated with "I am just wondering that since I am not going to have a tag on this truck, is it possible to get the property tax refunded?"

"I am just wondering" has attribution to

"that" is the same unit as "is it possible to get the property tax refunded?" which has condition "since I am not going to have a tag on this truck"

As can be seen, the main subject of the topic is "Property tax on a car". The question includes the contradiction: on one hand, all properties are taxable, and on the other hand, the ownership is somewhat incomplete. A good response has to address both topic of the question and clarify the inconsistency. To do that, the responder is making even stronger claim concerning the necessity to pay tax on whatever is owned irrespectively of the registration status. This example is a member of positive training set from our Yahoo! Answers evaluation domain. The main subject of the topic is "Property tax on a car". The question includes the contradiction: on one hand, all properties are taxable, and on the other hand, the ownership is somewhat incomplete. A good answer/response has to address both topic of the question and clarify the inconsistency. The reader can observe that since the question includes rhetoric relation of contrast, the answer has to match it with a similar relation to be convincing. Otherwise, this answer would look incomplete even to those who are not domain experts.

Figure 8:
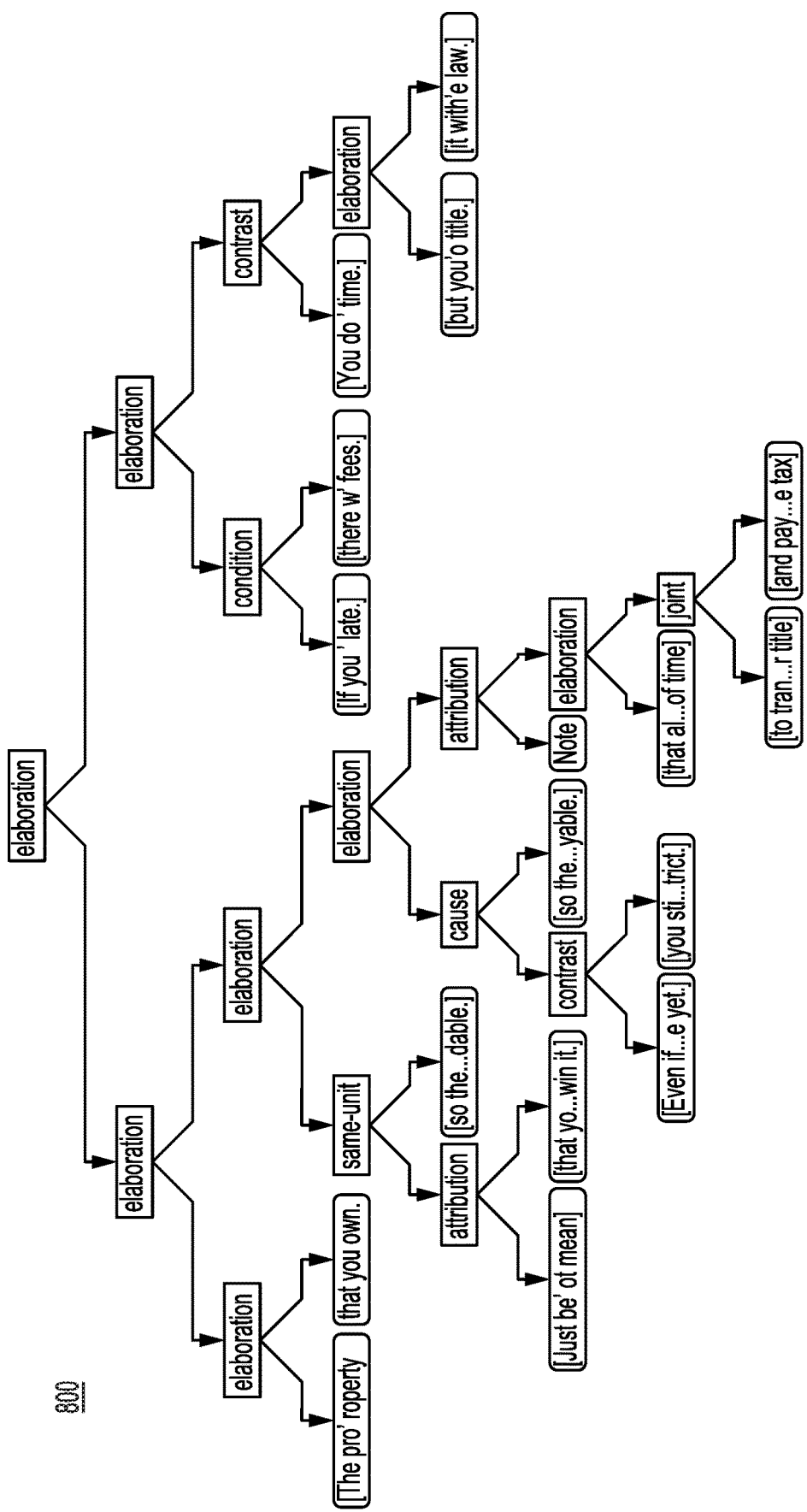
FIG. 8 depicts an exemplary response for the question represented in FIG. 7.

FIG. 8 depicts an exemplary response for the question represented in FIG. 7, according to certain aspects of the present invention. The central nucleus is "the property tax is assessed on property" elaborated by "that you own". "The property tax is assessed on property that you own" is also a nucleus elaborated by "Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax."

The nucleus "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax." is elaborated by "there will be penalties on top of the normal taxes and fees" with condition "If you apply late," which in turn is elaborated by the contrast of "but you absolutely need to title it within the period of time stipulated in state law." and "You don't need to register it at the same time.".

Comparing the DT of FIG. 7 and DT of FIG. 8, enables a determination of how well matched the response (FIG. 8) is to the request (FIG. 7). In some aspects of the present invention, the above framework is used, at least in part, to determine the DTs for the request/response and the rhetoric agreement between the DTs.

In another example, the question "What does The Investigative Committee of the Russian Federation do" has at least two answers, for example, an official answer or an actual answer.

Figure 9:
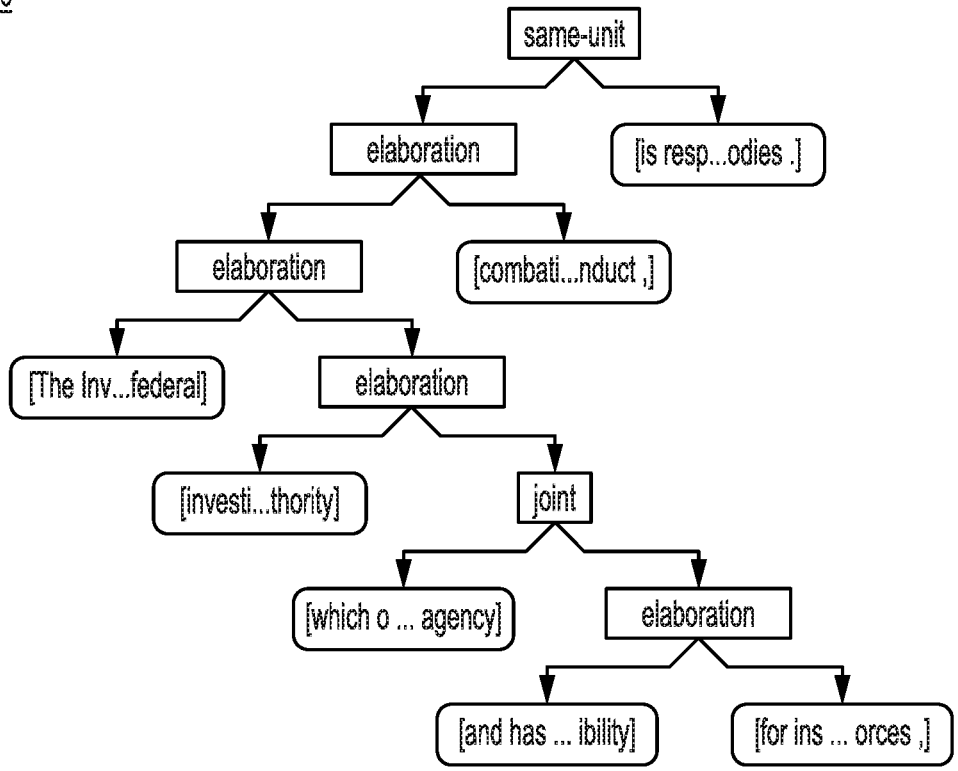
FIG. 9 illustrates a discourse tree for an official answer in accordance with an aspect.

FIG. 9 illustrates a discourse tree for an official answer in accordance with an aspect. As depicted in FIG. 9, an official answer, or mission statement states that "The Investigative Committee of the Russian Federation is the main federal investigating authority which operates as Russia's Anti-corruption agency and has statutory responsibility for inspecting the police forces, combating police corruption and police misconduct, is responsible for conducting investigations into local authorities and federal governmental bodies."

Figure 10:
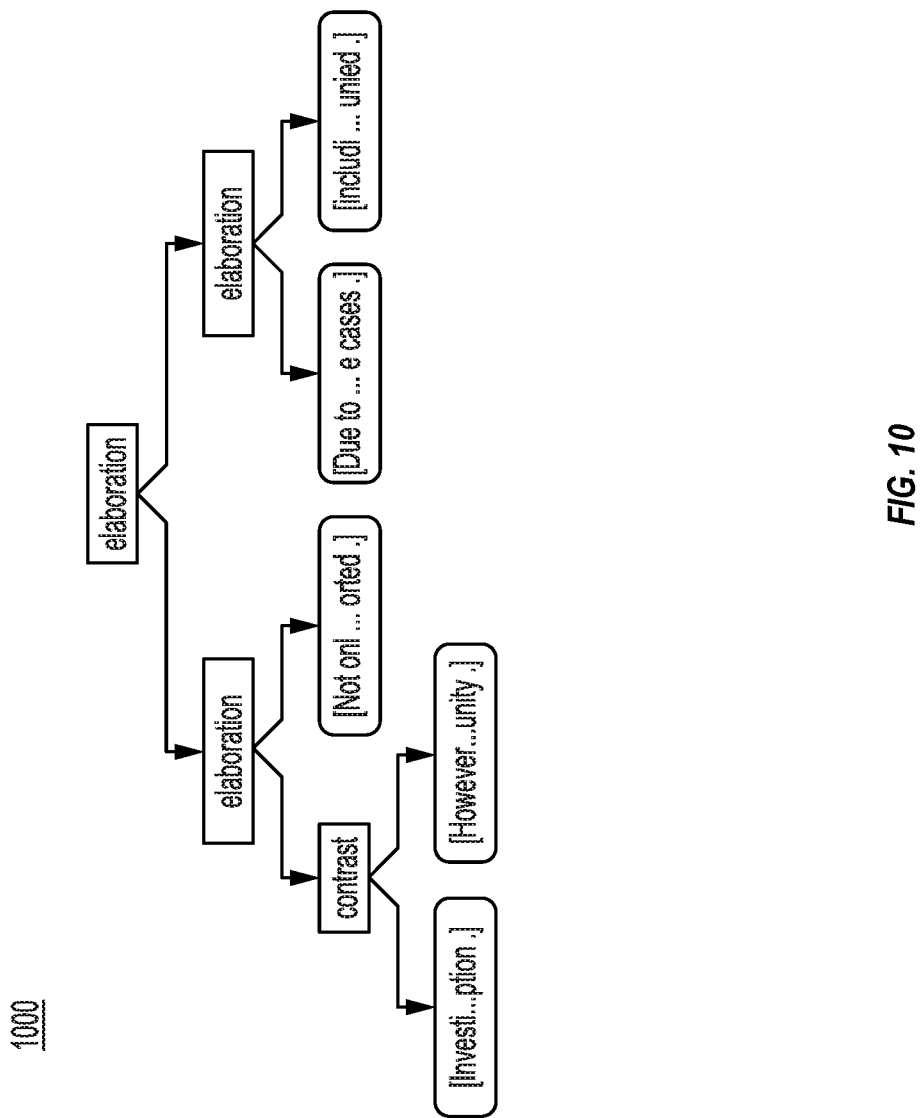
FIG. 10 illustrates a discourse tree for a raw answer in accordance with an aspect.

FIG. 10 illustrates a discourse tree for a raw answer in accordance with an aspect. As depicted in FIG. 10, another, perhaps more honest, answer states that "Investigative Committee of the Russian Federation is supposed to fight corruption. However, top-rank officers of the Investigative Committee of the Russian Federation are charged with creation of a criminal community. Not only that, but their involvement in large bribes, money laundering, obstruction of justice, abuse of power, extortion, and racketeering has been reported. Due to the activities of these officers, dozens of high-profile cases including the ones against criminal lords had been ultimately ruined."

The choice of answers depends on context. Rhetoric structure allows differentiating between "official", "politically correct", template-based answers and "actual", "raw", "reports from the field", or "controversial" answers. (See FIG. 9 and FIG. 10). Sometimes, the question itself can give a hint about which category of answers is expected. If a question is formulated as a factoid or definitional one, without a second meaning, then the first category of answers is suitable. Otherwise, if a question has the meaning "tell me what it really is", then the second category is appropriate. In general, after extracting a rhetoric structure from a question, selecting a suitable answer that would have a similar, matching, or complementary rhetoric structure is easier.

The official answer is based on elaboration and joints, which are neutral in terms of controversy a text might contain (See FIG. 9). At the same time, the row answer includes the contrast relation. This relation is extracted between the phrase for what an agent is expected to do and what this agent was discovered to have done.

Classification of Request-Response Pairs

Agent application 102 can determine whether a given answer or response, such as an answer obtained from answer database 105 or a public database, is responsive to a given question, or request. More specifically, agent application 102 analyzes whether a request and response pair is correct or incorrect by determining one or both of (i) relevance or (ii) rhetoric agreement between the request and the response. Rhetoric agreement can be analyzed without taking into account relevance, which can be treated orthogonally.

Agent application 102 can determine similarity between question-answer pairs using different methods. For example, agent application 102 can determine level of similarity between an individual question and an individual answer. Alternatively, agent application 102 can determine a measure of similarity between a first pair including a question and an answer, and a second pair including a question and answer.

For example, agent application 102 uses classifier 120 trained to predict matching or non-matching answers. Agent application 102 can process two pairs at a time, for example <q1, a1> and <q2, a2>. Agent application 102 compares q1 with q2 and a1 with a1, producing a combined similarity score. Such a comparison allows a determination of whether an unknown question/answer pair contains a correct answer or not by assessing a distance from another question/answer pair with a known label. In particular, an unlabeled pair <q2, a2> can be processed so that rather than "guessing" correctness based on words or structures shared by q2 and a2, both q2 and a2 can be compared with their corresponding components q1 and a2 of the labeled pair <q2, a2> on the grounds of such words or structures. Because this approach targets a domain-independent classification of an answer, only the structural cohesiveness between a question and answer can be leveraged, not 'meanings' of answers.

In an aspect, agent application 102 uses training data 125 to train classifier 120. In this manner, classifier 120 is trained to determine a similarity between pairs of questions and answers. This is a classification problem. Training data 125 can include a positive training set and a negative training set. Training data 125 includes matching request-response pairs in a positive dataset and arbitrary or lower relevance or appropriateness request-response pairs in a negative dataset. For the positive dataset, various domains with distinct acceptance criteria are selected that indicate whether an answer or response is suitable for the question.

Each training data set includes a set of training pairs. Each training set includes a question communicative discourse tree that represents a question and an answer communicative discourse tree that represents an answer and an expected level of complementarity between the question and answer. By using an iterative process, agent application 102 provides a training pair to classifier 120 and receives, from the model, a level of complementarity. Agent application 102 calculates a loss function by determining a difference between the determined level of complementarity and an expected level of complementarity for the particular training pair. Based on the loss function, agent application 102 adjusts internal parameters of the classification model to minimize the loss function.

Acceptance criteria can vary by application. For example, acceptance criteria may be low for community question answering, automated question answering, automated and manual customer support systems, social network communications and writing by individuals such as consumers about their experience with products, such as reviews and complaints. RR acceptance criteria may be high in scientific texts, professional journalism, health and legal documents in the form of FAQ, professional social networks such as "stackoverflow."

Representing Rhetoric Relations and Communicative Actions

In order to compute similarity between abstract structures, two approaches are frequently used: (1) representing these structures in a numerical space, and express similarity as a number, which is a statistical learning approach, or (2) using a structural representation, without numerical space, such as trees and graphs, and expressing similarity as a maximal common sub-structure. Expressing similarity as a maximal common sub-structure is referred to as generalization.

Learning communicative actions helps express and understand arguments. Computational verb lexicons help support acquisition of entities for actions and provide a rule-based form to express their meanings. Verbs express the semantics of an event being described as well as the relational information among participants in that event, and project the syntactic structures that encode that information. Verbs, and in particular communicative action verbs, can be highly variable and can display a rich range of semantic behaviors. In response, verb classification helps a learning systems to deal with this complexity by organizing verbs into groups that share core semantic properties.

VerbNet is one such lexicon, which identifies semantic roles and syntactic patterns characteristic of the verbs in each class and makes explicit the connections between the syntactic patterns and the underlying semantic relations that can be inferred for all members of the class. See Karin Kipper, Anna Korhonen, Neville Ryant and Martha Palmer, *Language Resources and Evaluation*, Vol. 42, No. 1 (March 2008), at 21. Each syntactic frame, or verb signature, for a class has a corresponding semantic representation that details the semantic relations between event participants across the course of the event.

For example, the verb amuse is part of a cluster of similar verbs that have a similar structure of arguments (semantic roles) such as amaze, anger, arouse, disturb, and irritate. The roles of the arguments of these communicative actions are as follows: Experiencer (usually, an animate entity), Stimulus, and Result. Each verb can have classes of meanings differentiated by syntactic features for how this verb occurs in a sentence, or frames. For example, the frames for amuse are as follows, using the following key noun phrase (NP), noun (N), communicative action (V), verb phrase (VP), adverb (ADV):

NP V NP. Example: "The teacher amused the children." Syntax: Stimulus V Experiencer. Clause: amuse(Stimulus, E, Emotion, Experiencer), cause(Stimulus, E), emotional_state(result(E), Emotion, Experiencer).

NP V ADV-Middle. Example: "Small children amuse quickly." Syntax: Experiencer V ADV. Clause: amuse(Experiencer, Prop):-, property(Experiencer, Prop), adv(Prop).

NP V NP-PRO-ARB. Example "The teacher amused." Syntax Stimulus V. amuse(Stimulus, E, Emotion, Experiencer):. cause(Stimulus, E), emotional_state(result(E), Emotion, Experiencer).

NP.cause V NP. Example "The teacher's dolls amused the children." syntax Stimulus <+genitive> ('s) V Experiencer. amuse(Stimulus, E, Emotion, Experiencer):. cause(Stimulus, E), emotional_state(during(E), Emotion, Experiencer).

NP V NP ADJ. Example "This performance bored me totally." syntax Stimulus V Experiencer Result. amuse(Stimulus, E, Emotion, Experiencer). cause(Stimulus, E), emotional_state(result(E), Emotion, Experiencer), Pred(result(E), Experiencer).

Communicative actions can be characterized into clusters, for example:
Verbs with Predicative Complements (Appoint, characterize, dub, declare, conjecture, masquerade, orphan, captain, consider, classify), Verbs of Perception (See, sight, peer). Verbs of Psychological State (Amuse, admire, marvel, appeal), Verbs of Desire (Want, long).
Judgment Verbs (Judgment), Verbs of Assessment (Assess, estimate), Verbs of Searching (Hunt, search, stalk, investigate, rummage, ferret), Verbs of Social Interaction (Correspond, marry, meet, battle), Verbs of Communication (Transfer(message), inquire, interrogate, tell, manner(speaking), talk, chat, say, complain, advise, confess, lecture, overstate, promise). Avoid Verbs (Avoid), Measure Verbs, (Register, cost, fit, price, bill), Aspectual Verbs (Begin, complete, continue, stop, establish, sustain.

Aspects described herein provide advantages over statistical learning models. In contrast to statistical solutions, aspects use a classification system can provide a verb or a verb-like structure which is determined to cause the target feature (such as rhetoric agreement). For example, statistical machine learning models express similarity as a number, which can make interpretation difficult.

Parse Thickets

Representing request-response pairs facilitates classification based operations based on a pair. In an example, request-response pairs can be represented as parse thickets. A parse thicket is a representation of parse trees for two or more sentences with discourse-level relationships between words and parts of the sentence in one graph. See Galitsky 2015. Topical similarity between question and answer can be expressed as common sub-graphs of parse thickets. The higher the number of common graph nodes, the higher the similarity.

Figure 11:
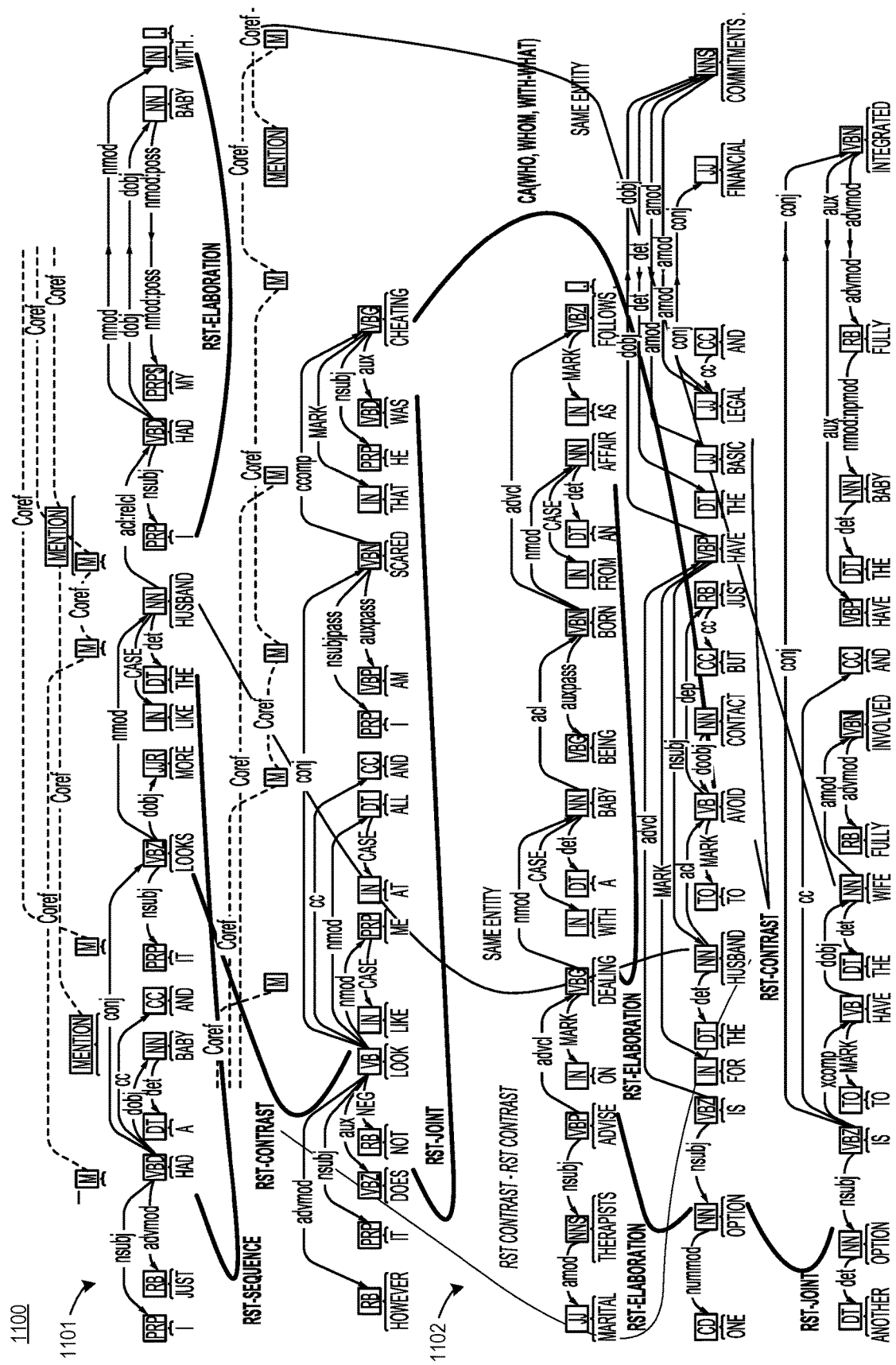
FIG. 11 illustrates parse thickets in accordance with an aspect.

FIG. 11 illustrates parse thickets in accordance with an aspect. FIG. 11 depicts parse thicket 1100 including a parse tree for a request 1101, and a parse tree for a corresponding response 1102.

Parse tree 1101 represents the question "I just had a baby and it looks more like the husband I had my baby with. However it does not look like me at all and I am scared that he was cheating on me with another lady and I had her kid. This child is the best thing that has ever happened to me and I cannot imagine giving my baby to the real mom."

Response 1102 represents the response "Marital therapists advise on dealing with a child being born from an affair as follows. One option is for the husband to avoid contact but just have the basic legal and financial commitments. Another option is to have the wife fully involved and have the baby fully integrated into the family just like a child from a previous marriage."

Parse thicket 1100 represents a greedy approach to representing linguistic information about a paragraph of text. The straight edges of this graph are syntactic relations, and curvy arcs are discourse relations, such as anaphora, same entity, sub-entity, rhetoric relation and communicative actions. The solid arcs are for same entity/sub-entity/anaphora relations, and the dotted arcs are for rhetoric relations and communicative actions. Oval labels in straight edges denote the syntactic relations. Lemmas are written in the boxes for the nodes, and lemma forms are written on the right side of the nodes.

Parse thicket 1100 includes much richer information than just a combination of parse trees for individual sentences. Navigation through this graph along the edges for syntactic relations as well as arcs for discourse relations allows to transform a given parse thicket into semantically equivalent forms for matching with other parse thickets, performing a text similarity assessment task. To form a complete formal representation of a paragraph, as many links as possible are expressed. Each of the discourse arcs produces a pair of thicket phrases that can be a potential match.

Topical similarity between the seed (request) and response is expressed as common sub-graphs of parse thickets. They are visualized as connected clouds. The higher the number of common graph nodes, the higher the similarity. For rhetoric agreement, common sub-graph does not have to be large as it is in the given text. However, rhetoric relations and communicative actions of the seed and response are correlated and a correspondence is required.

Generalization for Communicative Actions

A similarity between two communicative actions $A_1$ and $A_2$ is defined as a an abstract verb which possesses the features which are common between $A_1$ and $A_2$. Defining a similarity of two verbs as an abstract verb-like structure supports inductive learning tasks, such as a rhetoric agreement assessment. In an example, a similarity between the following two common verbs, agree and disagree, can be generalized as follows: agree^disagree=verb(Interlocutor, Proposed_action, Speaker), where Interlocution is the person who proposed the Proposed_action to the Speaker and to whom the Speaker communicates their response. Proposed_action is an action that the Speaker would perform if they were to accept or refuse the request or offer, and The Speaker is the person to whom a particular action has been proposed and who responds to the request or offer made.

In a further example, a similarity between verbs agree and explain is represented as follows: agree^explain=verb(Interlocutor, *, Speaker). The subjects of communicative actions are generalized in the context of communicative actions and are not be generalized with other "physical" actions. Hence, aspects generalize individual occurrences of communicative actions together with corresponding subjects.

Additionally, sequences of communicative actions representing dialogs can be compared against other such sequences of similar dialogs. In this manner, the meaning of an individual communicative action as well as the dynamic discourse structure of a dialogue is (in contrast to its static structure reflected via rhetoric relations) is represented. A generalization is a compound structural representation that happens at each level. Lemma of a communicative action is generalized with lemma, and its semantic role are generalized with respective semantic role.

Communicative actions are used by text authors to indicate a structure of a dialogue or a conflict. See Searle, J. R. 1969, Speech acts: an essay in the philosophy of language. London: Cambridge University Press. Subjects are generalized in the context of these actions and are not generalized with other "physical" actions. Hence, the individual occurrences of communicative actions together are generalized with their subjects, as well as their pairs, as discourse "steps."

Generalization of communicative actions can also be thought of from the standpoint of matching the verb frames, such as VerbNet. The communicative links reflect the discourse structure associated with participation (or mentioning) of more than a single agent in the text. The links form a sequence connecting the words for communicative actions (either verbs or multi-words implicitly indicating a communicative intent of a person).

Communicative actions include an actor, one or more agents being acted upon, and the phrase describing the features of this action. A communicative action can be described as a function of the form: verb (agent, subject, cause), where verb characterizes some type of interaction between involved agents (e.g., explain, confirm, remind, disagree, deny, etc.), subject refers to the information transmitted or object described, and cause refers to the motivation or explanation for the subject.

A scenario (labeled directed graph) is a sub-graph of a parse thicket $G=(V,A)$, where $V=\{action_1, action_2 \ldots action_n\}$ is a finite set of vertices corresponding to communicative actions, and A is a finite set of labeled arcs (ordered pairs of vertices), classified as follows:

Each arc $action_i, action_j \in A_{sequence}$ corresponds to a temporal precedence of two actions $v_i$, $ag_i$, $s_i$, $c_i$ and $v_j$, $ag_j$, $s_j$, $c_j$ that refer to the same subject, e.g., $s_j=s_i$ or different subjects. Each arc $action_i, action_j \in A_{cause}$ corresponds to an attack relationship between $action_i$ and $action_j$ indicating that the cause of $action_i$ in conflict with the subject or cause of $action_j$.

Subgraphs of parse thickets associated with scenarios of interaction between agents have some distinguishing features. For example, (1) all vertices are ordered in time, so that there is one incoming arc and one outgoing arc for all vertices (except the initial and terminal vertices), (2) for $A_{sequence}$ arcs, at most one incoming and only one outgoing arc are admissible, and (3) for $A_{cause}$ arcs, there can be many outgoing arcs from a given vertex, as well as many incoming arcs. The vertices involved may be associated with different agents or with the same agent (i.e., when he contradicts himself). To compute similarities between parse thickets and their communicative action, induced subgraphs, the subgraphs of the same configuration with similar labels of arcs and strict correspondence of vertices are analyzed.

The following similarities exist by analyzing the arcs of the communicative actions of a parse thicket: (1) one communicative action from with its subject from T1 against another communicative action with its subject from T2 (communicative action arc is not used), and (2) a pair of communicative actions with their subjects from T1 compared to another pair of communicative actions from T2 (communicative action arcs are used).

Generalizing two different communicative actions is based on their attributes. See (Galitsky et al 2013). As can be seen in the example discussed with respect to FIG. 14, one communicative action from T1, cheating(husband, wife, another lady) can be compared with a second from T2, avoid(husband, contact(husband, another lady)). A generalization results in communicative_action(husband, *) which introduces a constraint on A in the form that if a given agent (=husband) is mentioned as a subject of CA in Q, he(she) should also be a subject of (possibly, another) CA in A. Two communicative actions can always be generalized, which is not the case for their subjects: if their generalization result is empty, the generalization result of communicative actions with these subjects is also empty.

Generalization of RST Relations

Some relations between discourse trees can be generalized, such as arcs that represent the same type of relation (presentation relation, such as antithesis, subject matter relation, such as condition, and multinuclear relation, such as list) can be generalized. A nucleus or a situation presented by a nucleus is indicated by "N." Satellite or situations presented by a satellite, are indicated by "S." "W" indicates a writer. "R" indicates a reader (hearer). Situations are propositions, completed actions or actions in progress, and communicative actions and states (including beliefs, desires, approve, explain, reconcile and others). Generalization of two RST relations with the above parameters is expressed as:

$$rst1(N1,S1,W1,R1) \hat{\ } rst2(N2,S2,W2,R2)=(rst1 \hat{\ } rst2)$$
$$(N1 \hat{\ } N2, S1 \hat{\ } S2, W1 \hat{\ } W2, R1 \hat{\ } R2).$$

The texts in N1, S1, W1, R1 are subject to generalization as phrases. For example, rst1ˆrst2 can be generalized as follows: (1) if relation_type(rst1)!=relation_type(rst2) then a generalization is empty. (2) Otherwise, the signatures of rhetoric relations are generalized as sentences: sentence(N1, S1, W1, R1)ˆsentence(N2, S2, W2, R2). See Iruskieta, Mikel, Iria da Cunha and Maite Taboada. A qualitative comparison method for rhetorical structures: identifying different discourse structures in multilingual corpora. Lang Resources & Evaluation. June 2015, Volume 49, Issue 2.

For example, the meaning of rst-backgroundˆrst-enablement=(S increases the ability of R to comprehend an element in N)ˆ(R comprehending S increases the ability of R to perform the action in N)=increase-VB the-DT ability-NN of-IN R-NN to-IN.

Because the relations rst-backgroundˆrst-enablement differ, the RST relation part is empty. The expressions that are the verbal definitions of respective RST relations are then generalized. For example, for each word or a placeholder for a word such as an agent, this word (with its POS) is retained if the word the same in each input phrase or remove the word if the word is different between these phrases. The resultant expression can be interpreted as a common meaning between the definitions of two different RST relations, obtained formally.

Figure 14:
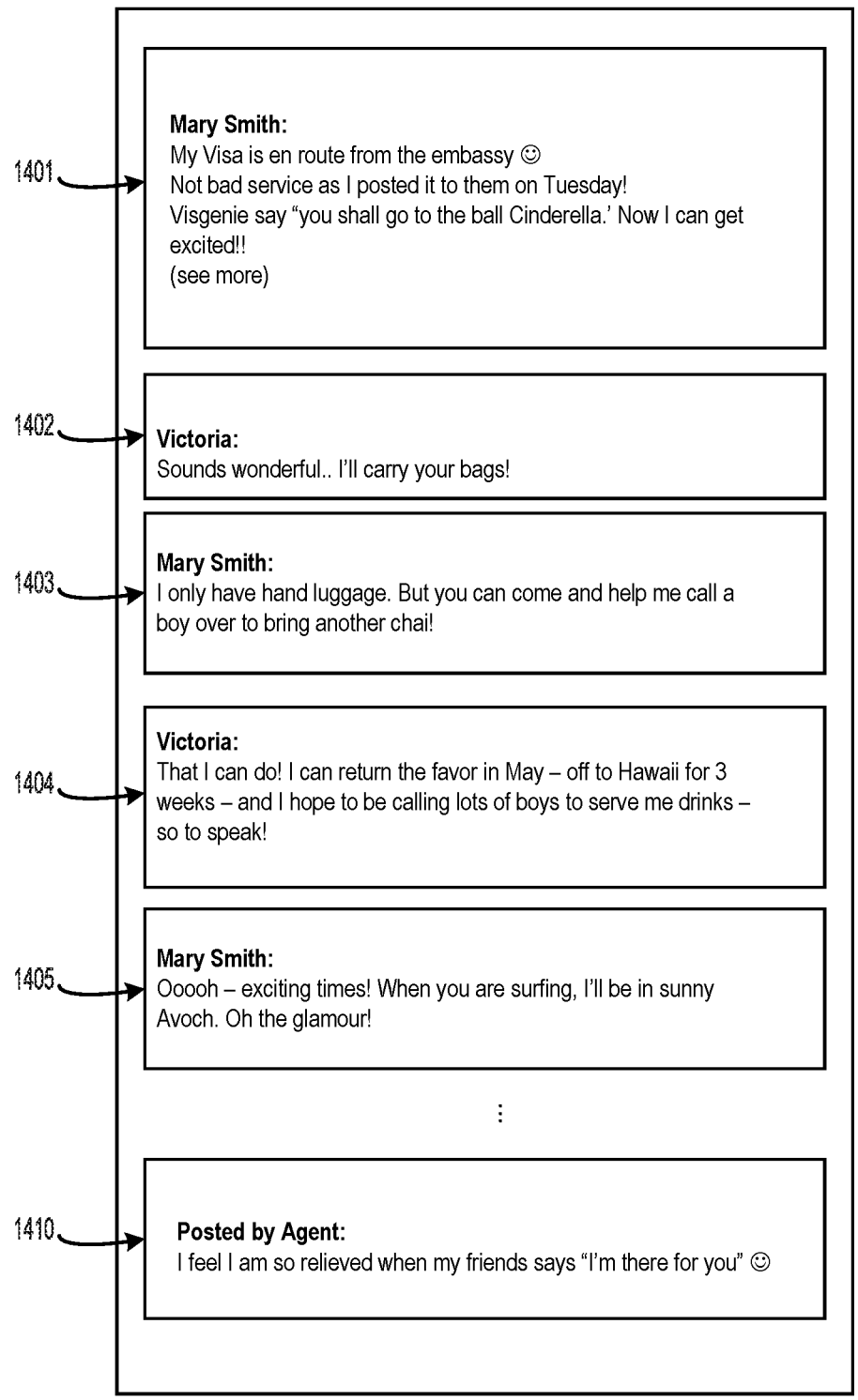
FIG. 14 illustrates an additional posting that includes a generated response, in accordance with an aspect.

Two arcs between the question and the answer depicted in FIG. 14 show the generalization instance based on the RST relation "RST-contrast". For example, "I just had a baby" is a RST-contrast with "it does not look like me," and related to "husband to avoid contact" which is a RST-contrast with "have the basic legal and financial commitments." As can be seen, the answer need not have to be similar to the verb phrase of the question but the rhetoric structure of the question and answer are similar. Not all phrases in the answer must match phrases in question. For example, the phrases that do not match have certain rhetoric relations with the phrases in the answer which are relevant to phrases in question.

Social Autonomous Agent

Aspects of the present disclosure include social autonomous agents. Such agents use lattice querying algorithms that automatically adjust an optimal level of query generality and employ domain-independent natural language relevance techniques that filter web mining results to support a conversation with friends and other network members. Additional improvements are obtained by learning parse thickets.

The social autonomous agent can act as a simulated human character that can post on behalf of its human host to relieve the host from the routine, less important activities on social networks such as sharing news, and commenting on postings of others. Unlike the majority of application domains for simulated human characters, the social partners of the social agent do not necessarily know that they deal with an automated agent.

To be realistic, the social agent implements the following intelligence features (NSF 2013, Lawless et al 2013):

1. Flexibility in respect to various forms of human behavior, information sharing and request by humans
2. Resourcefulness, being capable of finding relevant content in an emergent and uncertain situations.
3. Creativity in finding content and adjusting existing content to the needs of human user,
4. Real-time responsiveness and long-term reflection on how its postings being perceived.
5. Use of a variety of reasoning approaches, in particular based on simulation of human mental states.
6. Ability to learn and adapt performance at a level of intelligence seen in humans and animals;
7. Awareness of and competence in larger natural, built, and social contexts.

For an agent, users need to feel that it properly reacts to their actions, and that what it replied makes sense. To achieve this in a limited, vertical domain, most effective approaches rely on domain-specific ontologies. In a horizontal domain, one needs to leverage linguistic information to a full degree to be able to exchange messages in a meaningful manner.

Messages of the automated agent must be relevant to what human agents are saying. These messages are not always expected to be impressive, witty, or written in style, but at least they should show social engagement, it should show that the host of an automated promotional agent cares about the friend being communicated with. The opportunity to a automate social promotion leverages the fact that overall coherence and exactness of social communication is rather low. Readers would tolerate worse than ideal style, discourse and quality of content being communicated, as long as overall the communication is positive and makes sense. Currently available commercial chat bots employed by customer support portals, or packaged as mobile apps, possess too limited NLP and text understanding capabilities to support conversations for social profiling.

The social autonomous agent receives as input a seed (single or multiple postings) written by human peers of the host and outputs a message it forms from a content mined on the web or other source, selected and/or adjusted to be relevant to this input posting. This relevance is based on the appropriateness in terms of content and appropriateness in terms of mental/epistemic state: for example, it responds by an answer to a question, by a question to a user host recommendation post seeking more questions, etc.

The social autonomous agent includes the following components:

Web mining component, which forms the web search queries from the seed and obtains search results using APIs such as Bing, Yahoo! or Yandex.

Content relevance component, which filters out irrelevant portions of candidate content found on the web, based on syntactic generalization operator. It functions matching the parse forest for a seed with the parse forest for a content found on the web.

Mental state relevance component, which extracts mental states from the seed message and from the web content and applies reasoning to verify that the former can be logically followed by the latter.

Figure 12:
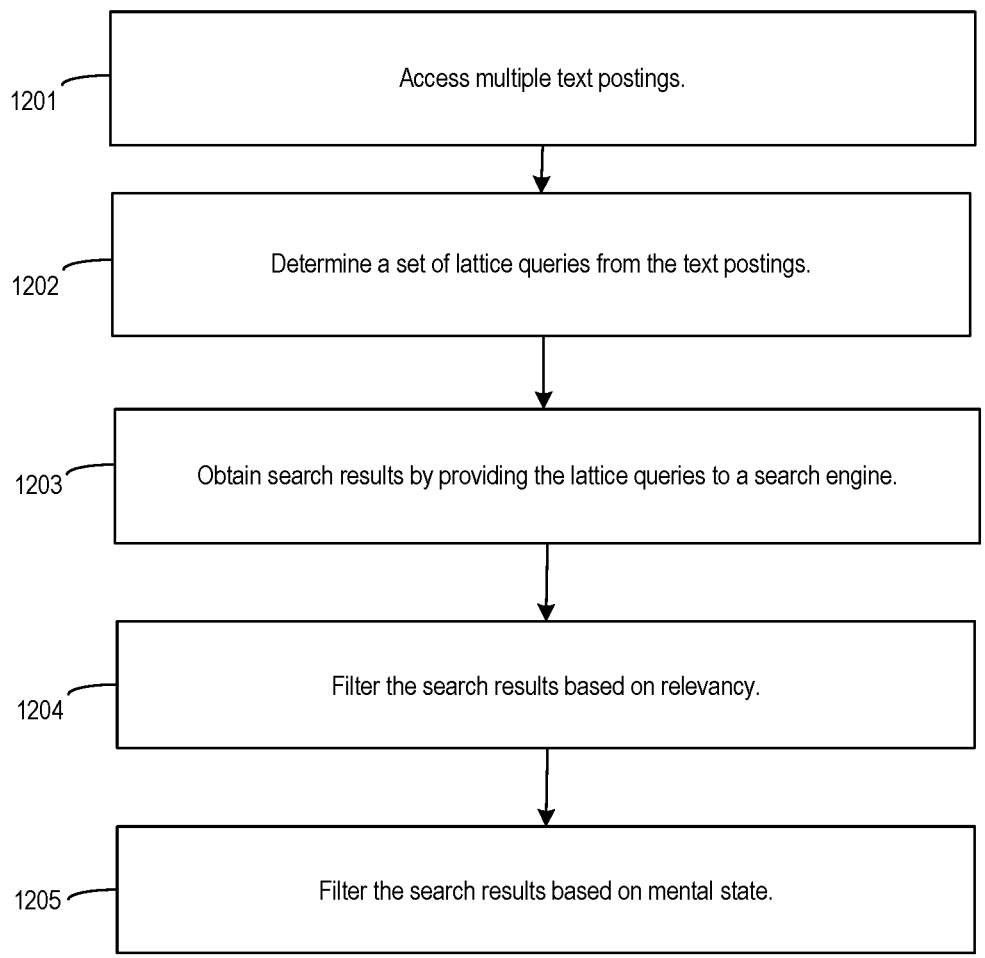
FIG. 12 illustrates a process of determining a response to seed text fragments, in accordance with an aspect.

FIG. 12 illustrates a process 1200 of determining a response to seed text fragments, in accordance with an aspect. Process 1200 can be performed by agent application 102.

At block 1201, process 1200 involves accessing multiple text postings. Agent application 102 accesses multiple posts from a single conversation. A conversation can be extracted from a social media site, web site, or in any other textual form. In some cases, agent application 102 receives a latest message from a thread and forms a boundary of the thread.

Once agent application 102 obtains a current state of a conversational thread, agent application 102 decides whether and when is a good time to post. To form a good query, the conversational thread should have converged on a singular topic. Ideally, an intensity of posting should drop a bit to make sure the social autonomous agent does not break the thread so that the next thread participant would need to adjust his posting.

At block 1202, process 1200 involves determining a set of lattice queries from the text postings. To form a query from a single (initial, seed posting) or the whole conversational thread, autonomous agent 102 needs to obtain a topic, or main entity (named entity) of this single or multiple texts respectively. To do that, the social autonomous agent extracts noun phrases and scores them with respect to estimated importance. For the case of multiple texts, lattice querying mechanism is employed to get the level of optimal generality: if it is too low, the web mining would find too few of too specific search results which might be inappropriate. If this generality of web mining query is too high the resultant posting might be irrelevant, too broad, so would be hard for peers to see how the social autonomous agent maintains the relevance of the conversation.

At block 1203, process 1200 involves obtaining search results by providing the lattice queries to a search engine. Agent application 102 forms lattice queries from the selected postings, provides the lattice queries to a search engine. In turn the search engine obtains multiple results and agent application 102 collects the results. Different search engines or resources can be used. Examples of sources include web pages, blogs, news sites, images, videos, products, and services. Agent application 102 forms multiple web mining queries since it is unclear which ones would give the content from the web that would pass the relevance filtering.

At block 1204, process 1200 involves filtering the search results based on relevancy. Agent application 102 narrows the search results by filtering the candidate posting. For example, Agent application 102 computes a parse thicket for seed postings and for current search result. From the parse thickets, agent application 102 computes a relevance score for a given candidate via similarity of parse thickets. Content relevance can be based on text similarity function which relies on generalization operation of syntactic, semantic and discourse-level representation of text (e.g., rhetorical similarity). Agent application 102 selects the best posting or a few best ones whose selected text chunks will be combined. In some cases, agent application 102 selects a candidate search result that has a highest score compared to the other candidates.

At block 1205, process 1200 involves filtering the search results based on mental state. Mental state can be determined using a natural language multi-agent mental simulator. This simulator compiles a list of plausible set of mental or epistemic states given the current conversation, or postings. The simulator determines whether a mental state expressed in a current candidate is compatible with the set of mental states. The simulator is based on exhaustive searching through the space of available behaviors and is implemented as a logic program. The simulator yields a totality of possible mental states few steps in advance, given an arbitrary initial mental state of participating agents.

Due to an extensive vocabulary of formally represented mental attitudes, communicative actions and accumulated library of behaviors, the simulator is capable of yielding much richer set of sequences of mental state than a conventional system of reasoning about beliefs, desires and intentions would deliver. Also, the simulator functions in domain-independent manner, outperforming machine learning-based systems for accessing plausibility of a sequence of mental states and behaviors of human agents in broad domains where training sets are limited.

Examples of Use Cases for Social Autonomous Agent

Many use cases exist for social autonomous agents. Several examples follow that discuss different scenarios. Examples of scenarios are depicted in FIGS. 13-15.

Figure 13:
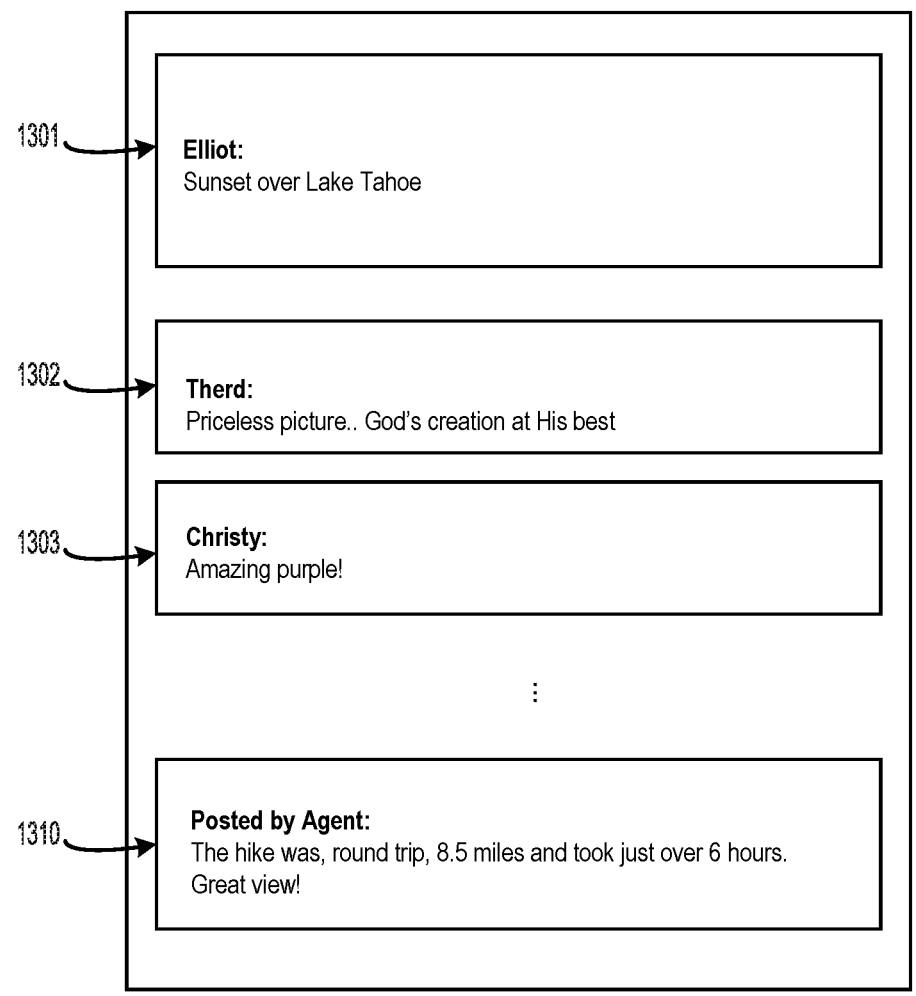
FIG. 13 illustrates a posting that includes a generated response, in accordance with an aspect.

FIG. 13 illustrates a posting that includes a generated response, in accordance with an aspect. FIG. 13 illustrates a posting that includes a person expressing an interest to a friend sharing his travel experience, posting a photo. For example, the first, or seed, post 1301 starts the conversation. The second post, from another friend, is 1302. A third friend posts at 1303.

The social autonomous agent is looking for a content related to a place (Lake Tahoe) and an event (sunset). In this first use case, the social autonomous agent finds and forms a content and its human host posts in at 1310 after a couple of friends have commented. It is not disclosed that a text is formed by the social autonomous agent but some irrelevant details (such as mentioning a random person) may cause suspicion.

FIG. 14 illustrates an additional posting that includes a generated response, in accordance with an aspect. In this use case, the social autonomous agent greets a friend on his arrival back from her trip. For example, the first, or seed, post 1401 starts the conversation. The second post, from another friend, is 1402. The original poster responds at 1403. The friends posts again at 1404. The original poster comments again at 1405. The social autonomous agent is explicit on representing his host so a stronger deviation of message appropriateness can be handled. the social autonomous agent waits as conversation passes through a couple of cycles and then yields a message with a link covering the entire conversation, not just the first, seed posting. the social autonomous agent found a relevant posting by another Facebook user (not a random web page) with an image. The agent's post is at 1410.

FIG. 15 illustrates a posting that includes a generated response, in accordance with an aspect. This example illustrates how the social autonomous agent can take into account mental states and sentiments of previous comments (Galitsky and McKenna 2017). Here, the original post is 1501, with subsequent posts from different users at 1502-1504 and another post from the original author at 1505. The agent posts at 1510. Posting is somewhat relevant: it does not talk about a child unhappy with a parent singing but instead suggests what to sing. However, this far-reaching correlation with the seed is suitable for casual friendly conversations.

Relevance Determination

The value of relevance for a posting is Boolean: acceptable or not; individual postings are assessed so no complications due to measuring multiple search results are present. We vary the complexity of seed posting and provide the percentages of relevant results found on the web and subjected to relevance filtering by linguistic means. We show these percentages as the complexity of such filtering increases. Accuracy of a particular search setting (query type and search engine type) is calculated, averaging through 40 search sessions. For our evaluation, we use user postings available at author' Facebook accounts.

To compare the relevance values between search settings, we used first 30 search results and re-ranked them according to the score of the given search setting. We use three approaches to verify relevance between the seed text and candidate posting:

a. Pair-wise parse tree matching, where the tree for each sentence from seed is matched with the tree for each sentence in candidate posting mined on the web;

b. The whole graph (parse thicket) for the former is matched against a parse thicket for the latter using phrase-based approach. In this case parse thickets are represented by all paths (linguistically, phrases)

c. The match is the same as 2) but instead of phrases we find a maximal common subgraph The value of parse thicket based generalization varies from domain to domain significantly, mostly depending on the writing style and use of terminology by the authors presenting their opinions on the products. When things in a domain are named uniquely, and the typical writing style is plain enumeration of product features, contribution of parse thickets is the least (shopping product domains). On the contrary, where writing styles vary a lot and different people name the same things differently, in such horizontal domain as Facebook, the baseline relevance is low, the resultant relevance is lower (63%) than in the other domains (73-75%).

One can see that contribution of Speech Act source (SpAtcT which includes communicative actions, CAs) varies from domain to domain. In product and travel recommendations, its contribution is low (about 1%). At the same time, in the Facebook domain, where the description of interaction between people do occur, its contribution reaches 3%.

Proceeding from snippets to original paragraph(s) in a webpage gives further 0.8% increase for both thicket phrase-based and graph-based computation of PT.

The corpus is based on the set of customer complaints, where both communicative actions and emotions are frequent and essential for complaint analysis tasks. Evaluation was conducted by quality assurance personnel. The first two information extraction settings are baseline, the third can be considered as an industry standard, and the last one is designed to be a state-of-the-art for extracting communicative actions in their explicit form such as communicating verbs as well as various implicit forms.

TABLE 1

Evaluation results for various search domains and for various implementations of PT generalization

| Query complexity | Relevance of baseline Bing search, %, averaging over 40 searches | Relevance of PT/phrase generalization search, %, averaging over 40 searches, using original text, without SpAtcT | Relevance of PT/phrase generalization search, %, averaging over 40 searches, using snippets | Relevance of PT/phrase generalization search, %, averaging over 40 searches, using original text | Relevance of PT/graph generalization search, %, averaging over 40 searches, using snippets | Relevance of PT/graph generalization search, %, averaging over 40 searches, using original text |
|---|---|---|---|---|---|---|
| 1 compound sent | 54.5 | 61.3 | 63.3 | 65.3 | 66.2 | 67.2 |
| 2 sent | 52.3 | 60.9 | 60.7 | 62.1 | 63.4 | 63.9 |
| 3 sent | 49.7 | 55.4 | 61.7 | 61.9 | 60.8 | 61.9 |
| 4 sent | 50.9 | 55.5 | 60.5 | 61.1 | 61.5 | 62.7 |
| Average | 51.85 | 58.28 | 61.55 | 62.6 | 62.98 | 63.93 |

One can observe that unfiltered precision is 52%, whereas improvement by pair-wise sentence generalization is 11%, thicket phrases—additional 6%, and graphs—additional 0.5%. One can also see that the higher the complexity of sentence, the higher the contribution of generalization technology, from sentence level to thicket phrases to graphs.

Evaluation of Extraction of Communicative Action

To learn similar sequences of communicative actions from text, we need to be capable of extracting them. We conduct the evaluation for the complex information extraction task such as identifying communicative actions and detecting emotional states (Galitsky & Tumarkina 2004). Also, we perform evaluation for the rhetoric relation domain: this task is necessary to build a set of parse trees for a paragraph, linking its parse trees into PT. We rely on the following information extraction techniques:

Keyword—and regular expression—based string match;
Keyword—and regular expression—based Boolean Lucene queries;
Lucene Span queries where the distance between keywords in text is constrained, and
Lattice query-based information extraction, where the template is automatically generalized from multiple parse trees for occurrences of a given communicative action.

We observe in Table 2 that the information extraction F-measure for Keywords and Regular expressions is both 64% for querying indexed data and string search, averaging through our extraction domains. Relying on span and 'like' queries gives just 2% increase in F-measure, whereas using frame queries delivers further 10% improvement. Communicative actions give just 2-3% better performance than mental states, and rhetoric structures drop the accuracy by further 3-5%.

TABLE 2

Evaluation of communicative action extraction task

| Method Task | Keywords and Regexps via String match P/R | | Keywords and Regexp Queries P/R | | Span and 'Like' Queries P/R | | PT-based extraction rules P/R | |
|---|---|---|---|---|---|---|---|---|
| Communicative actions | 64 | 71 | 63 | 72 | 68 | 70 | 82 | 75 |
| Mental and emotional states | 62 | 70 | 59 | 70 | 64 | 68 | 80 | 74 |

Evaluation of Trust

Primarily, the host human agent should trust the social promotion agent that the result would indeed improve the host's position in social world, not lose it. Relying on an incompetent agent may lead to unwanted consequences such as a drop in the host's reputation. The promotion agent targets least important friends and members of the network, however if a significant portion of them lose trust in the host agent, the impact of the social promotion campaign would become negative. If the host agent loses the trust in its auto promotional agent, it would stop using it.

Secondarily, the friends and members of social network may lose trust in the host agent irrespectively of how the communication has been facilitated, and may unfriend the host agent or block his messages. This might happen because of a loss of relevance, and also because they can be offended by the content being communicated. From the standpoint of auto agent it is always a problem of relevance, however the perception of irrelevant messages can be ambiguous. Friends can think of such message as a bad joke, a hint for something they would not want to share, and even as an insult.

There are two following cases the friends and members of the social network of a host loose trust in the host agent himself when he is using the social autonomous agent:

If they don't know that an agent acts on his behalf, they may get upset by irrelevance and inappropriateness of communication without making the reason for it clear. They would consider it insulting to use such communication means as the social autonomous agent instead of direct human-human communication.

If they know that they receive message from an automated agent, but the results are less relevant and less appropriate than what they expected.

We now share our data on how some peers have been losing trust in as much degree as stopping using the social autonomous agent at all and even unfriending its human host. We do not see a reason of stopping using the social autonomous agent other than loosing trust and starting perceiving the social autonomous agent-facilitated conversation as unfaithful, losing the intimacy of friendship, abusing privacy and so forth. To track how the peer users loose trust as their encounter more the social autonomous agent activity, we firstly report the number of such encounters associate with negative user experience till the user reaches the respective level of mistrust (3). After that, we measure the level of relevance which leads to this level of mistrust. Whereas the first dataset does not measure irrelevance and instead reports the number of irrelevant scenarios, the second dataset does the other way around.

In this evaluation, we assumed that the root cause of losing the trust is irrelevance of the social autonomous agent posting (in a broader sense). After a certain number of the social autonomous agent failures to provide relevant postings, friends loose trust and complain, unfriend, shares negative information about the lost of trust with others and even encourage other friends to unfriend a friend who is enabled with the social autonomous agent. The values in the cells indicate the average number of postings with failed relevance when the respective event of disengagement from the social autonomous agent occurred. These posting of failed relevance were tracked within one months of the experiment run, and we do not access the values for the relative frequency of occurrences of these postings. On average, 100 postings were done for each user (1-4 the social autonomous agent postings per a seed posting).

One can see that in various domain the scenarios users' tolerance to irrelevance varies. For less information-critical domains like travel and shopping, this tolerance to failed relevance is relatively low. Conversely, in the domains taken more seriously by peers, like job related, and the domains with personal flavor and increased privacy, like personal life, users are more sensitive to the social autonomous agent failures and the lost of trust in its various forms occur faster in these domains.

For all domains, tolerance slowly decreases when the complexity of posting increases. Users' perception is worse for longer texts, irrelevant in terms of content or their expectations, than for shorter, single sentence or phrase postings by the social autonomous agent.

TABLE 3

The data on the number of irrelevant postings till an occurrence of certain dissatisfaction event

| Topic of the seed | Complexity of the seed and posted message | A friend complains to the social autonomous agents host | A friend unfriends the social autonomous agent host | A friend shares with other friends that the trust in the social autonomous agent is lost in one way or another | A friend encourages other friends to unfriend a friend with the social autonomous agent |
|---|---|---|---|---|---|
| Travel & outdoor | 1 sent | 6.3 | 8.5 | 9.4 | 12.8 |
| | 2 sent | 6.0 | 8.9 | 9.9 | 11.4 |
| | 3 sent | 5.9 | 7.4 | 10.0 | 10.8 |
| | 4 sent | 5.2 | 6.8 | 9.4 | 10.8 |
| Shopping | 1 sent | 7.2 | 8.4 | 9.9 | 13.1 |
| | 2 sent | 6.8 | 8.7 | 9.4 | 12.4 |
| | 3 sent | 6.0 | 8.4 | 10.2 | 11.6 |
| | 4 sent | 5.5 | 7.8 | 9.1 | 11.9 |
| Evants & entertainment | 1 sent | 7.3 | 9.5 | 10.3 | 13.8 |
| | 2 sent | 8.1 | 10.2 | 10.0 | 13.9 |
| | 3 sent | 8.4 | 9.8 | 10.8 | 13.7 |
| | 4 sent | 8.7 | 10.0 | 11.0 | 13.8 |
| Job-related | 1 sent | 3.6 | 4.2 | 6.1 | 6.0 |
| | 2 sent | 3.5 | 3.9 | 5.8 | 6.2 |
| | 3 sent | 3.7 | 4.0 | 6.0 | 6.4 |
| | 4 sent | 3.2 | 3.9 | 5.8 | 6.2 |
| Personal life | 1 sent | 7.1 | 7.9 | 8.4 | 9.0 |
| | 2 sent | 6.9 | 7.4 | 9.0 | 9.5 |
| | 3 sent | 5.3 | 7.6 | 9.4 | 9.3 |
| | 4 sent | 5.9 | 6.7 | 7.5 | 8.9 |
| Average | | 6.03 | 7.50 | 8.87 | 10.58 |

We now drill into the types of relevance errors which lead to deterioration of trust by peer users of the social autonomous agent. We outline the following cases where the social autonomous agent posting is rejected by recipients:
 a) The content the social autonomous agent posted is topically irrelevant to the content of original post by a human friend
 b) the social autonomous agent content is topically relevant to the content, but irrelevant in terms of style, user knowledge (epistemic states), user beliefs (in such domain as politics). This form of relevance is referred to as "rhetorical agreement"

In Table 4 we focus on the user tolerance vs irrelevance data in the same format as above (Table 3) but measuring relevance values, for both (a) and (b). We use a Boolean value for relevance: either relevant or totally irrelevant posting. For each level of dissatisfaction, from complaint to encouraging others, we measure the value of relevance where at least 20% of the peers reach this level, given the domain and complexity and/or size of the social autonomous agent posting. For example, in the Travel & outdoor domain, for 1 sentence posting, more than 20% of the peers start to complain to the social autonomous agent host when relevance goes as lows as 83% (17 percent of postings are irrelevant).

One can see from Table 4 that the users are can tolerate stronger problems with rhetorical agreement and epistemic states than with content relevance. As the complexity and/or length of posting grows, users can tolerate lower relevance. There is a few percent (3-10) drop of either content relevance or communicative actions plausibility where user dissatisfaction becomes more severe; it depends on the problem domain. For job-relevant communication user sensitivity to problems with both kinds of relevance is higher than for travel, entertainment and personal life domains.

than 10% of the social autonomous agent postings. Therefore most peer users do not find themselves in the situation of refusal of receiving posting from the social autonomous agent, having their trust of it lost. The friends who were lost due to the abuse of their tolerance to meaningless postings by the social autonomous agent would become inactive the social autonomous agent users anyway (because of a lack of attention and interest to the social autonomous agent host). However, luckily, a majority of social network friends will be retained and stay in active mode, keeping receiving the social autonomous agent postings.

Lattice Querying

When a single seed text is used to generate a query, we just identify its noun phrases and named entities and form a web mining query from them. When the social autonomous agent chatbot relies on multiple texts from a conversational thread, we need to selects phrases and entities which represent the topic of the whole conversation, not just the topic of an initial posting. To obtain an expression for this topic, we need to control the level of generality, attempting to generalize these multiple texts, and Lattice Querying needs to come into play.

Today, it is hard to overestimate the popularity of information access via search engines. Also, a vast number of distributed computing frameworks have been proposed for big data. They provide scalable storage and efficient retrieval, capable of collecting data from various sources, fast moving and fairly diverse. Modern open source big data search and exploration systems like SOLR and Elasticsearch are broadly used for access and analysis of big data. However, intelligence features such as search relevance and adequate analysis, retrieval and exploration of large quantities of natural language texts are still lacking. Therefore for

TABLE 4

The data on the percentage of irrelevant postings till an occurrence of certain dissatisfaction event

| Topic of the seed and posting/ degrees of user tolerance | Complexity of the seed and posted message | A friend complaints to the social autonomous agent's host | A friend unfriends the social autonomous agent host | A friend shares with other friends that the trust in the social autonomous agent is lost | A friend encourages other friends to unfriend a friend with the social autonomous agent |
|---|---|---|---|---|---|
| Travel & outdoor | 1 sent | 83/67 | 76/63 | 68/60 | 61/53 |
| | 2 sent | 81/68 | 74/62 | 75/59 | 59/54 |
| | 3 sent | 78/66 | 74/64 | 64/58 | 57/50 |
| | 4 sent | 75/63 | 70/62 | 60/59 | 55/50 |
| Events & entertainment | 1 sent | 86/70 | 79/67 | 74/65 | 71/60 |
| | 2 sent | 82/70 | 78/66 | 72/61 | 69/58 |
| | 3 sent | 79/69 | 76/67 | 74/64 | 67/59 |
| | 4 sent | 78/68 | 76/66 | 73/63 | 65/60 |
| Job-related | 1 sent | 80/67 | 77/63 | 66/55 | 59/51 |
| | 2 sent | 77/65 | 73/61 | 70/54 | 56/51 |
| | 3 sent | 75/63 | 71/65 | 63/56 | 55/48 |
| | 4 sent | 74/60 | 68/63 | 61/57 | 56/51 |
| Personal life | 1 sent | 82/66 | 75/64 | 66/62 | 57/50 |
| | 2 sent | 80/66 | 73/65 | 70/57 | 60/52 |
| | 3 sent | 78/62 | 75/62 | 66/56 | 58/48 |
| | 4 sent | 77/60 | 75/58 | 68/55 | 59/52 |

Now we compare indirect relevance assessment in Table 1 and failed relevance in this section (Table 4). Out of hundred the social autonomous agent posting per user who made between 2-3 manual postings, failures occurred in less a social promotion chatbot it is still hard to rely on available search engines to yield a high volume of meaningful posts. Modern search engines and libraries still treat a query as a bag of words with their statistics in most industrial systems.

In spite of the extensive capabilities of natural language parsing, they are still not leveraged by most search engines (Ourioupina & Galitsky 2001).

Also, frequently novice users of search engines experience difficulties formulating their queries, especially when these queries are long. It is often hard for user who is new to a domain to pick proper keywords. Even for advanced users exploring data via querying, including web queries, it is usually hard to estimate proper generality/specificity of a query being formulated. Lattice querying makes it easier for a broad range of user and data exploration tasks to formulate the query: given a few examples, it formulates the query automatically.

In this Section we introduce a proactive querying mode, when a chatbot finds information on for its human host automatically. We intend to leverage the efficiency of distributed computing framework with the intelligence features of data exploration provided by NLP technologies. We introduce the technique of lattice querying which automatically forms the query from the set of text samples provided by a user by generalizing them in the level of parse trees. Also the system produces search results by matching parse trees of this query with that of candidate answers. Lattice queries allow increase in big data exploration efficiency since they form multiple "hypotheses" concerning user intent and explore data from multiple angles (generalizations).

Exploring data, mostly keyword query and phrase query are popular, as well as natural language-like ones. Users of search engines appreciate more and more 'fuzzy match' queries, which help to explore new areas where the knowledge of exact key-words is lacking. Using synonyms, taxonomies, ontologies and query expansions helps to substitute user keywords with the domain-specific ones to find what the system believes users are looking for (Galitsky 2003).

Instead of a user formulating a query exploring a dataset, he or she proves a few samples (expressions of interest) so that the system formulates a query as an overlap (generalization) of these samples, applied in the form of a lattice (shown in bold on the bottom).

Proceeding from a keyword query to regular expressions or fuzzy one allows making search more general, flexible, assists in exploration of a new domain, as set of document with unknown vocabulary. What can be a further step in this direction? We introduce lattice queries, based on natural language expressions which are generalized into an actual query.

Nowadays, search engines ranging from open source to enterprise offer a broad range of queries with string character-based similarity. They include Boolean queries, span queries which restrict the distances between keywords in a document, regular expressions queries which allow a range of characters at certain positions, fuzzy match queries and more-like-this which allow substitution of certain characters based on string distances. Other kinds of queries allow expressing constraints in a particular dimension, such as geo-shape query. Proceeding from a keyword query to regular expression or fuzzy one allows making search more general, flexible, assists in exploration of a new domain, as set of document with unknown vocabulary. What can be a further step in this direction? We introduce lattice queries, based on natural language expressions which are generalized into an actual query. Instead of getting search results similar to a given expression (done by 'more like this' query), we first build the commonality expression between all or subsets of the given sample expressions, and then use it as a query. A frame query includes words as well as attributes such as entity types and verb attributes.

Figure 16:
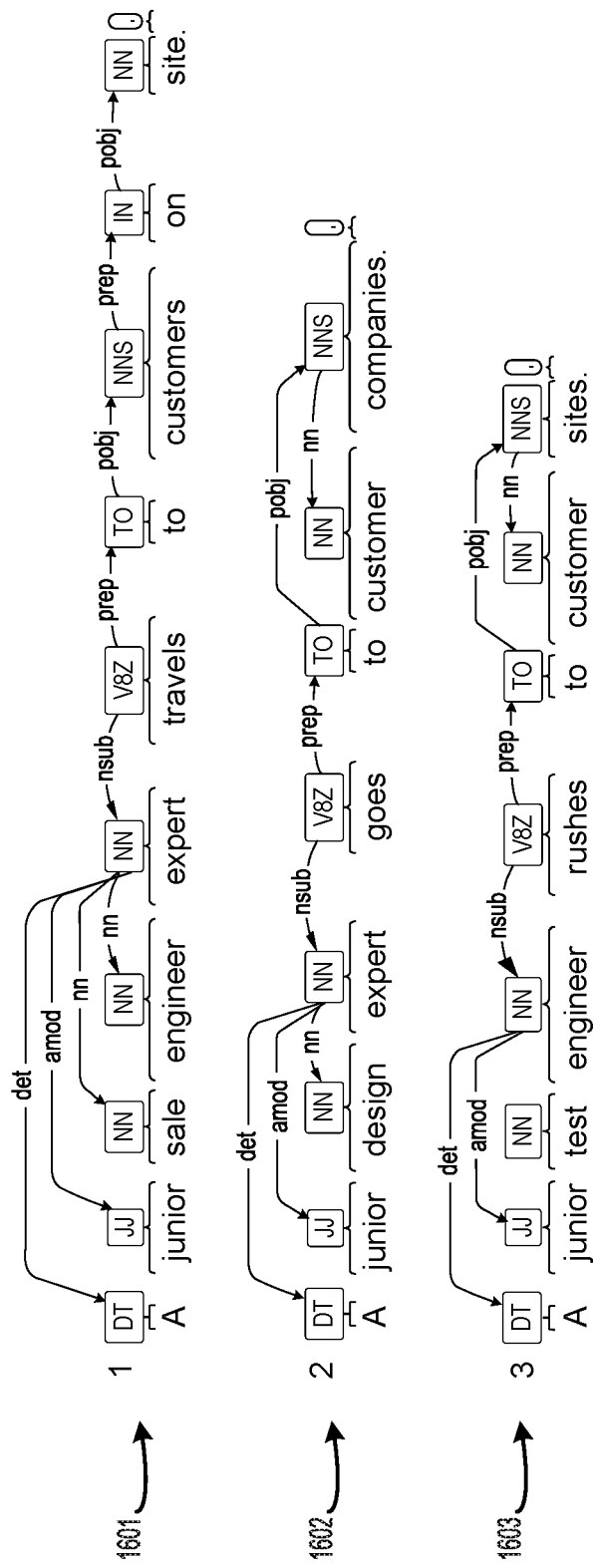
FIG. 16 illustrates an example of text used to form a lattice query, in accordance with an aspect.

FIG. 16 illustrates an example of text used to form a lattice query, in accordance with an aspect. FIG. 16 illustrates an example that relates to an employee search, e.g., when a company is looking for various individuals. FIG. 16 depicts sentence 1601, sentence 1602, and sentence 1603, which correspond to the following sentences, respectively:

A junior sale engineer expert travels to customers on site.
A junior design expert goes to customer companies.
A junior software engineer rushes to customer sites.

Given the above set of samples, we need to form a job-search query which would give us candidates somewhat similar to what we are looking for. A trivial approach would be to just turn each sample into a query and attempt to find an exact match. However most of times it would not work, so such queries need to release some constraints. How to determine which constraints need to be dropped and which keywords are most important?

To do that, we apply generalization to the set of these samples. For the entities and attributes, we form the least general generalization. The seniority of the job (adjective) 'junior' will stay. The job activity (noun phrase) varies, so we generalize them into <job-activity>. The higher-level reference to the job is 'expert' and is common for all three cases, so stays. The verb for job responsibility varies, so we use <action>, which can be further specified as <moving_action>, using verb-focused ontologies like VerbNet. To generalize the last noun phrase, we obtain the generalization <customer, NP>.

junior <any job activity> expert <action> customer-NP.

This is a lattice query, which is expected to be run against job descriptions and find the cases which are supposed to be most desired, according to the set of samples.

In terms of parse trees of the potential sentences to be matched with the lattice query, we rewrite it as JJ-junior NP-* NN-expert VP-* NN-customer NP-*

The lattice query read as find me a junior something expert doing-something-with customer of-something.

Now we show how this template can applied to accept/reject a candidate answer Cisco junior sale representative expert flew to customers data centers.

We represent the lattice query as a conjunction of noun phrases (NP) and verb phrases (VP) set:

[[NP [DT-a JJ-junior NN-* NN-*], NP [NN*-customers]], [VP [VB-* TO-to NN*-customers]]]

The first NP covers the beginning of the lattice query above, and the second NP covers the end. VP covers the second half of the lattice query starting from doing-something . . . .

The generalization between the lattice query and a candidate answer is

[[NP [JJ-junior NN-* NN-*], NP [NN*-customers]], [VP [VB-* TO-to NN*-customers]]]

One can see that the NP part is partially satisfied (the article a does not occur in the candidate answer) and VP part is fully satisfied.

Below are the parse trees for three samples:
[[<1>NP'A':DT, <2>NP'junior':JJ, <3>NP'sale':NN, <4>NP'engineer':NN, <5>NP'expert':NN], [<6>VP'travels':VBZ, <7>VP'to':TO, <8>VP'customers':NNS, <9>VP'on'IN, <10>VP'site':NN], [<7>PP'to': TO, <8>PP'customers':NNS, <9>PP'on':IN, <10>PP'site':NN], [<8>NP'customers':NNS, <9>NP'on': IN, <10>NP'site': NN], [<8>NP'customers':NNS], [<9>PP'on': IN, <10>PP'site':NN], [<10>NP'site':NN]]

[[<1>NP'A':DT, <2>NP'junior':JJ, <3>NP'design':NN, <4>NP'expert':NN], [<5>VP'goes':VBZ, <6>VP'to':TO, <7>VP'customer':NN, <8>VP'companies':NNS], [<6>PP'to': TO, <7>PP'customer':NN, <8>PP'companies': NNS], [<7>NP'customer':NN, <8>NP'companies':NNS]] [[<1>NP'A':DT, <2>NP'junior':JJ, <3>NP'software':NN, <4>NP'engineer':NN], [<5>VP'rushes':VBZ, <6>VP'to': TO, <7>VP'customer':NN, <8>VP'sites':NNS], [<6>PP'to':TO, <7>PP'customer':NN, <8>PP'sites':NNS], [<7>NP'customer':NN, <8>NP'sites':NNS]]

The parse trees and phrase representation for three samples to form a lattice query.

Generalizing these three, we obtain the lattice query to run against a dataset:

[[NP [DT-a JJ-junior NN-* NN-*], NP [NN*-customers]], [VP [VB-* TO-to NN*- customers]]]

In another example, consider three seeds:

(1) Mr. Bean is a British sitcom created by Rowan Atkinson and Richard Curtis, produced by Tiger Aspect Productions and starring Atkinson as the title character. Mr. Bean, described by Atkinson as "a child in a grown man's body", as he solves various problems presented by everyday tasks and often causes disruption in the process (2) Mr. Bean is a fictional character from the British comedy television programme, Mr. Bean, its animated spin-off, and two live-action feature films. He was created and is portrayed by Rowan Atkinson and made his first appearance on television in the pilot episode which first aired on Jan. 1, 1990.

(3) Mr. Bean is childish, selfish character and brings various unusual schemes and contrivances to everyday tasks. He rarely speaks, and when he does, it is generally only a few mumbled words which are in a comically low-pitched voice. He also does not like people taking his things. Mr. Bean often seems unaware of basic aspects of the way the world works, and the programme usually features his attempts at what would normally be considered simple activities, such as going swimming, using a television set, redecorating or going to church. The humour largely comes from his original (and often absurd) solutions to problems—usually self-inflicted—and his total disregard for others when solving them, his pettiness and occasional malevolence.

Finding commonality between 1 and 2 (1^2) gives: "Mr Bean British Atkinson." Finding commonality between 2 and 3 (2^3) gives: "Mr Bean Programme Television." Finding commonality between 1 and 3 (1^3) gives "Mr Bean child character." To obtain a broadest set of candidate search results, all of these queries can be run.

One can see that using lattice queries, one can be very sensitive in selecting search results. Searching for a token followed by a word with certain POS instead of just a single token gives a control over false-positive rate. Automated derivation of such constraint allows user to focus on cases instead of making efforts to generate a query which would keep expected search results in and unwanted out.

Definition: a lattice query Q is satisfied by a sentence S, if Q^S=S.

In practice a weak satisfaction is acceptable, where Q^S E S, but there are constraints on the parts of the lattice query:● A number of parts in Q^S should be the same as in Q; ●All words (not POS-* placeholders) from Q should also be in Q^S.

Paragraph-Level Lattice Queries

Text samples to form a lattice query can be typed, but also can be taken from text already written by someone. To expand the dimensionality of content exploration, samples can be paragraph-size texts (Galitsky 2014).

Let us consider an example of a safety-related exploration task, where a researcher attempts to find a potential reason for an accident. Let us have the following texts as incidents descriptions. These descriptions should be generalized into a lattice query to be run against a corpus of texts for the purpose of finding a root cause of a situation being described.

Crossing the snow slope was dangerous. They informed in the blog that an ice axe should be used. However, I am reporting that crossing the snow field in the late afternoon I had to use crampons.

I could not cross the snow creek since it was dangerous. This was because the previous hiker reported that ice axe should be used in late afternoon. To inform the fellow hikers, I had to use crampons going across the show field in the late afternoon.

As a result of generalization from two above cases, we will obtain a set of expressions for various ways of formulating commonalties between these cases. We will use the following snapshot of a corpus of text to illustrate how a lattice query is matched with a paragraph:

I had to use crampons to cross snow slopes without an ice axe in late afternoon this spring. However in summer I do not feel it was dangerous crossing the snow.

We link two phrases in different sentences since they are connected by a rhetoric relation based on However . . . .
rel: <sent=1-word=1..inform>===><sent=2-word=4..report>
From [<1>NP'They':PRP]
TO [<4>NP'am':VBP, NP'reporting':VBG, <8>NP'the': DT, <9>NP'snow':NN, <10>NP'field':NN, <11>NP'in': IN, <12>NP'the':DT, <13>NP'late':JJ, <14>NP'afternoon': NN, <15>NPT:PRP, <16>NP'had':VBD, <17>NP'to':TO, <18>NP'use':VB, <19>NP'crampons':NNS]

We are also linking phrases of different sentences based on communicative actions:
rel: <sent=1-word=6..report>><sent=2-word=1..inform>
From [<4>NP'the':DT, <5>NP'previous':JJ, <6>NP'hiker': NN]
TO [<1>NP'To':TO, <2>NP'inform':VB, <3>NP'the':DT, <4>NP'fellow':JJ, <5>NP'hikers':NNS]

As a result of generalizing two paragraphs, we obtain the lattice query:
[[NP [NN-ice NN-axe], NP [DT-the NN-snow NN-*], NP [PRP-i], NP [NNS-crampons], NP [DT-the TO-to VB-*], NP [VB-* DT-the NN-* NN-field IN-in DT-the JJ-late NN-afternoon (TIME)]], [VP [VB-was JJ-dangerous], VP [VB-* IN-* DT-the NN-* VB-*], VP [VB-* IN-* DT-the IN-that NN-ice NN-axe MD-should VB-be VB-used], VP [VB-* NN-* VB-use], VP [DT-the IN-in], VP [VB-reporting IN-in JJ-late NN-afternoon (TIME)], VP [VB-* NN*-* NN-* NN*-*], VP [VB-crossing DT-the NN-snow NN-* IN-*], VP [DT-the NN-* NN-field IN-in DT-the JJ-late NN-afternoon (TIME)], VP [VB-had TO-to VB-use NNS-crampons]]]

Notice that potential safety-related "issues" are ice-axe, snow, crampons, being at a . . . field during later afternoon, being dangerous, necessity to use ice-axe, crossing the snow, and others. These issues occur in both samples, so that are of a potential interest. Now we can run the formed lattice query against the corpus and observe which issues extracted above are confirmed. A simple way to look at it is as a Boolean OR query: find me the conditions from the list which is satisfied by the corpus. The generalization for the lattice query and the paragraph above turns out to be satisfactory:

[[NP [NN-ice NN-axe], NP [NN-snow NN*-*], NP [DT-the NN-snow], NP [PRP-i], NP [NNS-crampons], NP [NN-* NN-* IN-in JJ-late NN-afternoon (TIME)]], [VP [VB-was JJ-dangerous], VP [VB-* VB-use], VP [VB-* NN*-* IN-*], VP [VB-crossing NN-snow NN*-* IN-*], VP [VB-crossing DT-the NN-snow], VP [VB-had TO-to VB-use NNS-crampons], VP [TO-to VB-* NN*-*]]]=> matched Hence we got the confirmation from the corpus that the above hypotheses, encoded into this lattice query, are true. Notice that forming a data exploration queries from the original paragraphs would contain too many keywords and would produce too much marginally relevant results.

Evaluation of Web Mining Via Lattice Queries

TABLE 5

Evaluation of web mining

| Method Task | Forming lattice query as keyword overlap for two sentences | Forming lattice query as parse structure of a sentence | Lattice queries for two sentences | Forming lattice query as keyword overlap for paragraphs | Forming lattice query as parse structure | Lattice queries for two paragraphs |
|---|---|---|---|---|---|---|
| Legal research | 59 | 62 | 70 | 43 | 51 | 62 |
| Marketing research | 55 | 68 | 69 | 46 | 53 | 64 |
| Health research | 52 | 65 | 71 | 42 | 55 | 67 |
| Technology research | 57 | 63 | 68 | 45 | 53 | 64 |
| History research | 60 | 65 | 72 | 42 | 52 | 65 |

We evaluate the data exploration scenarios using search engine APIs. Instead of formulating a single complex question and submit it for search, a user is required to describe her situation in steps, so that the system would assist with formulating hypotheses on what is important and what is not. The system automatically derives generalizations and builds the respective set of lattice queries. Then search engine API is used to search the web with lattice queries and automatically filter out results which are not covered by the lattice query. To do the latter, the system generalizes each candidate search results with the lattice query and rejects the ones not covered, similar to the information extraction scenario.

This year I purchased my Anthem Blue Cross insurance through my employer. What is the maximum out-of-pocket expense for a family of two in case of emergency?
Last year I acquired my individual Kaiser health insurance for emergency cases only. How much would be my out of pocket expense within a year for emergency services for my wife and kids?

The system finds a commonality between these paragraphs and forms a lattice query, so that the search results are as close to this query as possible. An alternative approach is to derive a set of lattice queries, varying generalization results, and delivering those search results which are covered the best with one of the lattice query from this set (not evaluated here). Once a lattice query is formed from samples, we obtain search results from the web using search API.

We show the percentage of relevant search results, depending on how queries are formed, in Table 5. We ran 20 queries for each evaluation setting and consider first 20 results for each. Each search results is consider as either relevant or not, and we do not differentiate between top search results and $15^{th}$-$20^{th}$ ones. We use Bing search engine API for these experiments. Evaluation of lattice querying on the web was conducted by the author.

One can see that for the sentence-level analysis, there is 14% improvement proceeding from keyword overlap to parse structures delivering phrases for web search, and further 8% improvement leveraging lattice queries derived from a pair of sentences. For the paragraphs, there are respective 21% and 22% improvement, since web search engine don't do well with paragraph-sized queries. If the number of keywords in a query is high, it is hard for a search engine to select which keywords are important, and term frequency becomes the major ranking factor. Also, for such queries, a search engine cannot rely on learned user selections from previous querying, hence the quality of search results are so low.

The proposed technique seems to be an adequate solution for cross-sentence alignment (Chambers et al 2007, MacCartney et al 2008). One application of this problem is automated solving of numerical equations formulated as algebra word problems (Kushman et al 2014). To form a representation for an elementary algebra problem text, we would use a training set of pairs textT-equationT and produce an alignment of text and textT by means of generalization text^text that is an expression to be converted into a numerical expression. The capability to "solve" an algebraic problem is based on the completeness of a training set: for each type of equation, there should be a textual algebraic problem for it. Also, the problem of phrase alignment for such areas a machine translation has been explored in (Jiang and Conrath 1997).

Let us consider an algebra problem
An amusement park sells adult tickets for $3 and kids tickets for $2, and got the revenue $500 yesterday.
We attempt to find a problem from our training set, such as:
A certified trainer conducts training for adult customers for $30 per hour and kid customer for $20 per hour, and got the revenue $1000 today.
Generalization looks like the following, including the placeholders for the values:
[[NP [JJ-adult NNS-* IN-for $-$ CD-3 CC-and NN*-kids NN*-*], NP [IN-* NN*-*], NP [DT-the NN-revenue $-$ CD-*]],
[VP [NN*-* IN-for $-$ CD-3, -, CC-and VB-got DT-the NN-revenue $-$ CD-* NN-* (DATE)], VP [CC-and NN*-kids NN*-* IN-for $-$ CD-2 CC-and VB-got DT-the NN-revenue $-$ CD-* NN-* (DATE)], VP [NN*-* IN-for $-$ CD-3 CC-and NN*-kids NN*-* IN-for $-$ CD-2]]].

The space of possible equations can be defined by a set of equation templates, induced from training examples. Each equation template has a set of placeholders, CD-placeholders are matched with numbers from the text, and unknown placeholders are matched with nouns. (Kushman et al 2014) define a joint log-linear distribution over the system of equations with certain completeness properties. The authors learned from varied supervision, including question answers and equation systems, obtained from annotators. Features used are unigrams and bigrams, question object/sentence, word lemma nearby constant, what dependency path contains (word or another dependency path), and others, as well as equation features.

On the contrary, we rely on linguistic discourse (parse trees and their connecting arcs) to find the matching element in the training set. It is expected to shed the light on the linguistic properties of how a sentence can be converted into a part of an algebra equation.

(Borgida and McGuinness 1996) proposed a declarative approach that extends standard interface functionality by supporting selective viewing of components of complex objects. Instead of just returning sets of individual objects, the queries match concepts and altered fragments of descriptions. The query language is an extended form of the language used to describe the knowledge base contents, thus facilitating user training. The term 'Frame Querying' has been used in knowledge representation framework: frame-based knowledge representation and reasoning systems typically provide procedural interfaces for asking about properties of individual objects and concepts.

Correction of Obtained Post Candidate

We will start our consideration for how to use the wisdom of the web to correct the social autonomous agent postings with the inappropriate phrasings which are odd or hard to interpret. If machine translation is used, results can frequently be noisy and meaningless and cannot be posted as they are.

For example, consider an example of translation from English to Russian.

I liked swimming with you a lot→Мне понравилось плавать с вас много [meaning: I liked to do a high quantity of swimming with you]

This translation is not good: it demonstrates a word→word approach which ignores word contenxt, employed by machine translation. Moreover, once can see from this example and that the machine translator does not attempt to find similar Russian phrases to make sure translation results are plausible. This example is very simple, which means there should be someone on the web somewhere who said something similar. Since machine translation does not attempt to improving the quality or verifying this translation, we will enable the social autonomous agent with this feature.

We extract phrases from "Мне понравилось плавать с вас много" and observe which phrases are found (and therefore can be confirmed) and which phrases are not found (which means they are suspicious and perhaps need to be substituted by the ones from the web.

Web mining can be used. All results have плавать in one sentence, and с вас in another sentence, which means that this phrase is implausible. Searching for these terms confirms the plausible phrase. So in the case above at least we correct the translation result into Мне понравилось плавать с вами.

When we have more complex web mining, where for a few sentences we search for few sentence search results, we need to match multiple sentences, not just phrases. For that we need some rules, how phrases can be distributed through multiple sentences. Can all phrases be transferred from one sentence to another? No, only some, and RST/Speech Acts help us with plausible/implausible modifications of sentences for the purpose of match.

We design parse thickets so that we can treat paragraph of text formally for a broad range of applications, from search to content generation. When we match two sentences, we need the rules of phrases transformation into a similar form: well explored and used area. When we match two paragraph of text, we need sentence parts transformation rules, which are based on RST, Speech Acts and other discourse theories we are going to use in the future.

In machine translation, parse thicket via web mining would help to assess how coherent is the translation results, based on our hypothesis that "everything on Earth has already been said". We match the translation results paragraph with the one found as a search result. Translation system frequently obtain meaningless output for a reasonable input. In this study we will attempt to repair such translation by trying to verify meaningfulness of each phrase in translation results. Once a meaningless phrase is detected, we form a query from its most important (in our opinion) keywords and search the web for most similar phrases. We assume that most highly-ranked texts in the web search engine results are meaningful. Once we obtain web search results for a meaningless phrase, we attempt to substitute its entities with the ones from the meaningless phrases to be replaced. Parse Thickets are fairly helpful in this operation, supporting the insertion of mined phrase assumed to be meaningful into the translation results. As a result, we expect to obtain overall more meaningful translation, but potentially with a higher deviation from the original.

Meaningless Phrases Substitution

In some cases, agent application 102 can substitute meaningless phrases in candidate responses with meaningful ones. We start with forming phrases to be verified. The list of phrases which contain at least two sub-phrases is formed (simpler phrases are too trivial to verify for meaningfulness). If a phrase is too short, it will almost always be found on the web, and if a phrase is too long, then even for a meaningful expression it would be hard to find similar expressions on the web, in most cases. As a result of this step, we form the list of overlapping phrases $L_{op}$ some of which will need to be replaced. We iterate through the members of $L_{op}$. For a pair of consecutive overlapping phrases in $L_{op}$, if the first one is found to be meaningless and is replaced, the second one will not be attempted to be replaced.

If two consecutive phrases are still too short (<5 words each) we merge them and insert into $L_{op}$. From now on we call the elements of $L_{op}$ expressions since they are not necessarily noun, verb or other kind of phrases.

Once the expressions are formed, we search for each expression on the web (using, for example, Bing search engine API). We first do an exact search, wrapping the expressions in double quotes.

If there are no search results, we search the expression as a default (OR) query and collect the search results.

To determine if there is a similar phrase on the web or not, we assess the similarity between the expression from $L_{op}$ and its search results. To do that, we perform generalization between the expression and each of its search result, and obtain its score. For each search result, we use the highest generalization score for:

Document title;
Document snippet;
Document sentence.

If the highest score is still below the threshold, we conclude that there is no document on the web with an expression similar to the one under consideration, and it is therefore meaningless. Otherwise, if a document with an expression similar to the one under consideration is found, we conclude that it is meaningful and proceed to the next expression from $L_{op}$. Our assumption here is that it is almost impossible to "invent" a new expression which does not exist on the web. Therefore the system tries to find an existing 'analogue' from a trusted source for an "invented" expression in the translation result, believed to be meaningless, according to our model.

For the list of meaningful search results for a meaningless expression, we try to find which search result is the most appropriate. To do that, we generalize each search result with the whole translation test. For that we build a parse thicket for the latter, and generalize it with parse tree of the former.

Given generalization score, we form the best insertion candidate from parts of the best search results (title, snippet, sentence).

Then we align the expression from $L_{op}$ to be substituted and the best insertion candidate. For the former and for the latter, we form a set of pairs of words which are different (does not occur in generalization of the expression from $L_{op}$ to be substituted and the best insertion candidate). As a result of this step, we form a list of pairs of words, so that the word from the meaningful expression will be substitute by the word from the meaningless one. The more such substitution we perform, the closer the result will be to the original translation, but potentially more meaningless. Hence we want to verify that as a result, substituting words in meaningful expression, it remains meaningful.

Hence each substitution result need to be verified in the same way each expression from $L_{op}$ is verified. Once all word substitutions are verified, the resultant expression can be substituted instead of the original member of $L_{op}$. Once this is done for each expression in $L_{op}$, the algorithm concludes.

More Examples of Conversations

In our first example, we have a housewife conversation about finding a costume for performance.
M: Uh, Helen, we don't need to go to a thrift store to make you look like a punk rocker for your next theater performance (Fame Jr.!). We have a variety of options right at home (although we could use suspenders and doc martens size 7 to pull off the red plaid skirt). The pink hair dye and we're good.
E: Ysa has skull and crossbones suspenders that Maddy can borrow. Sadly, all my Docs are too big for her. (but Ysa's been BEGGING for "combat boots"-is it the age?? I was NOT that cool at 10 . . . or ever!)
M: Oh, yes to the suspenders! (My docs are too big too, and a bit dusty, but maybe WE can share.
L: I have some red creepers in size 5 (men's), if that's of interest.
Agent: I like punk rock. But I'm not a punk rocker. Growing up being a guitar player and being into music, there were really only two types of people you could hang out with: heavy metal dudes and punk rockers. They were the only two . . . . Our teacher, Linda Harlan, gave us an "A" not because it was good, but because we had been so ballsy in taking over the entire school to make our silly movie . . . .
It occurred to me, how am I gonna drive home, I don't have my glasses!

This conversation is yielded by a posting photos included an album with a certain name:
G: added 7 new photos to the album Prague.
S: Shame about the weather.
R: I dont see any caving pics in here Gilly.
G: Guess I'm just sick of caves . . . just kidding! I'm en route to caving.
Agent: Considering also, I had never been to Prague before (unless you count that one time I passed it by on the way to Hungary), I couldn't wait to count down the days till leaving for a short road trip . . . . Afterwards we casually walked down tiny, narrow alleyways, checked out Náměsti Republiky, Wenceslas Square, stopped at Sephora's (tiniest Sephora I've ever been to and aside from NARS they didn't sell anything one wouldn't get in Germany anyway)

Although the host has never been to Prague (which is true) the rest of information has nothing to do with the host travel experience but nevertheless feels authentic.

Now a Facebook user makes a post with a reference to an article in economics, so the social autonomous agent needs to fuse both text to form a lattice query. The discussion is started to heating up with the participants asking and answering individually, as the social autonomous agent joins . . . .
E: I think we're moving to an era where companies and countries have to decide who they trust more: the United States (and US domiciled companies) or China (and Chinese companies like Huawei). I'm not saying it's an obvious choice either . . . but we may be seeing the beginning of the Balkanization of not just the Internet, but enterprise IT as well. [
Huawei has spied for Chinese government, ex-CIA boss says
www.guardian.co.uk
Michael Hayden, also former head of NSA, says he is aware of hard evidence of spying activity by world's No 2 telecoms firm . . . ]
A: it's always a nice surprise to see you drop by MVODC. BTW, how do you know David Kim? He's the leader of my small group. Re: enterprise IT I see what you mean now. I interpreted "enterprise" at the company level, but you were referring to "enterprise IT" in the whole, by country. Sure, I can see Balkanization, and trade treaties, and so on.
S: I suspect my new Samsung fridge is spying on me for the Korean government. It's just sitting there in the corner, like, "who, me? A spy? Are you kidding?"
K: It would be an obvious choice for me. El, you need to get back to the U.S.
E: @K yeah . . . I trust Google more than most other companies in the US or China . . . but other companies like MSFT YHOO etc probably would just give it all up to USG without much of a fight.
Agent: The textile industry is very concerned that the TPP will specifically allow a backdoor for Vietnam (a TPP member country) to buy Chinese textiles and sell or integrate them as their own under the TPP . . . . I totally understand that this will cost more, but I would rather trust the quality of American-made goods (Our QA-QC is worlds apart from Continental Asian companies . . . especially China) over those made in China.

Determining Mental States

The agent application 102 can recognize mental states from the text postings and then filter candidate postings based on the appropriate mental state. Mental states include having knowledge, belief, intent, a lack of knowledge, being confident, or being in an emotional states such as upset, curious, or puzzled. Mental state determines are derived from a presence of communicative actions, which include activities that change mental states: inform, ask, share, deny, disagree, request, and explain. In particular, agent application 102 can recognize several scenarios:

(1) A knowledgeable human agent asking specific recommendation with detailed explanations. In this case, a seed posting includes a chain of elaborations because a knowledgeable person knows specific requirements. The agent's reply should be to be detailed and specific, with thorough comparison between alternative. The reply should include rhetorical relations of attribution, contrast, explanation, or cause. The reply should also address all entities in the seed and all contrast-related rhetorical relations. The reply can be in form associated with controversy.

Agent application 102 can determine a last, or final post that occurred after other text posts. Agent application 102 creates a discourse tree from the last post and a discourse tree for each candidate search result. Agent application 102 determines that the discourse tree from the last post includes one or more rhetorical relations of type elaboration and selects a candidate search result corresponding to a discourse tree that comprises a rhetorical relation of (i) attribution, (ii) contrast, (iii) explanation, or (iv) cause.

(2) Knowledgeable human agent willing to share his recommendation. In this case, the parse thicket associated with the seed can include mental states that indicate the poster's intent to share. For example, phrases might include "you want to know," "I believe," "I advise," or "here is information." The agent's replies should include confirmation that his recommendations are received, valued, used, etc. A reply can include repetition of the expert recommendation with additional parameters specified confirming that his recommendation has been applied.

Agent application 102 determines that the one or more nodes of the discourse tree representing the last post include communicative actions. In response, agent application 102 selects a candidate search result that corresponds to a discourse tree that includes a rhetorical relation of (i) restatement, (ii) confirmation, (iii) attribution, (iv) summary, or (v) evidence.

(3) Beginner agent seeking for a recommendation. In this case, the seed includes a simple question. limited number of elaborations and/or joins or sequences. The agent's reply should address entities in the seed and should not include rhetorical relation associated with a contrast. The reply should include simple mental states and no communicative actions and should not be in a form associated with controversy.

Agent application 102 determines that the discourse tree representing the last post includes one or more rhetorical relations of type elaboration, joint, or sequence. In response, agent application 102 selects a candidate search result that includes a discourse tree with a node labeled with communicative actions and without mental actions.

Figure 17:
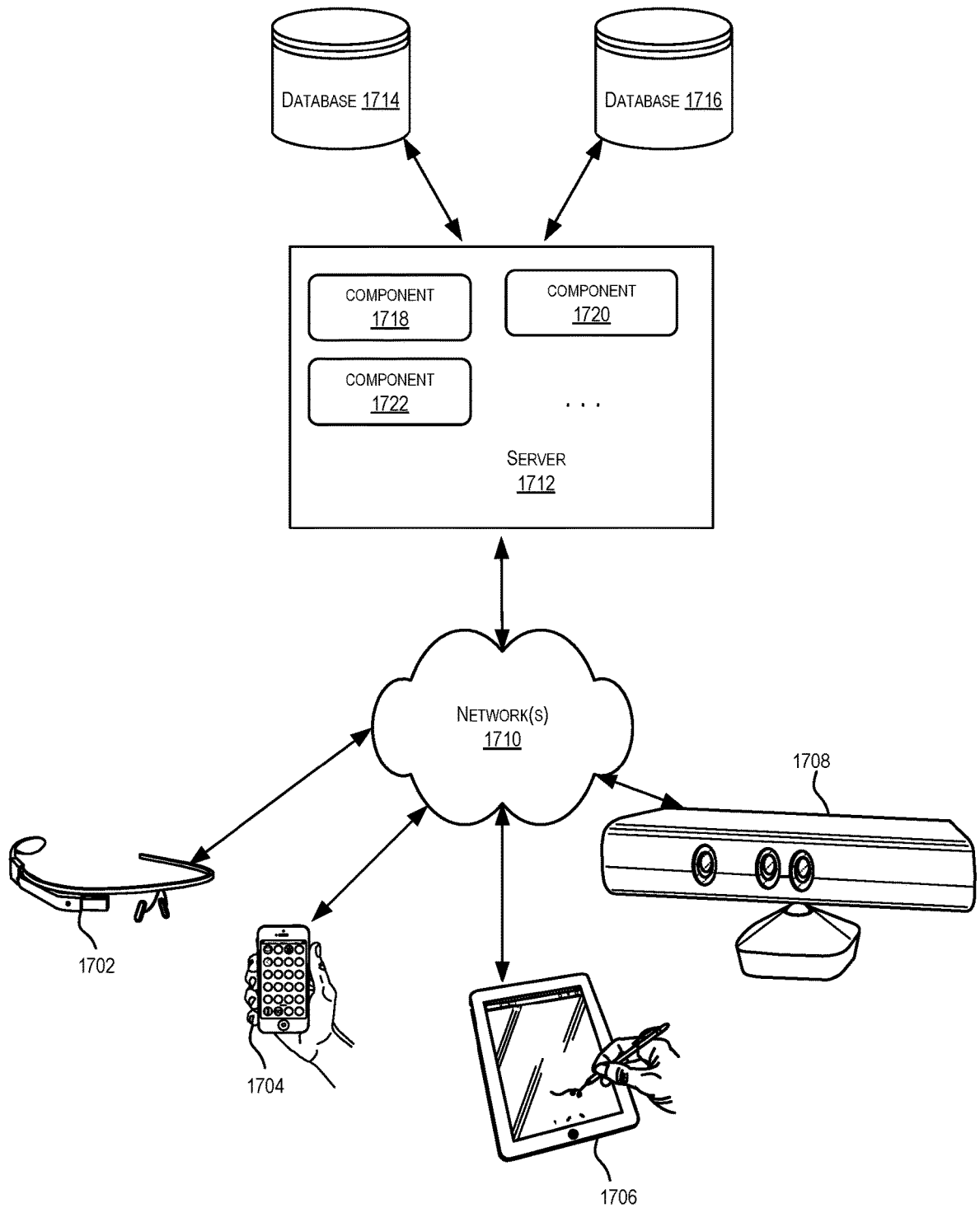
FIG. 17 depicts a simplified diagram of a distributed system for implementing one of the aspects.

FIG. 17 depicts a simplified diagram of a distributed system 1700 for implementing one of the aspects. For example, distributed system 1700 can implement computing system 101 and/or agent application 102. In the illustrated aspect, distributed system 1700 includes one or more client computing devices 1702, 1704, 1706, and 1708, which are configured to execute and operate a client application such as a web browser, proprietary client (e.g., Oracle Forms), or the like over one or more network(s) 1710. Server 1712 may be communicatively coupled with remote client computing devices 1702, 1704, 1706, and 1708 via network 1710.

In various aspects, server 1712 may be adapted to run one or more services or software applications provided by one or more of the components of the system. The services or software applications can include non-virtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 1702, 1704, 1706, and/or 1708. Users operating client computing devices 1702, 1704, 1706, and/or 1708 may in turn utilize one or more client applications to interact with server 1712 to utilize the services provided by these components.

In the configuration depicted in the figure, the software components 1718, 1720 and 1722 of distributed system 1700 are shown as being implemented on server 1712. In other aspects, one or more of the components of distributed system 1700 and/or the services provided by these components may also be implemented by one or more of the client computing devices 1702, 1704, 1706, and/or 1708. Users operating the client computing devices may then utilize one or more client applications to use the services provided by these components. These components may be implemented in hardware, firmware, software, or combinations thereof. It should be appreciated that various different system configurations are possible, which may be different from distributed system 1700. The aspect shown in the figure is thus one example of a distributed system for implementing an aspect system and is not intended to be limiting.

Client computing devices 1702, 1704, 1706, and/or 1708 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1702, 1704, 1706, and 1708 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1710.

Although exemplary distributed system 1700 is shown with four client computing devices, any number of client computing devices may be supported. Other devices, such as devices with sensors, etc., may interact with server 1712.

Network(s) 1710 in distributed system 1700 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1710 can be a local area network (LAN), such as one based on Ethernet, Token-Ring and/or the like. Network(s) 1710 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.17 suite of protocols, Bluetooth®, and/or any other wireless protocol); and/or any combination of these and/or other networks.

Server 1712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1712 can include one or more virtual machines running virtual operating systems, or other computing architectures involving virtualization. One or more flexible pools of logical storage devices can be virtualized to maintain virtual storage devices for the server. Virtual networks can be controlled by server 1712 using software defined networking. In various aspects, server 1712 may be adapted to run one or more services or software applications described in the foregoing disclosure. For example, server 1712 may correspond to a server for performing processing described above according to an aspect of the present disclosure.

Server 1712 may run an operating system including any of those discussed above, as well as any commercially available server operating system. Server 1712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1712 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1712 may also include one or more applications to display the data feeds and/or real-time events via one or more display devices of client computing devices 1702, 1704, 1706, and 1708.

Distributed system 1700 may also include one or more databases 1714 and 1716. Databases 1714 and 1716 may reside in a variety of locations. By way of example, one or more of databases 1714 and 1716 may reside on a non-transitory storage medium local to (and/or resident in) server 1712. Alternatively, databases 1714 and 1716 may be remote from server 1712 and in communication with server 1712 via a network-based or dedicated connection. In one set of aspects, databases 1714 and 1716 may reside in a storage-area network (SAN). Similarly, any necessary files for performing the functions attributed to server 1712 may be stored locally on server 1712 and/or remotely, as appropriate. In one set of aspects, databases 1714 and 1716 may include relational databases, such as databases provided by Oracle, that are adapted to store, update, and retrieve data in response to SQL-formatted commands.

Figure 18:
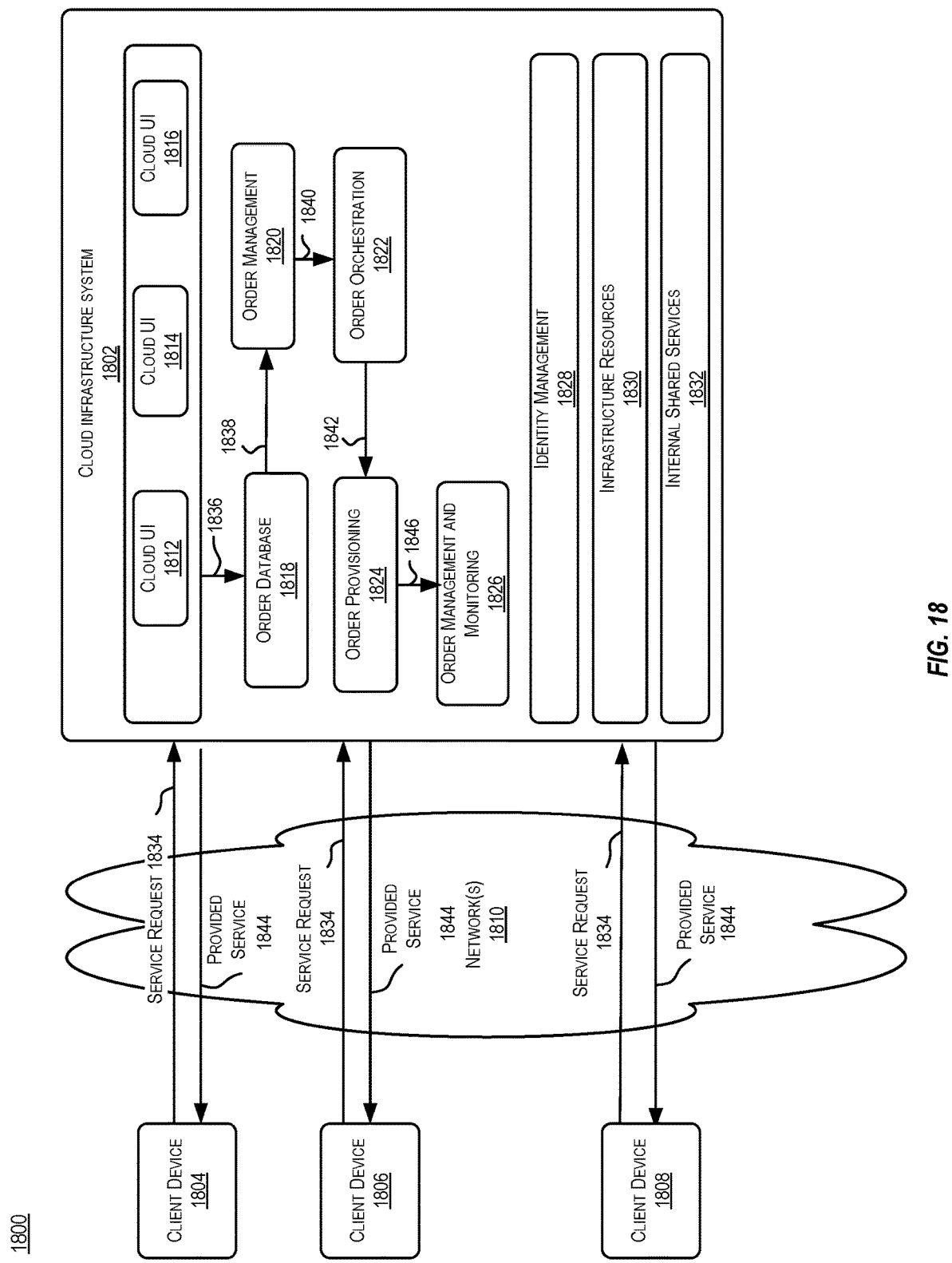
FIG. 18 is a simplified block diagram of components of a system environment by which services provided by the components of an aspect system may be offered as cloud services in accordance with an aspect.

FIG. 18 is a simplified block diagram of one or more components of a system environment 1800 by which services provided by one or more components of an aspect system may be offered as cloud services, in accordance with an aspect of the present disclosure. In the illustrated aspect, system environment 1800 includes one or more client computing devices 1804, 1806, and 1808 that may be used by users to interact with a cloud infrastructure system 1802 that provides cloud services. The client computing devices may be configured to operate a client application such as a web browser, a proprietary client application (e.g., Oracle Forms), or some other application, which may be used by a user of the client computing device to interact with cloud infrastructure system 1802 to use services provided by cloud infrastructure system 1802.

It should be appreciated that cloud infrastructure system 1802 depicted in the figure may have other components than those depicted. Further, the aspect shown in the figure is only one example of a cloud infrastructure system that may incorporate an aspect of the invention. In some other aspects, cloud infrastructure system 1802 may have more or fewer components than shown in the figure, may combine two or more components, or may have a different configuration or arrangement of components.

Client computing devices 1804, 1806, and 1808 may be devices similar to those described above for 1702, 1704, 1706, and 1708.

Although exemplary system environment 1800 is shown with three client computing devices, any number of client computing devices may be supported. Other devices such as devices with sensors, etc. may interact with cloud infrastructure system 1802.

Network(s) 1810 may facilitate communications and exchange of data between clients 1804, 1806, and 1808 and cloud infrastructure system 1802. Each network may be any type of network familiar to those skilled in the art that can support data communications using any of a variety of commercially-available protocols, including those described above for network(s) 1710.

Cloud infrastructure system 1802 may comprise one or more computers and/or servers that may include those described above for server 1718.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 1802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 1802 may be adapted to automatically provision, manage and track a customer's subscription to services offered by cloud infrastructure system 1802. Cloud infrastructure system 1802 may provide the cloud services via different deployment models. For example, services may be provided under a public cloud model in which cloud infrastructure system 1802 is owned by an organization selling cloud services (e.g., owned by Oracle) and the services are made available to the general public or different industry enterprises. As another example, services may be provided under a private cloud model in which cloud infrastructure system 1802 is operated solely for a single organization and may provide services for one or more entities within the organization. The cloud services may also be provided under a community cloud model in which cloud infrastructure system 1802 and the services provided by cloud infrastructure system 1802 are shared by several organizations in a related community. The cloud services may also be provided under a hybrid cloud model, which is a combination of two or more different models.

In some aspects, the services provided by cloud infrastructure system 1802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1802. Cloud infrastructure system 1802 then performs processing to provide the services in the customer's subscription order.

In some aspects, the services provided by cloud infrastructure system 1802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 1802 may also include infrastructure resources 1830 for providing the resources used to provide various services to customers of the cloud infrastructure system. In one aspect, infrastructure resources 1830 may include pre-integrated and optimized combinations of hardware, such as servers, storage, and networking resources to execute the services provided by the PaaS platform and the SaaS platform.

In some aspects, resources in cloud infrastructure system 1802 may be shared by multiple users and dynamically re-allocated per demand. Additionally, resources may be allocated to users in different time zones. For example, cloud infrastructure system 1802 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 1832 may be provided that are shared by different components or modules of cloud infrastructure system 1802 and by the services provided by cloud infrastructure system 1802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 1802 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 1802, and the like.

In one aspect, as depicted in the figure, cloud management functionality may be provided by one or more modules, such as an order management module 1820, an order orchestration module 1822, an order provisioning module 1824, an order management and monitoring module 1826, and an identity management module 1828. These modules may include or be provided using one or more computers and/or servers, which may be general purpose computers, specialized server computers, server farms, server clusters, or any other appropriate arrangement and/or combination.

In exemplary operation 1834, a customer using a client device, such as client device 1804, 1806 or 1808, may interact with cloud infrastructure system 1802 by requesting one or more services provided by cloud infrastructure system 1802 and placing an order for a subscription for one or more services offered by cloud infrastructure system 1802. In certain aspects, the customer may access a cloud User Interface (UI), cloud UI 1818, cloud UI 1814 and/or cloud UI 1816 and place a subscription order via these UIs. The order information received by cloud infrastructure system 1802 in response to the customer placing an order may include information identifying the customer and one or more services offered by the cloud infrastructure system 1802 that the customer intends to subscribe to.

After an order has been placed by the customer, the order information is received via the cloud UIs, 1818, 1814 and/or 1816.

At operation 1836, the order is stored in order database 1818. Order database 1818 can be one of several databases operated by cloud infrastructure system 1802 and operated in conjunction with other system elements.

At operation 1838, the order information is forwarded to an order management module 1820. In some instances, order management module 1820 may be configured to perform billing and accounting functions related to the order, such as verifying the order, and upon verification, booking the order.

At operation 1840, information regarding the order is communicated to an order orchestration module 1822. Order orchestration module 1822 may utilize the order information to orchestrate the provisioning of services and resources for the order placed by the customer. In some instances, order orchestration module 1822 may orchestrate the provisioning of resources to support the subscribed services using the services of order provisioning module 1824.

In certain aspects, order orchestration module 1822 enables the management of business processes associated with each order and applies business logic to determine whether an order should proceed to provisioning. At operation 1842, upon receiving an order for a new subscription, order orchestration module 1822 sends a request to order provisioning module 1824 to allocate resources and configure those resources needed to fulfill the subscription order. Order provisioning module 1824 enables the allocation of resources for the services ordered by the customer. Order provisioning module 1824 provides a level of abstraction between the cloud services provided by cloud infrastructure system 1800 and the physical implementation layer that is used to provision the resources for providing the requested services. Order orchestration module 1822 may thus be isolated from implementation details, such as whether or not services and resources are actually provisioned on the fly or pre-provisioned and only allocated/assigned upon request.

At operation 1844, once the services and resources are provisioned, a notification of the provided service may be sent to customers on client devices 1804, 1806 and/or 1808 by order provisioning module 1824 of cloud infrastructure system 1802.

At operation 1846, the customer's subscription order may be managed and tracked by an order management and monitoring module 1826. In some instances, order management and monitoring module 1826 may be configured to collect usage statistics for the services in the subscription order, such as the amount of storage used, the amount data transferred, the number of users, and the amount of system up time and system down time.

In certain aspects, cloud infrastructure system 1800 may include an identity management module 1828. Identity management module 1828 may be configured to provide identity services, such as access management and authorization services in cloud infrastructure system 1800. In some aspects, identity management module 1828 may control information about customers who wish to utilize the services provided by cloud infrastructure system 1802. Such information can include information that authenticates the identities of such customers and information that describes which actions those customers are authorized to perform relative to various system resources (e.g., files, directories, applications, communication ports, memory segments, etc.) Identity management module 1828 may also include the management of descriptive information about each customer and about how and by whom that descriptive information can be accessed and modified.

Figure 19:
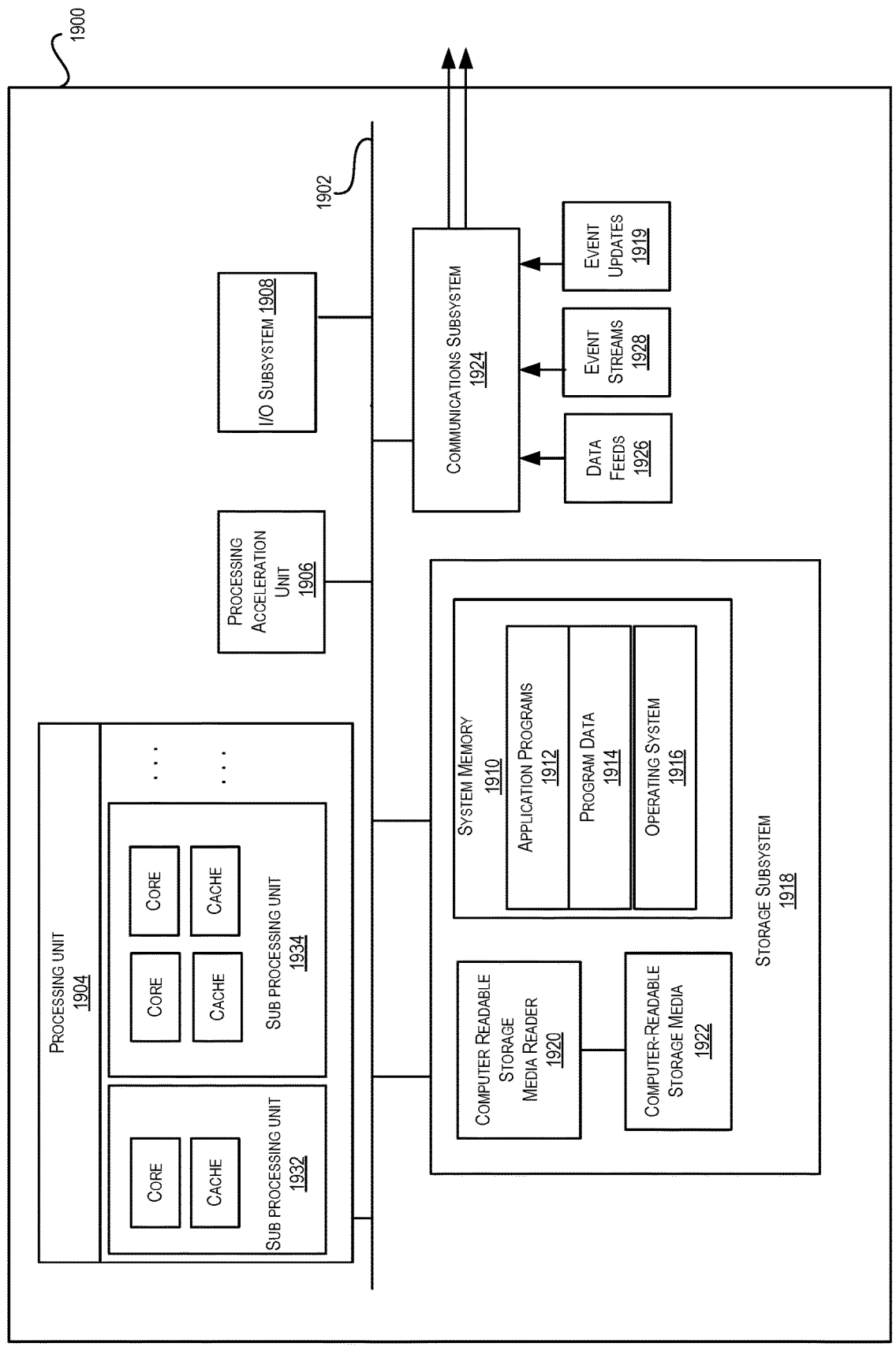
FIG. 19 illustrates an exemplary computer system, in which various aspects of the present invention may be implemented.

FIG. 19 illustrates an exemplary computer system 1900, in which various aspects of the present invention may be implemented. The system 1900 may be used to implement any of the computer systems described above. As shown in the figure, computer system 1900 includes a processing unit 1904 that communicates with a number of peripheral subsystems via a bus subsystem 1902. These peripheral subsystems may include a processing acceleration unit 1906, an I/O subsystem 1908, a storage subsystem 1918 and a communications subsystem 1924. Storage subsystem 1918 includes tangible computer-readable storage media 1922 and a system memory 1910.

Bus subsystem 1902 provides a mechanism for letting the various components and subsystems of computer system 1900 communicate with each other as intended. Although bus subsystem 1902 is shown schematically as a single bus, alternative aspects of the bus subsystem may utilize multiple buses. Bus subsystem 1902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1986.1 standard.

Processing unit 1904, which can be implemented as one or more integrated circuits (e.g., a conventional microprocessor or microcontroller), controls the operation of computer system 1900. One or more processors may be included in processing unit 1904. These processors may include single core or multicore processors. In certain aspects, processing unit 1904 may be implemented as one or more independent processing units 1932 and/or 1934 with single or multicore processors included in each processing unit. In other aspects, processing unit 1904 may also be implemented as a quad-core processing unit formed by integrating two dual-core processors into a single chip.

In various aspects, processing unit 1904 can execute a variety of programs in response to program code and can maintain multiple concurrently executing programs or processes. At any given time, some or all of the program code to be executed can be resident in processor(s) 1904 and/or in storage subsystem 1918. Through suitable programming, processor(s) 1904 can provide various functionalities described above. Computer system 1900 may additionally include a processing acceleration unit 1906, which can include a digital signal processor (DSP), a special-purpose processor, and/or the like.

I/O subsystem 1908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1900 may comprise a storage subsystem 1918 that comprises software elements, shown as being currently located within a system memory 1910. System memory 1910 may store program instructions that are loadable and executable on processing unit 1904, as well as data generated during the execution of these programs.

Depending on the configuration and type of computer system 1900, system memory 1910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1904. In some implementations, system memory 1910 may include multiple different types of memory, such as static random access memory (SRAM) or dynamic random access memory (DRAM). In some implementations, a basic input/output system (BIOS), containing the basic routines that help to transfer information between elements within computer system 1900, such as during start-up, may typically be stored in the ROM. By way of example, and not limitation, system memory 1910 also illustrates application programs 1912, which may include client applications, Web browsers, mid-tier applications, relational database management systems (RDBMS), etc., program data 1914, and an operating system 1916. By way of example, operating system 1916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1918 may also provide a tangible computer-readable storage medium for storing the basic programming and data constructs that provide the functionality of some aspects. Software (programs, code modules, instructions) that when executed by a processor provide the functionality described above may be stored in storage subsystem 1918. These software modules or instructions may be executed by processing unit 1904. Storage subsystem 1918 may also provide a repository for storing data used in accordance with the present invention.

Storage subsystem 1900 may also include a computer-readable storage media reader 1920 that can further be connected to computer-readable storage media 1922. Together and, optionally, in combination with system memory 1910, computer-readable storage media 1922 may comprehensively represent remote, local, fixed, and/or removable storage devices plus storage media for temporarily and/or more permanently containing, storing, transmitting, and retrieving computer-readable information.

Computer-readable storage media 1922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 1900.

By way of example, computer-readable storage media 1922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1922 may include, but is not limited to, Zip® drives, flash memory cards, universal serial bus (USB) flash drives, secure digital (SD) cards, DVD disks, digital video tape, and the like. Computer-readable storage media 1922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1900.

Communications subsystem 1924 provides an interface to other computer systems and networks. Communications subsystem 1924 serves as an interface for receiving data from and transmitting data to other systems from computer system 1900. For example, communications subsystem 1924 may enable computer system 1900 to connect to one or more devices via the Internet. In some aspects, communications subsystem 1924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.28 family standards, or other mobile communication technologies, or any combination thereof), global positioning system (GPS) receiver components, and/or other components. In some aspects, communications subsystem 1924 can provide wired network connectivity (e.g., Ethernet) in addition to or instead of a wireless interface.

In some aspects, communications subsystem 1924 may also receive input communication in the form of structured and/or unstructured data feeds 1926, event streams 1928, event updates 1919, and the like on behalf of one or more users who may use computer system 1900.

By way of example, communications subsystem 1924 may be configured to receive unstructured data feeds 1926 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 1924 may also be configured to receive data in the form of continuous data streams, which may include event streams 1928 of real-time events and/or event updates 1919, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1924 may also be configured to output the structured and/or unstructured data feeds 1926, event streams 1928, event updates 1919, and the like to one or more databases that may be in communication with one or more streaming data source computers coupled to computer system 1900.

Computer system 1900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various features and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A method of performing a computer-generated conversation, the method comprising:
   identifying, from a conversation, a first text post and a second text post, wherein each text post comprises text fragments;
   creating, from the first text post, a first syntactic tree;
   creating, from the second text post, a second syntactic tree;
   creating, from the first text post, a first discourse tree, wherein a discourse tree comprises terminal nodes and nonterminal nodes, wherein each terminal node is associated with a respective text fragment and each nonterminal node represents a rhetorical relationship between two text fragments;
   creating, from the second text post, a second discourse tree;
   creating a parse thicket comprising the first discourse tree, the first syntactic tree, the second discourse tree, and the second syntactic tree, wherein the parse thicket comprises one or more relationships between the first text post and the second text post;
   extracting, from the parse thicket, a common text segment comprising text that (i) corresponds to a communicative action that is common to the first text post and the second text post, (ii) corresponds to a rhetorical relation that is common to the first text post and the second text post, or (iii) has a common verb signature between the first text post and a verb in the second text post;
   obtaining a plurality of candidate search results by providing the common text segment to a search engine;
   determining, for each combination of a candidate search result and one or more of the first text post and the second text post, a score representing a rhetorical similarity; and
   selecting the candidate search result that comprises a highest score; and
   transmitting the selected candidate search result to a user device.

2. The method of claim 1, wherein the relationships comprise one or more of: (i) two nouns represented by fragments in the first syntactic tree and the second syntactic tree, wherein the nouns represent a common entity or (ii) an additional rhetorical relation between fragments in the first discourse tree and the second discourse tree.

3. The method of claim 1, further comprising:
   identifying a last text post that occurred after the second text post;
   creating a third discourse tree for the last text post;
   creating, for each candidate search result, respective additional discourse tree; and
   responsive to determining that the third discourse tree comprises one or more rhetorical relations of type elaboration, selecting one of the candidate search results that corresponds to one of the additional discourse trees, wherein the one of the additional discourse trees is associated with a rhetorical relation of type (i) attribution, (ii) contrast, (iii) explanation, or (iv) cause.

4. The method of claim 1, further comprising:
   identifying a last text post that occurred after the second text post;
   creating a third discourse tree for the last text post;
   creating, for each candidate search result, a respective additional discourse tree; and
   responsive to determining that one or more nodes of the first discourse tree comprise communicative actions, selecting one of the candidate search results that corresponds to one of the additional discourse trees, wherein the one of the additional discourse trees is associated with a rhetorical relation of type (i) restatement, (ii) confirmation, (iii) attribution, (iv) summary, or (v) evidence.

5. The method of claim 1, further comprising:
   identifying a last text post that occurred after the second text post;
   creating a third discourse tree for the last text post;
   creating for each candidate search result, a respective additional discourse tree; and
   responsive to determining that the third discourse tree comprises one or more rhetorical relations of type elaboration, joint, or sequence, selecting one of the candidate search results that is associated with a node of one of the additional discourse trees, wherein the node is labeled with communicative actions and does not comprise nodes that are labeled with mental actions.

6. The method of claim 1, wherein the first text post is an original post on a social media page and the second text post is related to the first text post.

7. A system comprising:
   a non-transitory computer-readable medium storing computer-executable program instructions; and
   a processing device communicatively coupled to the non-transitory computer-readable medium for executing the computer-executable program instructions, wherein executing the computer-executable program instructions configures the processing device to perform operations comprising:
      identifying, from a conversation, a first text post and a second text post, wherein each text post comprises text fragments;
      creating, from the first text post, a first syntactic tree;
      creating, from the second text post, a second syntactic tree;
      creating, from the first text post, a first discourse tree, wherein a discourse tree comprises terminal nodes and nonterminal nodes, wherein each terminal node is associated with a respective text fragment and each nonterminal node represents a rhetorical relationship between two text fragments;
      creating, from the second text post, a second discourse tree;
      creating a parse thicket comprising the first discourse tree, the first syntactic tree, the second discourse tree, and the second syntactic tree, wherein the parse thicket comprises one or more relationships between the first text post and the second text post;
      extracting, from the parse thicket, a common text segment comprising text that (i) corresponds to a communicative action that is common to the first text post and the second text post, (ii) corresponds to a rhetorical relation that is common to the first text post and the second text post, or (iii) has a common verb signature between the first text post and a verb in the second text post;
      obtaining a plurality of candidate search results by providing the common text segment to a search engine;

determining, for each combination of a candidate search result and one or more of the first text post and the second text post, a score representing a rhetorical similarity;

selecting the candidate search result that comprises a highest score; and transmitting the selected candidate search result to a user device.

8. The system of claim 7, wherein the relationships comprise one or more of: (i) two nouns represented by fragments in the first syntactic tree and the second syntactic tree, wherein the nouns represent a common entity or (ii) an rhetorical relation between fragments in the first discourse tree and the second discourse tree of the second text post.

9. The system of claim 7, wherein executing the computer-executable program instructions configures the processing device to perform operations comprising:

identifying a last text post that occurred after the second text post;

creating a third discourse tree for the last text post;

creating, for each candidate search result, a respective additional discourse tree; and responsive to determining that the third discourse tree comprises one or more rhetorical relations of type elaboration, selecting one of the candidate search results that corresponds to one of the additional discourse trees, wherein the one of the additional discourse trees comprises a rhetorical relation of type (i) attribution, (ii) contrast, (iii) explanation, or (iv) cause.

10. The system of claim 7, wherein executing the computer-executable program instructions configures the processing device to perform operations comprising:

identifying a last text post that occurred after the second text post;

creating a third discourse tree for the last text post;

creating, for each candidate search result, a respective additional discourse tree; and responsive to determining that one or more nodes of the third discourse tree comprise communicative actions, selecting one of the candidate search results that corresponds to one of the additional discourse trees, wherein the one of the additional discourse trees comprises a rhetorical relation of type (i) restatement, (ii) confirmation, (iii) attribution, (iv) summary, or (v) evidence.

11. The system of claim 7, wherein executing the computer-executable program instructions configures the processing device to perform operations comprising:

identifying a last text post that occurred after the text post;

creating a third discourse tree for the last text post;

creating, for each candidate search result, a respective additional discourse tree; and responsive to determining that the third discourse tree comprises one or more rhetorical relations of type elaboration, joint, or sequence, selecting one of the candidate search results that is associated with a node of one of the additional discourse trees, wherein the node is labeled with communicative actions and does not comprise nodes that are labeled with mental actions.

12. The system of claim 7, wherein the first text post is an original post on a social media page and the second text post is related to the first text post.

13. The system of claim 7, wherein executing the computer-executable program instructions configures the processing device to perform operations comprising:

transmitting one of the candidate search results to a website.

14. A non-transitory computer-readable storage medium storing computer-executable program instructions, wherein when executed by a processing device, the program instructions cause the processing device to perform operations comprising:

identifying, from a conversation, a first text post and a second text post, wherein each text post comprises text fragments;

creating, from the first text post, a first syntactic tree;

creating, from the second text post, a second syntactic tree;

creating, from the first text post, a first discourse tree, wherein a discourse tree comprises terminal nodes and nonterminal nodes, wherein each terminal node is associated with a respective text fragment and each nonterminal node represents a rhetorical relationship between two text fragments;

creating, from the second text post, a second discourse tree;

creating a parse thicket comprising the first discourse tree, the first syntactic tree, the second discourse tree, and the second syntactic tree, wherein the parse thicket comprises one or more relationships between the first text post and the second text post;

extracting, from the parse thicket, a common text segment comprising text that (i) corresponds to a communicative action that is common to the first text post and the second text post, (ii) corresponds to a rhetorical relation that is common to the first text post and the second text post, or (iii) has a common verb signature between the first text post and a verb in the second text post;

obtaining a plurality of candidate search results by providing the common text segment to a search engine;

determining, for each combination of a candidate search result and one or more of the first text post and the second text post, a score representing a rhetorical similarity;

selecting the candidate search result that comprises a highest score; and transmitting the selected candidate search result to a user device.

15. The non-transitory computer-readable storage medium of claim 14, when executed by the processing device, the computer-executable program instructions cause the processing device to perform operations comprising:

identifying a last text post that occurred after the second text post;

creating a third discourse tree for the last text post;

creating, for each candidate search result, a respective additional discourse tree; and responsive to determining that the third discourse tree comprises one or more rhetorical relations of type elaboration, selecting one of the candidate search results that corresponds to one of the additional discourse trees, wherein the one of the additional discourse trees comprises a rhetorical relation of type (i) attribution, (ii) contrast, (iii) explanation, or (iv) cause.

16. The non-transitory computer-readable storage medium of claim 14, wherein the first text post is an original post on a social media page and the second text post is related to the first text post.

17. The method of claim 1, wherein the communicative action is an action that is performed by one or more agents.

18. The system of claim 7, wherein the communicative action is an action that is performed by one or more agents.

19. The non-transitory computer-readable storage medium of claim 14, wherein the communicative action is an action that is performed by one or more agents.

\* \* \* \* \*

UNITED STATES PATENT AND TRADEMARK OFFICE
CERTIFICATE OF CORRECTION

PATENT NO. : 11,645,459 B2
APPLICATION NO. : 16/460503
DATED : May 9, 2023
INVENTOR(S) : Boris Galitsky It is certified that error appears in the above-identified patent and that said Letters Patent is hereby corrected as shown below:

On the Title Page

On page 3, Column 1, Item (56) under Other Publications, Line 62, delete "forTaxonomy" and insert -- for Taxonomy --, therefor.

In the Specification

In Column 10, Line 66, delete "are.'"'" and insert -- are.' --, therefor.

In Column 17, Line 29, delete "sustain." and insert -- sustain). --, therefor.

In Column 18, Line 30, delete "a an" and insert -- an --, therefor.

In Column 24, Line 10, delete "the" and insert -- The --, therefor.

In Column 24, Line 14, delete "the" and insert -- The --, therefor.

In Column 24, Line 54, delete "2)" and insert -- (2) --, therefor.

In Column 33, Lines 58-59, delete "S E S," and insert -- $S \in S$, --, therefor.

In Column 34, Line 20, delete "commonalties" and insert -- commonalities --, therefor.

In Column 34, Line 38, delete ">><" and insert -- >===>< --, therefor.

In Column 37, Line 59, delete "suspicious" and insert -- suspicious) --, therefor.

In Column 37, Line 63, delete "$c\ \epsilon ac$" and insert -- $c{+}\epsilon ac$ --, therefor.

Signed and Sealed this
Twentieth Day of February, 2024

Katherine Kelly Vidal
*Director of the United States Patent and Trademark Office*

In Column 41, Line 46, delete "question." and insert -- question, --, therefor.

In Column 52, Line 8, delete "evolution)," and insert -- evolution)), --, therefor.